United States Patent
Andrus et al.

(10) Patent No.: US 10,956,220 B2
(45) Date of Patent: Mar. 23, 2021

(54) SCHEDULER FOR AMP ARCHITECTURE USING A CLOSED LOOP PERFORMANCE AND THERMAL CONTROLLER

(71) Applicant: Apple Inc., Cupertino, CA (US)

(72) Inventors: Jeremy C. Andrus, Sunnyvale, CA (US); John G. Dorsey, San Francisco, CA (US); James M. Magee, Orlando, FL (US); Daniel A. Chimene, San Francisco, CA (US); Cyril de la Cropte de Chanterac, San Francisco, CA (US); Bryan R. Hinch, Mountain View, CA (US); Aditya Venkataraman, Sunnyvale, CA (US); Andrei Dorofeev, San Jose, CA (US); Nigel R. Gamble, San Francisco, CA (US); Russell A. Blaine, San Carlos, CA (US); Constantin Pistol, Cupertino, CA (US); James S. Ismail, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 15/870,760

(22) Filed: Jan. 12, 2018

(65) Prior Publication Data

US 2018/0349175 A1 Dec. 6, 2018

Related U.S. Application Data

(60) Provisional application No. 62/514,930, filed on Jun. 4, 2017.

(51) Int. Cl.
*G06F 1/3206* (2019.01)
*G06F 9/50* (2006.01)
(Continued)

(52) U.S. Cl.
CPC ............ *G06F 9/505* (2013.01); *G06F 1/206* (2013.01); *G06F 1/324* (2013.01); *G06F 1/329* (2013.01);
(Continued)

(58) Field of Classification Search
CPC .......... G06F 9/505; G06F 1/206; G06F 1/324; G06F 1/3243; G06F 1/329; G06F 9/268;
(Continued)

(56) References Cited

U.S. PATENT DOCUMENTS

| 5,345,567 A | 9/1994 | Hayden et al. |
| 5,738,860 A | 4/1998 | Sch.o Slashed.nfeldt et al. |

(Continued)

FOREIGN PATENT DOCUMENTS

| EP | 2990909 A1 | 3/2016 |
| WO | 2016115000 A1 | 7/2016 |

OTHER PUBLICATIONS

International Search Report and Written Opinion for PCT/US2018/024807, dated Jun. 29, 2018, 21 pgs.
(Continued)

*Primary Examiner* — Aurel Prifti
(74) *Attorney, Agent, or Firm* — Jaffery Watson Mendonsa & Hamilton LLP

(57) ABSTRACT

Systems and methods are disclosed for scheduling threads on a processor that has at least two different core types, such as an asymmetric multiprocessing system. Each core type can run at a plurality of selectable voltage and frequency scaling (DVFS) states. Threads from a plurality of processes can be grouped into thread groups. Execution metrics are accumulated for threads of a thread group and fed into a plurality of tunable controllers for the thread group. A closed loop performance control (CLPC) system determines a control effort for the thread group and maps the control effort
(Continued)

to a recommended core type and DVFS state. A closed loop thermal and power management system can limit the control effort determined by the CLPC for a thread group, and limit the power, core type, and DVFS states for the system. Deferred interrupts can be used to increase performance.

27 Claims, 26 Drawing Sheets

(51) Int. Cl.
    *G06F 9/48*     (2006.01)
    *G06F 1/3234*     (2019.01)
    *G06F 1/329*     (2019.01)
    *G06F 1/3296*     (2019.01)
    *G06F 9/38*     (2018.01)
    *G06F 9/26*     (2006.01)
    *G06F 9/54*     (2006.01)
    *G06F 1/20*     (2006.01)
    *G06F 1/324*     (2019.01)
    *G06F 9/30*     (2018.01)

(52) U.S. Cl.
    CPC .......... *G06F 1/3243* (2013.01); *G06F 1/3296* (2013.01); *G06F 9/268* (2013.01); *G06F 9/3851* (2013.01); *G06F 9/3891* (2013.01); *G06F 9/4856* (2013.01); *G06F 9/4881* (2013.01); *G06F 9/4893* (2013.01); *G06F 9/5044* (2013.01); *G06F 9/5094* (2013.01); *G06F 9/54* (2013.01); *G06F 1/3206* (2013.01); *G06F 9/30145* (2013.01); *G06F 2209/501* (2013.01); *G06F 2209/509* (2013.01); *G06F 2209/5018* (2013.01)

(58) Field of Classification Search
    CPC .... G06F 9/3851; G06F 9/3891; G06F 9/4856; G06F 9/4881; G06F 9/4893; G06F 9/5044; G06F 9/5094; G06F 9/54; G06F 1/3206; G06F 9/30145; G06F 2209/501; G06F 2209/5018; G06F 2209/509
See application file for complete search history.

(56) References Cited

U.S. PATENT DOCUMENTS

| | | | |
|---|---|---|---|
| 5,812,844 | A | 9/1998 | Jones et al. |
| 5,974,438 | A | 10/1999 | Neufeld |
| 6,021,425 | A | 2/2000 | Waldron, III et al. |
| 6,329,877 | B1 | 12/2001 | Bowen et al. |
| 7,770,034 | B2 | 8/2010 | Nanja |
| 7,774,626 | B2 | 8/2010 | Fleming |
| 7,921,313 | B2 | 4/2011 | Ghiasi |
| 8,452,999 | B2 | 5/2013 | Barth et al. |
| 8,516,461 | B2* | 8/2013 | Bellows ................ G06F 9/5066 712/10 |
| 8,662,943 | B2* | 3/2014 | Conroy ..................... G06F 1/26 439/894 |
| 8,707,314 | B2* | 4/2014 | Gummaraju .......... G06F 9/5044 718/102 |
| 8,738,860 | B1 | 5/2014 | Griffin et al. |
| 8,892,931 | B2 | 11/2014 | Kruglick |
| 9,304,573 | B2 | 4/2016 | Lee |
| 9,329,877 | B2 | 5/2016 | Donaldson et al. |
| 9,552,230 | B2* | 1/2017 | Jeong ..................... G06F 9/505 |
| 9,652,027 | B2 | 5/2017 | Sharda |
| 9,665,161 | B2 | 5/2017 | Hsu et al. |
| 9,916,162 | B2 | 3/2018 | Gupta |
| 9,984,430 | B2 | 5/2018 | Surti et al. |
| 10,187,282 | B2* | 1/2019 | Park ................... H04L 43/0888 |
| 10,339,023 | B2* | 7/2019 | Wang ................... G06F 12/084 |
| 10,599,481 | B2 | 3/2020 | Pistol et al. |
| 2003/0088610 | A1 | 5/2003 | Kohn et al. |
| 2005/0262270 | A1 | 11/2005 | Latorre et al. |
| 2007/0294694 | A1 | 12/2007 | Jeter et al. |
| 2008/0098254 | A1 | 4/2008 | Altevogt et al. |
| 2008/0163183 | A1 | 7/2008 | Li |
| 2008/0263324 | A1 | 10/2008 | Sutardja et al. |
| 2009/0049451 | A1 | 2/2009 | Bates |
| 2009/0144744 | A1 | 6/2009 | Gunnels |
| 2009/0271646 | A1* | 10/2009 | Talwar .................. G06F 1/3203 713/322 |
| 2010/0077185 | A1* | 3/2010 | Gopalan ............... G06F 9/5033 712/220 |
| 2010/0146316 | A1 | 6/2010 | Carter |
| 2011/0022870 | A1* | 1/2011 | McGrane ............. G06F 1/3203 713/340 |
| 2011/0047401 | A1* | 2/2011 | Werner .................... G06F 1/08 713/500 |
| 2011/0088041 | A1* | 4/2011 | Alameldeen ........... G06F 9/505 718/105 |
| 2011/0113269 | A1* | 5/2011 | Park ...................... G06F 1/3296 713/310 |
| 2011/0113270 | A1* | 5/2011 | Carter .................... G06F 1/324 713/320 |
| 2011/0296407 | A1 | 12/2011 | Bhandari et al. |
| 2012/0173895 | A1* | 7/2012 | Kim ....................... G06F 1/3206 713/300 |
| 2012/0272086 | A1* | 10/2012 | Anderson ............... G06F 1/206 713/340 |
| 2012/0284732 | A1* | 11/2012 | Griglock .............. G06F 9/5066 718/104 |
| 2012/0315966 | A1 | 12/2012 | Spata |
| 2012/0317582 | A1 | 12/2012 | Craik et al. |
| 2013/0042250 | A1* | 2/2013 | Lim ....................... G06F 9/4881 718/103 |
| 2013/0060555 | A1* | 3/2013 | Thomson .............. G06F 1/3203 703/21 |
| 2013/0124885 | A1* | 5/2013 | Davis .................... G06F 1/3206 713/320 |
| 2013/0151879 | A1 | 6/2013 | Thomson et al. |
| 2013/0268943 | A1* | 10/2013 | Solihin ................. G06F 9/5088 718/104 |
| 2014/0013330 | A1 | 1/2014 | Wang et al. |
| 2014/0068285 | A1* | 3/2014 | Lee ........................ G06F 1/3203 713/300 |
| 2014/0091624 | A1* | 4/2014 | Park .......................... G05F 3/08 307/31 |
| 2014/0165074 | A1 | 6/2014 | Creamer et al. |
| 2014/0189302 | A1* | 7/2014 | Subbareddy .......... G06F 9/3885 712/30 |
| 2014/0201411 | A1 | 7/2014 | Kumar |
| 2014/0237477 | A1 | 8/2014 | Cadambi et al. |
| 2014/0277815 | A1 | 9/2014 | Hanumaiah et al. |
| 2014/0282507 | A1 | 9/2014 | Plondke et al. |
| 2014/0304538 | A1 | 10/2014 | Chen |
| 2014/0310467 | A1* | 10/2014 | Shalf .................... G06F 12/0842 711/119 |
| 2014/0372782 | A1* | 12/2014 | Breternitz ............. G06F 1/3206 713/340 |
| 2015/0026495 | A1* | 1/2015 | Jain ........................... G06F 1/32 713/323 |
| 2015/0058646 | A1* | 2/2015 | Kim ....................... G06F 1/3203 713/320 |
| 2015/0073920 | A1 | 3/2015 | Pashkevich et al. |
| 2015/0095666 | A1* | 4/2015 | Ananthakrishnan ...... G06F 1/26 713/300 |
| 2015/0113542 | A1* | 4/2015 | Cadambi ............... G06F 9/5066 718/107 |
| 2015/0121105 | A1* | 4/2015 | Ahn ......................... G06F 1/206 713/322 |
| 2015/0169035 | A1* | 6/2015 | Allen-Ware .......... G06F 1/3296 713/322 |
| 2015/0205644 | A1 | 7/2015 | Ito |
| 2015/0347178 | A1 | 12/2015 | Magee et al. |
| 2015/0355700 | A1* | 12/2015 | Pusukuri ................ G06F 1/329 713/323 |
| 2016/0041594 | A1* | 2/2016 | Hanson .................. G06F 1/324 713/320 |

(56) References Cited

U.S. PATENT DOCUMENTS

| | | | |
|---|---|---|---|
| 2016/0062447 A1* | 3/2016 | Hsu | G06F 1/3243 |
| | | | 713/300 |
| 2016/0085596 A1* | 3/2016 | Nakagawa | G06F 9/5094 |
| | | | 718/104 |
| 2016/0139964 A1* | 5/2016 | Chen | G06F 1/3206 |
| | | | 718/104 |
| 2016/0147280 A1 | 5/2016 | Thomas et al. | |
| 2016/0188380 A1 | 6/2016 | Eastep et al. | |
| 2016/0225042 A1 | 8/2016 | Tran et al. | |
| 2016/0239074 A1 | 8/2016 | Lee et al. | |
| 2016/0282930 A1* | 9/2016 | Ramachandran | G06F 1/3296 |
| 2016/0327999 A1* | 11/2016 | Chang | G06F 1/3206 |
| 2016/0342198 A1* | 11/2016 | Hsu | G06F 1/3296 |
| 2016/0378471 A1 | 12/2016 | Lerzer et al. | |
| 2017/0031429 A1* | 2/2017 | Miyazaki | G06Q 50/06 |
| 2017/0031724 A1* | 2/2017 | Xue | G06F 9/505 |
| 2017/0097854 A1 | 4/2017 | Shah et al. | |
| 2017/0131754 A1* | 5/2017 | Zobel | G06F 1/3206 |
| 2017/0177413 A1* | 6/2017 | Wisniewski | G06F 9/5055 |
| 2017/0262030 A1* | 9/2017 | Lee | G06F 1/26 |
| 2017/0269652 A1* | 9/2017 | Lee | G06F 1/3206 |
| 2017/0357302 A1 | 12/2017 | Dorsey et al. | |
| 2018/0074853 A1 | 3/2018 | Aoyama | |
| 2018/0210531 A1* | 7/2018 | Shahneous Bari | G06F 1/324 |
| 2018/0293102 A1 | 10/2018 | Ray et al. | |
| 2018/0349176 A1 | 12/2018 | Andrus et al. | |
| 2018/0349177 A1 | 12/2018 | Pistol et al. | |
| 2018/0349182 A1 | 12/2018 | Andrus et al. | |
| 2018/0349186 A1 | 12/2018 | Andrus et al. | |
| 2018/0349191 A1 | 12/2018 | Dorsey et al. | |
| 2019/0034238 A1 | 1/2019 | Dorsey et al. | |
| 2019/0384348 A1* | 12/2019 | Srinivasan | G06F 9/4893 |

OTHER PUBLICATIONS

Joao, Jose A., et al. "Utility-Based Acceleration of Multithreaded Applications on Asymmetric CMPs," ISCA '13 Tel-Aviv, Israel, 2013, 12 pages.
PCT/US2018/024811 "International Search Report and Written Opinion" dated Jul. 11, 2018, 13 pgs.
PCT/US2018/024813 "International Search Report and Written Opinion" dated Jul. 11, 2018, 15 pgs.
PCT/US2018/024814 "International Search Report and Written Opinion" dated Jul. 11, 2018, 16 pgs.
PCT/US2018/024807, "Notification of Transmittal of the International Preliminary Report on Patentability" mailed Sep. 18, 2019, 21 pages.
Herbert, S. et al., Analysis of Dynamic Voltage/Frequency Scaling in Chip-Multiprocessors, 2007, ACM, pp. 38-43.
Huang et al., "Grouping-Based Dynamic Power Management for Multi-Threaded Programs in Chip-Multiprocessors", 2009, IEEE, pp. 56-63. (Year: 2009).

\* cited by examiner

|  | Control Effort 520 | Number of active cores in set 540 | | DVFS State of cores in set 560 | | Power Limit 580 |
|---|---|---|---|---|---|---|
|  |  | Active E-Cores | Active P-Cores | E-core DVFS | P-core DVFS |  |
| 501 → | 0.9 | 2 | 2 | 4 | 4 | 10 |
| 502 → | 0.8 | 2 | 2 | 4 | 3 | 8 |
| 503 → | 0.7 | 2 | 2 | 4 | 2 | 7 |
| 504 → | 0.6 | 2 | 2 | 4 | 1 | 6 |
| 505 → | 0.5 | 2 | 1 | 4 | 1 | 5 |
| 506 → | 0.4 | 2 | 0 | 4 | 1 | 4 |
| 507 → | 0.3 | 2 | 0 | 3 | 1 | 3 |
| 508 → | 0.2 | 2 | 0 | 2 | 1 | 2 |
| 509 → | 0.1 | 2 | 0 | 1 | 1 | 1 |
| 510 → | 0.0 | 2 | 0 | 1 | 1 | 0.5 |

| | Current Core Type 1910 | Target Core Type 1920 | Scheduling Recommendation 1930 | Scheduling Event 1940 | Target Core Idle State 1950 | Interrupt Decision 1960 |
|---|---|---|---|---|---|---|
| 1901 → | P | E | P | Spill from P to E core | N/A | Deferred |
| 1902 → | E | P | P | Rebalance from E to P core | N/A | Immediate |
| 1903 → | P | E | E | Make Runnable | Idle | Deferred |
| | | | | | Not idle | Immediate |
| 1904 → | E | P | P | Make Runnable | N/A | Immediate |
| 1905 → | E | E | E | Make Runnable | Idle | Deferred |
| | | | | | Not idle | Immediate |
| 1906 → | P | P | P | Make Runnable | N/A | Immediate |

*Fig. 19*

SCHEDULER FOR AMP ARCHITECTURE USING A CLOSED LOOP PERFORMANCE AND THERMAL CONTROLLER

RELATED APPLICATIONS

This application claims priority of U.S. Provisional Patent Application No. 62/514,930 entitled "SCHEDULER FOR AMP ARCHITECTURE," to Jeremy C. Andrus, filed Jun. 4, 2017 and is incorporated by reference in its entirety to the extent that it is consistent with this disclosure.

The following U.S. Patent Applications are incorporated herein by reference, in their entirety, to the extent that they are consistent with this application:
(1) U.S. patent application Ser. No. 15/275,213 entitled, "PROCESSOR UNIT EFFICIENCY CONTROL," to John G. Dorsey, filed Sep. 23, 2016;
(2) U.S. patent application Ser. No. 14/576,963 entitled "METHOD AND APPARATUS FOR ACTIVITY BASED EXECUTION SCHEDULING," to James Michael Magee, filed Dec. 19, 2014; and
(3) U.S. patent application Ser. No. 14/732,266 entitled "SCHEDULER AND CPU PERFORMANCE CONTROLLER COOPERATION," to Russell A. Blaine filed Jun. 5, 2015.

TECHNICAL FIELD

This disclosure relates generally to the field of scheduling threads on a processor, and more specifically to a scheduler for an asymmetric multicore processor architecture.

BACKGROUND

A multi-core processor is a single computing component with two or more independent processing units called "cores." Cores are units that read and execute program instructions. The single processor can run multiple instructions on separate cores at the same time, increasing overall speed for programs amenable to parallel computing. The multiple cores may be incorporated onto a single integrated circuit. There are at two major types of multicore processors: symmetric multicore processors (SMP) and asymmetric multicore processors (AMP). A symmetric multiprocessor (SMP) includes two or more identical processors controlled by a single operating system instance that treats all processors equally, reserving none for special purposes. Symmetric multicore processors have a plurality of cores of a same core type. Asymmetric multicore processors have a plurality of cores which may be of a different architecture from one another. Each core may or may not run an operating system An AMP can have a first set of cores that is more efficient than a second set of cores. The second set of cores can be designed for performance. Efficiency is concerned with minimum energy consumed per instruction processed. Performance is concerned with maximum number of instructions processed per unit of time. In the prior art, to obtain efficiency, some cores would be set to idle or "dark" (shut down, not processing instructions). A substantial amount of time is required to bring a core back to a processing state, which can negatively affect performance.

In the prior art, when a system runs at high performance, and consumes a large amount of energy, a system may experience "battery droop" wherein the system may reset because there is not enough stored energy in, e.g., a storage cell or battery, to keep the system powered. In addition, in a portable device, which does have active heat mitigation, a system that is run in a performance mode for an extended period may become too hot to cool in a reasonable time, resulting in poor performance and overheating, and a poor user experience.

SUMMARY OF THE DESCRIPTION

Objects of the systems and methods described herein include controlling system performance using measurements of performance metrics of groups of threads to make joint decisions on scheduling of threads and dynamic voltage and frequency scaling (DVFS) state for one or more clusters of cores in a multiprocessing system having a plurality of core types and one or more core of each core type. The performance metrics are fed to a closed loop control system that produces an output that is used to jointly decide how fast a core is to run and on which core type the threads of a thread group are to run. A thread group comprises one or more threads that are grouped together based on one or more characteristics that are used to determine a common goal or purpose of the threads in the thread group. Objects of the systems and methods described herein include minimizing thread scheduling latency for performance workloads, ensuring that performance workloads consistently find a performance core, maximizing throughput for performance workloads, and ensuring that efficiency workloads always find an efficient core. Objects can further include ensuring that cores are not powered down when threads are enqueued for processing. An additional object is to offload performance workloads when performance cores are oversubscribed. Threads are systematically guided to cores of the correct type for the workload.

Systems and methods are disclosed for scheduling threads on a processor that has at least two different core types each having one or more cores of that type, and the scheduler can schedule threads between at least two different core types. Each of the core types can have a different dynamic voltage and frequency scaling (DVFS) state. The processor can be a symmetric multiprocessing system (SMP) having a plurality of cores of the same design, but a first cluster of cores is run in a first configuration and a second cluster of cores is run in a second configuration. The processor can be an asymmetric multiprocessing system (AMP) that has at least two different core types, such as one or more performance cores and one or more efficiency cores. Each core type can run at a plurality of selectable voltage and frequency settings and both core types can run simultaneously.

Threads of processes can be grouped together into a thread group of related threads. Thread groups, generally, are intended to group work together to achieve a common goal, purpose, or type of work. Based upon samples of execution metrics of threads in a thread group, a closed loop performance controller (CLPC) can generate a control effort that represents an amount of performance, or efficiency, that the thread group should receive to meet performance targets for the thread group. CLPC can determine, for each of a plurality of thread groups that have been active on a core of the processor, a control effort for the thread group. The control effort for each thread group can be mapped to a performance map that recommends a core type and dynamic voltage and frequency scaling (DVFS) state for the thread group based on the control effort computed for the thread group. From the active thread groups, a maximum DVFS state can be determined for all threads that were recommended for a core of a first type (e.g., a performance core). A maximum DVFS state can be determined for all active thread groups that were recommended for a second core type (e.g. efficiency core type). A scheduler can coordinate setting the DVFS state for each core type with the scheduling of threads in the active thread groups.

In an embodiment, control effort limiter (CEL) in CLPC can generate a control effort limit that can limit the control effort output from the CLPC. A control effort limit can be based upon a fast die temperature, a peak power consumed over a short period of time, an average power consumed over any of a plurality of power zones, a skin temperature of an exterior of a device, a count of hardware throttling events, or other control metrics.

Threads can initially be grouped into default thread groups, such as grouping together threads of an application, called a "coalition." A coalition is a grouping of closely related tasks/processes of an application which consist of threads, e.g. a web browser and application extensions associated with the web browser. Tasks can be combined into a single coalition by a launch services daemon, application programming interface (API), or framework. A thread group state is associated with each coalition. Thread grouping can be explicitly defined by a manual construct of a group of threads. Some types of workloads, e.g., an audio processing service, have complete knowledge of their organizations and can group threads accordingly. Threads can implicitly join thread groups by taking advantage of an existing kernel interaction. For example, when threads communicate via inter-process communication, they can optionally pass a voucher that references a thread group for the recipient to join. When a first thread wakes a second thread to do work on behalf of the first thread, the second thread can adopt the thread group of the first thread. When a first thread makes a second thread runnable, the second thread can adopt the thread group of the first thread. Threads can be grouped according to a type of work that the threads will perform as may be indicated by a daemon that launched the threads. An explicit thread grouping can be specified in source code, compiled code, or code packaged into a deliverable for installation. An explicit thread grouping for a work interval object can be specified in source code, compiled code, or a deliverable package for installation.

A work interval object (WIO) is an object that is used to represent periodic work where each period has a deadline. The WIO possesses a token and a specified time interval for one instance of the work. The WIO can be associated with a thread group. The thread group can either be created specifically for the WIO, or the WIO can be associated with an existing thread group. Threads that work to achieve a common purpose, intended to be performed within the specified time interval, can join the thread group of the WIO. A work interval object can be created when a user space process requests the work interval object via a specific system call. The kernel of an operating system can create the work interval object currently and automatically with a system call. By way of example, a work interval object may be, e.g., an object that represents one or more threads that composite multiple sources of audio and encode the audio for playback, all within a fixed period of time (work interval). A thread performing work having the purpose of the work interval object can opt into the work interval object thread group. Work performed by the opting-in threads is charged to the work interval object. A thread that receives a voucher containing a reference to a thread group may be grouped with the thread group referenced in the voucher. A voucher is a collection of attributes in a message sent via inter-process communication (IPC) from a first thread, T1, to a second thread, T2. One of the attributes that thread T1 puts in the voucher is the thread group to which T1 currently belongs. A second thread, T2, receives the IPC message from T1. As part of message reception, the voucher sent my T1 is "redeemed" (or adopted). Redeeming a voucher means processing all the attributes associated with the voucher and placing a pointer to the voucher on the thread. Thread T2 can now be considered to be running in the context of the voucher received from thread T1. As part of the action of "redeeming" a voucher, a voucher manager in the operating system kernel notices that thread T1 sent a thread group attribute in the voucher to thread T2, and the automatically joins thread T2 to the thread group specified in the voucher. After thread T2 has finished processing the message from thread T1, thread T1 can choose to discard the voucher. Discarding (or "dropping") the voucher causes thread T2 to leave thread T1's thread group and causes thread T2 to re-join its "home" thread group (the one associated with the task in which T2 is running). Before thread T2 drops the voucher, however, thread T2 can also pass along the same voucher to another thread/process thread T3. Because the voucher contains a thread group attribute which points to thread T1's thread group, when thread T3 receives the message from thread T2 and adopts/redeems the voucher, thread T3 joins T1's thread group. Thread T3 will then be a part of T1's thread group for as long as that voucher is adopted by thread T3. Both threads T2 and T3 will leave thread T1's thread group as soon as threads T2 and T3 drop the voucher. This can be repeated indefinitely. Because the kernel voucher manager controls the contents of a voucher, and vouchers are automatically sent as part of a basic inter-process communication mechanism, when two processes communicate the thread which handles/receives the message will automatically join the thread group of the process who sent the message. In an embodiment, the thread may be backdated to be grouped with the thread group referenced in the voucher, prior to being made runnable, e.g. at a time when the thread receives the voucher.

A scheduler for the processor can schedule threads of the thread groups in accordance with a recommended core type and recommended DVFS state for the thread group. The recommended DVFS for the core type may be increased by the CLPC finding the maximum DVFS state for the core type, over all of the thread groups that are active on the system. The recommended DVFS state may be limited by the control effort limiter (CEL), limiting the DVFS state and/or number of cores of a core type that will execute threads.

The core types can have an associated interrupt and interrupt timer that can be used to delay a thread from being executed under some conditions. For example, if a thread is eligible for running on a performance core, but there are no idle performance cores, then the thread may be scheduled for an efficiency core. A timer can be programmed for the thread and the thread can be delayed from running. If the timer expires, the interrupt is triggered, and the performance-eligible thread is run on an efficiency core. But, if a performance core becomes available for thread execution before the interrupt time expires, then the timer can be canceled and the thread can be executed on a performance core.

In a first embodiment, a method of running threads on a system having a processor that has a first cluster of one or more cores and a second cluster of one or more cores can include grouping threads of one or more processes into one or more thread groups. A first thread of a first thread group can be run on a core of the first cluster type. A plurality of thread execution metrics of the first thread can be incorporated with a plurality of thread execution metrics of the first thread group. A first control effort can be determined for the first thread group, based at least in part on samples of the plurality of thread group metrics. A first, or second, core type can be recommended for the first thread group type, and a DVFS state for the first thread group can be recommended. In an embodiment, the control effort can be mapped to a performance map of core clusters and DVFS states that are characterized by control effort. In an embodiment, the processor can comprise an asymmetric multiprocessing system (AMP) having a first core type of performance cores (P-cores) and a second core type of efficient cores (E-cores). A thread from a second group of threads can be executed, and performance metrics associated with execution of the second thread can be incorporated with execution metrics of the second thread group. A second control effort can be determined for the second thread group based at least in part on samples of the thread execution metrics of the second thread group. In response to determining that the first recommended core cluster for the first thread group and the second recommended core cluster for the second thread group are the same core cluster, a maximum DVFS state can be computed as the maximum of the first recommended DVFS state and the second recommended DVFS state, and the DVFS sate for the core cluster recommended for the first and second thread groups can be set to the computed maximum DVFS state. In response to determining that the first recommended core cluster for the first thread group and the second recommended core cluster for the second thread group are different core clusters, the DVFS state for the first recommended core cluster can be set to the first recommended DVFS state and the DVFS state for the second recommended core cluster can be set to the second recommended DVFS state. Thread execution metrics can be determined periodically or in response to an asynchronous event. Samples of thread group execution metrics can be inputs to tunable controllers of a CLPC for the thread group. Control effort can map to a recommended core type and DVFS state. If the control effort maps to an overlapping part of the performance map, wherein either a P-core or E-core could be recommended, then a scheduler or CLPC could determine whether to recommend P-cores or E-cores based at least in part on a type of the work that the threads perform. For example, graphics rendering may be recommended to P-cores. I/O operations may be recommended to E-cores. In an embodiment, a time that a thread group has been resident on a core type and/or DVFS state can be considered in determining a core type and/or DVFS state to recommend for the thread group. In an embodiment, wherein cores of a first type are oversubscribed, and cores of a second type are idle, a scheduler may schedule threads of a thread group that are eligible for the first core type for execution on the second core type. A core of the first type can detect that a thread eligible for execution on the first type of core is actually running on the second type of core, and a core of the first type is going idle (e.g., in the process of transitioning into an idle state). The thread can be run on the now-idle core of the first type.

In a second embodiment a method of grouping threads into thread groups is performed on a system comprising an asymmetric multi-core processor having a plurality of cores of at least two different core types. The method includes launching an application program comprising a plurality of processes and assigning each of the plurality of processes to a first thread group. In response to determining that a process in the plurality of processes causes a work interval object to be generated, threads of the process can be assigned to a second thread group, different from the first thread group. At least one thread from the first thread group is executed. A plurality of thread execution metrics of threads in the first thread group is determined, and a processor core type for threads of the first thread group is recommended to a scheduler, based at least in part on the thread execution metrics of the first thread group. In an embodiment, in response to determining that a thread in the plurality of threads causes a work interval object to be generated, the thread can be assigned to a second thread group, different from the first thread group. At least one thread from the second thread group is executed and a plurality of thread execution metrics of threads in the second group is determined. A processor core type for threads of the second thread group is recommended to the scheduler, based at least in part upon samples of the thread execution metrics of the second thread group. In an embodiment, the method can further include receiving an indication that a thread from the first thread group has opted-in to the second thread group, executing the thread that opted-in to the second thread group, and attributing to the second group a plurality of thread execution metrics of the thread from the first group that opted-in to the second thread group. In an embodiment, the method can also include receiving an indication that the thread from the first thread group that opted-in to the second thread group has opted-out of the second thread group, assigning the opted-out thread to the first thread group, executing the opted-out thread, and attributing to the first thread group a plurality of thread execution metrics of the thread that opted-out of the second thread group.

A method of grouping threads for execution on an AMP can include determining that the application indicates that a process in the plurality of processes is to be assigned to a third thread group different from the first and second thread groups, executing at least one thread from the third thread group, determining a plurality of thread execution metrics of threads in the third group, and recommending to the scheduler a processor core type for threads of the third thread group based at least in part upon samples of thread execution metrics of the third thread group.

A method of grouping threads for execution on an AMP can include determining a type of work that a process in the plurality of processes performs and assigning a thread of the process to a fourth thread group, executing at least one thread in the fourth thread group, determining a plurality of thread execution metrics of threads in the fourth group, and recommending to the scheduler a processor core type for threads of the fourth thread group based at least in part upon samples of thread execution metrics of the fourth thread group. The fourth thread group can include threads from a daemon.

A method of grouping threads for execution on an AMP can include, in response to determining that a thread from the first thread group has caused a thread in a fifth thread group to be woken up and/or made runnable by the scheduler, assigning the woken up/and or made runnable thread from the fifth thread group to the first thread group. The method can further include executing at least one thread, determining a plurality of thread execution metrics of threads in the first thread group, and recommending to the scheduler a processor core type for threads of the first thread group based at least in part upon samples of the thread execution metrics of the first thread group.

A method of grouping threads for execution on an AMP can include, in response to determining that a thread from the first thread group has received a voucher to perform work on behalf of another thread, the voucher indicating a sixth thread group, assigning the thread to the sixth thread group. The method can further include executing at least one thread from the sixth thread group, determining a plurality of thread execution metrics of threads of the sixth group, and recommending to the scheduler a processor core type for threads in the sixth thread group base at least in part upon thread execution metrics of the sixth thread group. The method can also include determining that the thread which received the voucher and performed work on behalf of another thread has completed performing the work on behalf of the other thread, and assigning the thread back to the first thread group.

A method of grouping threads for execution on an AMP can include launching an application program comprising a plurality of processes, assigning each of the plurality of processes to a first thread group, launching, by a daemon, at least one thread of a process in the first thread group, assigning, by the daemon, the at least one thread to a second thread group associated with a second daemon associated with the second thread group, executing at least one thread of the second thread group, determining a plurality of thread execution metrics of threads in the second thread group, and recommending to a scheduler a processor core type for threads of the second thread group based at least in part on samples of the thread execution metrics of the second thread group.

In a third embodiment, a method of processing work using a work interval object on an AMP can include creating a work interval object associated with a first thread group having a first thread group identifier. One or more threads associated with the work interval object can perform work toward a common goal of the work interval object within an identified interval of time. The method can also include receiving a request from a thread of a process associated with a second thread group having a second thread group identifier to adopt the first thread group identifier, attributing metrics of work performed by the thread to the first thread group identifier, in response to determining that the thread has adopted the first thread group identifier, and determining a processor core type to run one or more threads having the first thread group identifier based at least in part upon samples of metrics of work associated with the first thread group identifier. The work interval object can be instantiated in response to a call to a daemon or an operating system service. In an embodiment, the work interval object can be instantiated in response to a call by an application to an application programming interface (API) or framework. The method can further include receiving a request associated with the thread to opt out of the first thread group, and associating the thread with the second thread group. In an embodiment, the method can also include attributing metrics of work performed by the thread to the second thread group, and determining a processor type to run one more threads of the second thread group based at least in part upon samples of metrics of work associated with the second thread group identifier.

In a fourth embodiment, method of scheduling threads on a processor having a first cluster type having one or more cores and a second cluster type having one or more cores in a system that includes the processor, includes: determining a control effort limit for the processor and determining a DVFS state for at least one of the first cluster or second cluster of cores. The control effort limit can be used in conjunction with a power map that includes a plurality of DVFS states for each of the first and second cluster of core. The power map can be indexed by the control effort limit. A recommendation can be received that a thread scheduled for execution can be run on the at least one of the first or second cluster of cores at a DVFS state different than the DVFS state determined using the control effort limit. The DVFS state can be set for at least one of the first or second cluster of cores to the DVFS state determined using the control effort limit. In an embodiment, the method can further include determining that a total energy dissipated in the processor for a first predetermined period of time is greater than an instantaneous power target for the processor. The control effort limit for the processor is determined at least in part on the total energy dissipated in the processor for the first predetermined period. In an embodiment, the control effort limit can be reduced in response to determining one or more of: an average power consumed by the processor for a second period of time is greater than an average power target for the processor, or an average energy dissipated per instruction is greater than the predetermined efficiency threshold for a predetermined period of time. In an embodiment, the system can monitor a plurality of power zones, each having a low pass filter that includes a power target, a time constant, a power delta, and a filter algorithm. At a first time, the filtered power can be less than a power target for a power zone, less the power delta for the power zone. At a second time, that is later than the first time, the filtered power can exceed the target power for the power zone. In an embodiment, the system can continue to monitor and filter power for the power zone that exceeded its power target, less the power delta for the power zone. The control effort limit can continue to be reduced until the filtered power for the power zone tracks the target power for the power zone. In an embodiment, the control effort limit can be reduced in response to a measured or estimated current for the processor exceeding a current limit for a predetermined period of time, or a number of instructions blocked from execution exceeds a peak throttle rate target for the predetermined period of time, wherein a throttling that blocks the instructions is done by hardware. In an embodiment, a maximum control effort is determined based at least in part on a maximum fast die temperature limit for at least one of the first or second cluster of cores. In an embodiment, a core can be masked off from executing. In an embodiment, the rate at which cores can be masked off can be limited. The processor can comprise an AMP processor having a first core cluster of P-cords and a second core cluster of E-cores.

A processing system can include a processor having at least two core types and at least one core of each core type. The system can also have a temperature sensor for each core type. The system can also have a scheduler that includes a scheduling queue for each core type. A CLPC can determine a control effort for threads of a thread group, and recommend a core type and a DVFS state for threads of the thread group. A closed loop thermal management system can determine a control effort limit based at least in part on the temperature sensor for each core type. The system can comprise a system on a chip (SoC). One or both of the temperature sensors can be virtual sensors.

In a fifth embodiment, a method performed on a computing system having an asymmetric multiprocessing system (AMP) with a plurality of performance cores (P-cores) and a plurality of efficient cores (E-cores), can include determining that a thread, recommended for processing by a PC, is scheduled for processing by a PC of the AMP, and in response to determining that no P-cores are available for processing the thread and that an E-core is available for processing the thread: configuring a timer of an interrupt controller to generate an interrupt after expiration of a predetermined delay value. The method can further include, in response to determining, before the timer expires, that a PC is available to process the thread, canceling the interrupt, and processing the thread by the available PC. In an embodiment, the method can also include, in response to the timer expiring before a PC becomes available to process the thread: generating an interrupt to wake up an E-core and processing the thread by the E-core. The method can additionally include determining that a PC has become available, configuring a timer of the interrupt controller to generate an immediate interrupt to wake up the PC, generating the interrupt to wake up the PC, and processing the thread by the available PC.

A method of scheduling threads on an AMP processor can include determining that the thread has been recommended for processing by an E-core and that the thread is made runnable by a scheduler. In response to determining that an E-core is idle, configuring a timer of the interrupt controller to generate an immediate interrupt to wake up the E-core, otherwise configuring the timer interrupt controller to generate a delayed interrupt. The method can further include, in response to the interrupt controller generating an interrupt, waking up the E-core, and processing the thread by the E-core. The method can also include determining that the thread has been recommended for processing by a PC and that the thread has again been made runnable by the scheduler. The method can include configuring the timer of the interrupt controller to generate an immediate interrupt to wake up a PC. In response to the interrupt controller generating an interrupt, the method can include waking up the PC and processing the thread by the PC.

In an embodiment, a non-transitory computer readable can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 illustrates, in block form, a power map of a closed loop thermal and power management state table of a system for processing threads having thread groups on a processor comprising a plurality of core types each having one or more cores, according to some embodiments.

FIG. 19 illustrates an exemplary table of deferred inter-processor interrupt actions in a system for processing threads having thread groups on a processor comprising a plurality of core types each having one or more cores, according to some embodiments.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment. It should be noted that there could be variations to the flow diagrams or the operations described therein without departing from the embodiments described herein. For instance, operations can be performed in parallel, simultaneously, or in a different order that illustrated.

Figure 1:
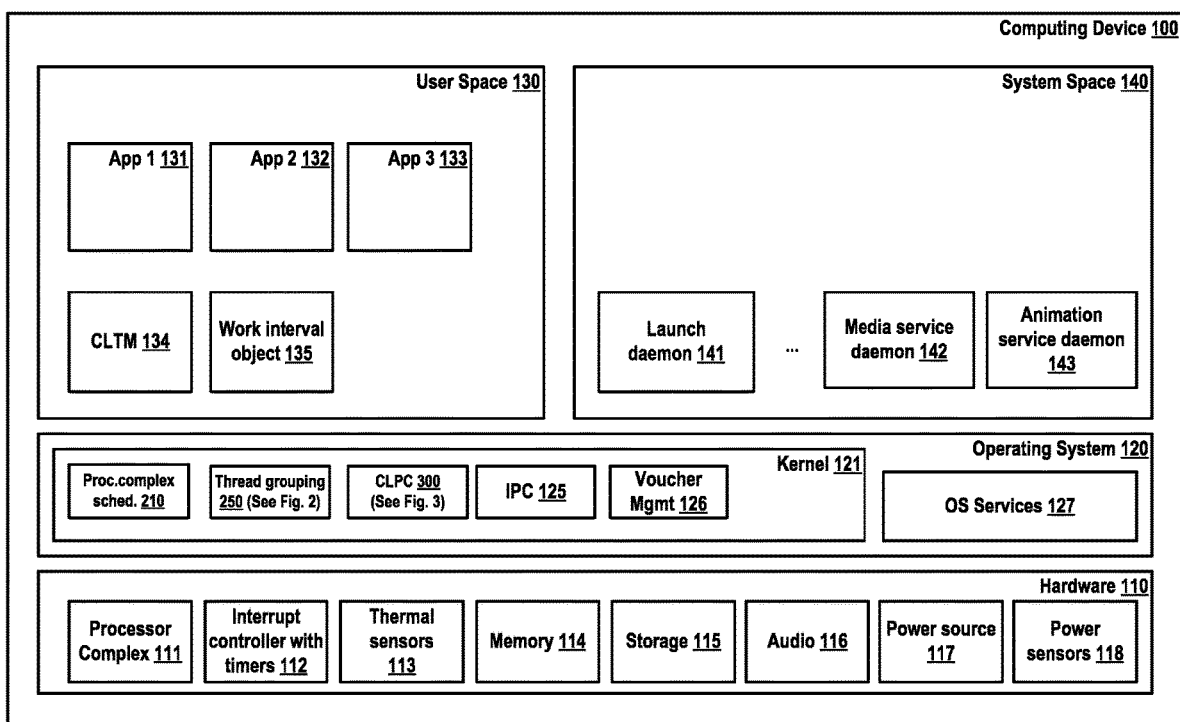
FIG. 1 illustrates, in block form, an overview of a system for processing threads having thread groups on a processor comprising a plurality of core types each having one or more cores, according to some embodiments.

FIG. 1 illustrates, in block form, an overview of a system 100 for processing threads having thread groups on a processor comprising a plurality of core types each having one or more cores, according to some embodiments. The system 100 can include hardware 110, operating system 120, user space 130, and system space 140 as described more fully below.

Hardware 110 can include a processor complex 111 with a plurality of core types or multiple processors of differing types. Processor complex 111 can comprise a multiprocessing system having a plurality of clusters of cores, each cluster having one or more cores of a core type, interconnected with one or more buses. Processor complex 111 can comprise a symmetric multiprocessing system (SMP) having a plurality of clusters of a same type of core wherein at least one cluster of cores is configured differently from at least one other cluster of cores. Cluster configurations can include, e.g., different configurations of DVFS states, different cache hierarchies, or differing amounts or speeds of cache. Processor complex 111 can additionally comprise an asymmetric multiprocessing system (AMP) having a plurality of clusters of cores wherein at least one cluster of cores has a different core type than at least one other cluster of cores. Each cluster can have one or more cores. Core types can include performance cores, efficiency cores, graphics cores, digital signal processing cores, and arithmetic processing cores. A performance core can have an architecture that is designed for very high throughput and may include specialized processing such as pipelined architecture, floating point arithmetic functionality, graphics processing, or digital signal processing. A performance core may consume more energy per instruction than an efficiency core. An efficient core may consume less energy per instruction than a performance core. In an embodiment, processor complex 111 can comprise a system on a chip (SoC) that may include one or more of the hardware elements in hardware 110.

Hardware 110 can further include an interrupt controller 112 having interrupt timers for each core type of processor complex 111. Interrupt controller 112 can be used, with interrupt timers, to implement deferred inter-processor interrupts (DIPI) as described more fully below with reference to FIG. 7 and FIGS. 18A, 18B, and 18C.

Hardware 110 can also include one or more thermal sensors 113. In an embodiment, wherein processor complex 111 comprises an SoC, one more thermal sensors 113 can be included in the SoC 111. In an embodiment, at least one thermal sensor 113 can be included on the SoC 111 for each core type of the processor complex 111. In an embodiment, a thermal sensor 113 can comprise a virtual thermal sensor 113. A virtual thermal sensor 113 can comprise a plurality of physical thermal sensors 113 and logic that estimates one or more temperature values at location(s) other than the location of the physical thermal sensors 113.

Hardware 110 can additionally include memory 114, storage 115, audio processing 116, one or more power sources 117, and one or more energy and/or power consumption sensors 118. Memory 114 can be any type of memory including dynamic random-access memory (DRAM), static RAM, read-only memory (ROM), flash memory, or other memory device. Storage can include hard drive(s), solid state disk(s), flash memory, USB drive(s), network attached storage, cloud storage, or other storage medium. Audio 116 can include an audio processor that may include a digital signal processor, memory, one or more analog to digital converters (ADCs), digital to analog converters (DACs), digital sampling hardware and software, one or more coder-decoder (codec) modules, and other components. Hardware can also include video processing hardware and software (not shown), such as one or more video encoders, camera, display, and the like. Power source 117 can include one or more storage cells or batteries, an AC/DC power converter, or other power supply. Power source 117 may include one or more energy or power sensors 118. Power sensors 118 may also be included in specific locations, such as power consumed by the processor complex 111, power consumed by a particular subsystem, such as a display, storage device, network interfaces, and/or radio and cellular transceivers. Computing system 100 can include the above components, and/or components as described with reference to FIG. 21, below.

Operating system 120 can include a kernel 121 and other operating system services 127. Kernel 121 can include a processor complex scheduler 705 for the processor complex 111. Processor complex scheduler 210 can include interfaces to processor complex 111 and interrupt controller 112 as described below with reference to FIG. 7. Kernel 121, or processor complex scheduler 210, can include thread group logic 250 that enables the closed loop performance controller (CLPC) to measure, track, and control performance of threads by thread groups. CLPC 300 can include logic to receive sample metrics from processor complex scheduler 705, process the sample metrics per thread group, and determined a control effort needed to meet performance targets for the threads in the thread group. CLPC 300 can recommend a core type and dynamic voltage and frequency scaling (DVFS) state for processing threads of the thread group. Inter-process communication (IPC) module 125 can facilitate communication between kernel 121, user space processes 130, and system space processes 140.

In an embodiment, IPC 125 can receive a message from a thread that references a voucher. A voucher is a collection of attributes in a message sent via inter-process communication (IPC) from a first thread, T1, to a second thread, T2. One of the attributes that thread T1 can put in the voucher is the thread group to which T1 currently belongs. IPC 125 can pass the voucher from a first thread to a second thread. The voucher can include a reference to a thread group that the second thread is to adopt before performing work on behalf of the first thread. Voucher management 126 can manage vouchers within operating system 120, user space 130, and system space 140. Operating system (OS) services 127 can include input/output (I/O) service for such devices as memory 114, storage 115, network interface(s) (not shown), and a display (not shown) or other I/O device. OS services 127 can further include audio and video processing interfaces, data/time service, and other OS services.

User space 130 can include one or more application programs 131-133, closed loop thermal management (CLTM) 134, and one or more work interval object(s) 135. CLTM 134 is described more fully, below, with reference to FIG. 2. CLTM 134 can monitor a plurality of power consumption and temperature metrics and feed samples of the metrics into a plurality of tunable controllers. The output of the CLTM 134 can determine a processor complex average power target used as input to a control effort limiter (CEL) 400 to determine a limit on a control effort that is output by CLPC 300. The control effort limit can be used to limit the type of cores, number of cores of each type, and DVFS state for the cores for the processor complex 111. A work interval object 135 is used to represent periodic work where each period has a deadline. The work interval object 135 possesses a token and a specified time interval for one instance of the work. Threads that perform work of a particular type, e.g. audio compositing, and the work must be completed in a specified interval of time, e.g. a frame rate of audio, can be associated with the work interval object 135. User space 130 can include a plurality of work interval objects 135. A work interval object 135 can have its own thread group, as may be specified in source code, compiled code, or a bundle of executables for execution. Threads that perform work on behalf of the work interval object 135 can opt-in to the thread group of the work interval object 135. For threads that have opted-in and adopted the thread group of the work interval object 135, work performed by the threads, on behalf of the work interval object 135, is associated with the thread group of the work interval object 135 for purposes of CLPC 300 operation.

System space 140 can include a launch daemon 141 and other daemons, e.g. media service daemon 142 and animation daemon 143. In an embodiment, threads that are launched by a daemon that perform a particular type of work, e.g. daemons 142 and 143, can adopt the thread group of the daemon. Execution metrics of a thread that adopted the thread group of the daemon that launched the thread are attributable to the thread group of the daemon for purposes of CLPC 300 operation.

Figure 2:
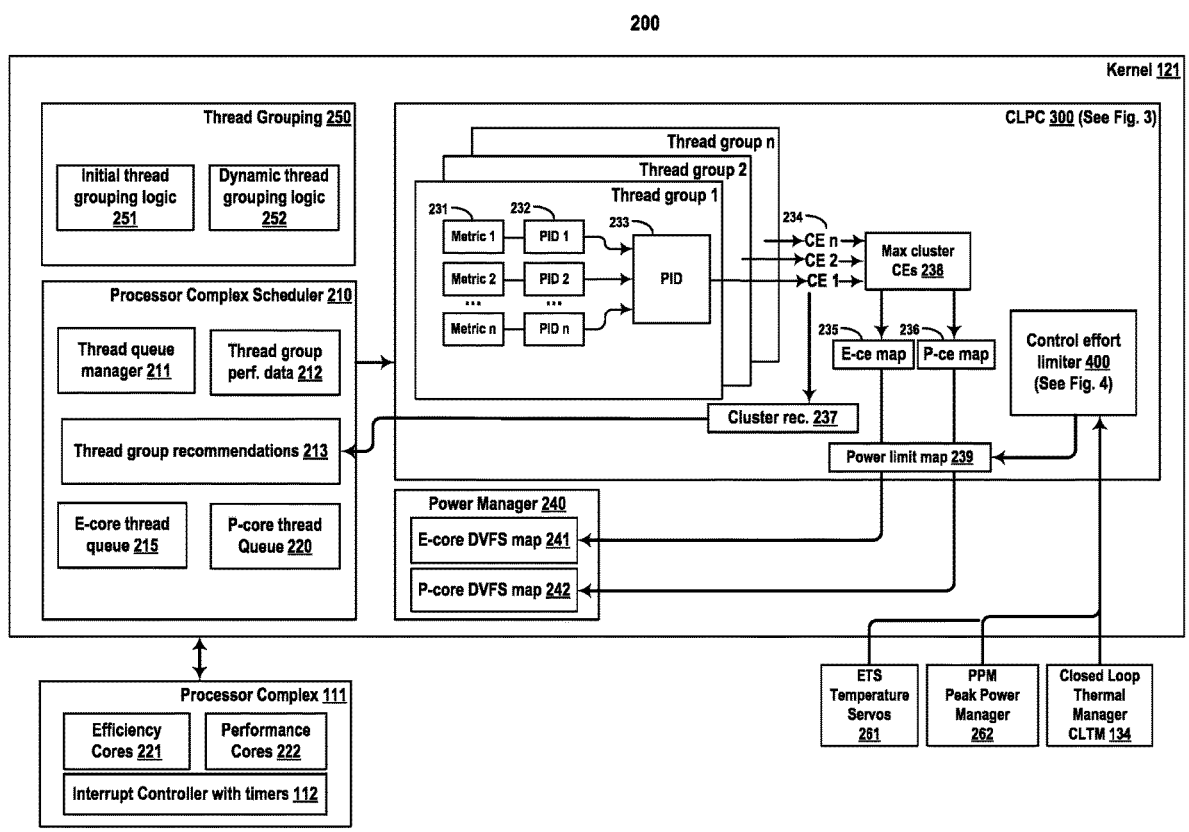
FIG. 2 illustrates, in block form, a detailed view of a system for processing threads having thread groups on a processor comprising a plurality of core types each having one or more cores, according to some embodiments.

FIG. 2 illustrates, in block form, a detailed view of a system 200 for processing threads having thread groups on a processor complex comprising a plurality of core types each having one or more cores, according to some embodiments. A thread group comprises one or more threads that are grouped together based on one or more characteristics that are used to determine a common goal or purpose of the threads in the thread group. FIG. 2 describes, at a high level, the interaction between subsystems described above, with reference to FIG. 1.

System 200 can include a kernel 121 that is part of an operating system, such as operating system 120 of FIG. 1. Kernel 121 can include processor complex scheduler 210, thread grouping logic 250, closed loop performance control (CLPC) 300, and power manager (PMGR) 240. A processor or CPU, such as processor complex 111 of FIG. 1, can interface to kernel 121 and subsystems of kernel 121. A closed loop thermal manager (CLTM) 134 can interface with CLPC 300 to provide a processor complex average power target temperature that is used by CLPC 300 to modify or limit recommended processor core types and/or dynamic voltage and frequency scaling (DVFS) states for one or more processor core types. In an embodiment, CLTM 134 can execute in user process space 130 or system space 140, as shown in FIG. 1.

Processor complex 111 can comprise a plurality of processor core types of an asymmetric multiprocessing system (AMP) or a symmetric multiprocessing system (SMP). In an AMP, a plurality of core types can include performance cores (P-cores) and efficiency cores (E-cores). In an SMP, a plurality of cores types can include a plurality of cores configured in a plurality of different configurations. Processor complex 111 can further include a programmable interrupt controller (PIC) 112. In an embodiment, PIC 112 can have one or more programmable timers that can generate an interrupt to a core at a programmable delay time. In an embodiment, PIC 112 can have a programmable timer for the processor complex 111. In an embodiment, PIC 112 can have a programmable timer for each core type in the processor complex 111. For example, PIC 112 can have a programmable timer for all P-cores 222 and another programmable timer for all E-cores 222. In an embodiment, PIC 112 can have a programmable timer for each core of each core type.

Processor complex scheduler 210 can include a thread queue manager 211, thread group performance data manager 212, thread group recommendation manager 213, and a plurality of thread queues for each of a plurality of processor core types. In an example processor complex 111, processor complex scheduler 210 can have an E-core thread queue 215 and a P-core thread queue 220.

Processor complex scheduler 705 thread queue manager 211 can manage the scheduling of threads for each of the plurality of cores types of processor complex 111, e.g., E-core thread queue 215 and P-core thread queue 220. Thread queue manager 211 can further include logic to program interrupt controller 223 for immediate and/or deferred interrupts.

Thread group performance data manager 212 of the processor complex scheduler 210 can collect thread execution metrics for each of a plurality of thread groups executing on processor complex 111. A plurality of thread execution metrics 231 can be sampled from the collected thread execution metrics of thread group performance data manager 212 and provided to a plurality of tunable controllers 232 of CLPC 300 for each thread group. Tunable controllers 232 can be proportional-integral-derivate (PID) controllers. A PID controller has an output expressed as:

$$u(t) = K_P e(t) + K_i \int_0^t e(\tau)d\tau + K_d \frac{de(t)}{d(t)},$$

where $K_P$ is the proportional gain tuning parameter, $K_i$ is the integral gain tuning parameter, $K_d$ is the derivative gain tuning parameter, e(t) is the error between a set point and a process variable, t is the time or instantaneous time (the present), and τ is the variable of integration which takes on values from time 0 to the present time t.

Processor complex scheduler 210 thread group recommendation manager 213 can receive core type (cluster) recommendations from CLPC cluster recommendations 237 for each thread group that has been active on processor complex 111. Processor complex scheduler 210 thread queue manager 211 can utilize the cluster recommendations 237 for each thread group to program threads of each thread group onto an appropriate core type queue, e.g. 215 or 220.

CLPC 300 is a closed loop performance controller that determines, for each thread group active on a core, a control effort needed to ensure that threads of the thread group meet their performance goals. A performance goal can include ensuring a minimum scheduling latency, ensuring a block I/O completion rate, ensuring an instruction completion rate, maximizing processor complex utilization (minimizing core idles and restarts), and ensuring that threads associated with work interval objects complete their work in a predetermined period of time associated with the work interval object. Metrics can be periodically computed by CLPC 300 from inputs sampled by CLPC 300 either periodically or through asynchronous events from other parts of the system. In an embodiment, inputs can be sampled at an asynchronous event, such as the completion of a work interval object time period, or a storage event. A plurality of performance metrics 231 can be computed within CLPC 300 and each fed to a tunable controller 232. Tunable controllers 232 generate an output to a tunable thread group PID 233, which in turn outputs a control effort 234 needed for the thread group to meet its performance goals.

In an embodiment, a control effort 234 is a unitless value in the range 0 . . . 1 that can be mapped to a performance map and used to determine a recommended core cluster type 237 for the thread group. The cluster recommendations 237 are returned to thread group manager 213 in processor complex scheduler 705 for scheduling threads to core types. For each of thread groups 1 . . . n, a control effort CE 1 . . . n 234 collected by a cluster maximum control effort module 238. Cluster maximum control effort module 238 determines a maximum control effort value for all control efforts CE 1 . . . n 234 for each cluster type. Maximum control effort module 238 outputs maximum control effort for each cluster type to a respective cluster type mapping function, e.g. E-ce map 235 and P-ce map 236. E-ce map 235 determines a dynamic voltage and frequency scaling (DVFS) state for E-cores based upon the maximum E-cluster control effort output from maximum control effort module 238. Similarly, P-ce map 236 determines a DVFS state for P-cores based upon the maximum P-cluster control effort output from maximum control effort module 238. These respective maximum DVFS states may be limited by an output of control effort limiter (CEL) 400 of CLPC 300. Control effort limiter 400 is described further, below, with reference to FIG. 4A. Power limit map 239 receives the maximum P-cluster and E-cluster DVFS states, and receives the control effort limit from CEL 400, and maps a control effort limit from CEL 400 to a DVFS state for each core type. CEL 400 may also limit a number of each type of core that can execute by masking off certain cores. Power limit map 239 outputs the DVFS state for each core type to power manager 240 to set the DVFS state, and number of active cores in an E-core DVFS map 241 and P-core DVFS map 242.

Control effort limiter 400 can receive input from a plurality of temperature control loops 261, a peak power manager 262, and a closed loop thermal manager (CLTM) 134. Control effort limiter 400 is described below with reference to FIGS. 4A and 4B.

Figure 3:
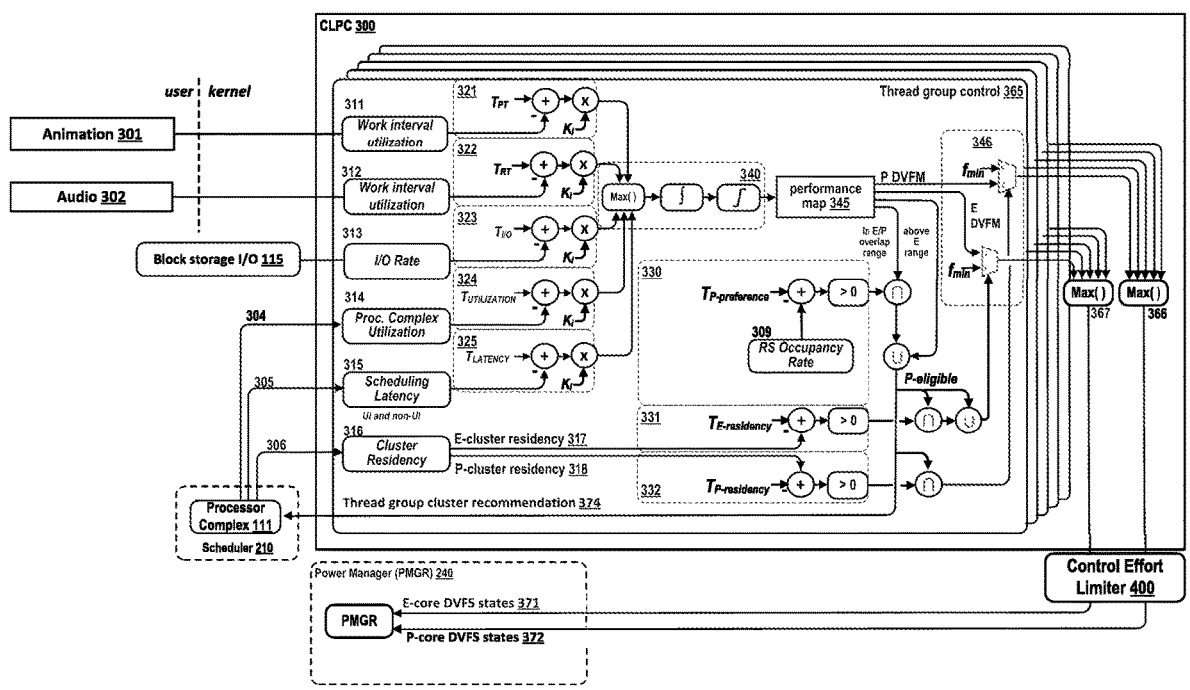
FIG. 3 illustrates, in block form, components of a closed loop performance control system of a system for processing threads having thread groups on a processor comprising a plurality of core types each having one or more cores, according to some embodiments.

FIG. 3 illustrates, in block form, components of a closed loop performance control (CLPC) system 300 of a system for processing threads having thread groups on a processor comprising a plurality of core types each having one or more cores, according to some embodiments. For each of a plurality of thread groups 365 that have been active on a core, CLPC 300 can receive a sample of each of a plurality of performance metrics. An 'input' into CLPC 300 denotes information obtained by CLPC 300 either by periodically sampling the state of the system or through asynchronous events from other parts of the system. A 'metric' is computed within CLPC 300 using one or more inputs and could be fed as an input to its tunable controller and controlled using a tunable target. A metric is designed to capture a performance trait of a workload. Input sources can include, e.g., animation work interval object (WIO) 301, audio WIO 302, block storage I/O 115, and processor complex 111. A brief description of example metrics from the input sources follows:

Work Interval Utilization 311 and 312

Many workloads are targeted towards a user-visible deadline, such as video/audio frame rate, for example. The processor complex 111 performance provided for such workloads needs to be sufficient to meet the target deadlines, without providing excess performance beyond meeting the respective deadlines, which is energy inefficient. Towards this end, for each video/audio frame (work interval), CLPC 300 receives timestamps from audio/rendering frameworks about when the processor complex 111 started working on the frame (start), when the processor complex 111 stopped working on the frame (finish) and what is the presentation deadline for the frame (deadline). CLPC 300 computes work interval utilization 311 or 312 for the frame as (finish−start)/(deadline−start). The work interval utilization is a measure of the proximity to the deadline. A value of 1.0 would indicate 'just' hitting the deadline. However, since the processor complex 111 is not the only agent in most workloads and dynamic voltage and frequency scaling (DVFS) operating points are discrete, and not continuous, a goal is to provide enough performance to meet the deadline with some headroom, but not so much headroom as to be energy inefficient.

Work interval-based control is reactive in nature. Hence, it is susceptible to offering a poor transient response when there is a sudden increase in the offered processor complex 111 load (for example, a frame that is inordinately more complex than the last 'n' frames). To achieve a degree of proactive response from the CLPC 300, video/audio APIs allow higher level frameworks to interact with CLPC 300 as soon as a new frame starts being processed and convey semantic information about the new frame such as its complexity. Work interval utilization metric 311 is fed to tunable controller 321 having a target $T_{PT}$. A difference between $T_{PT}$ and the work interval utilization metric 311 is determined and multiplied by a tuning constant, $K_i$, for the tunable controller 321. Similarly, work interval utilization metric 311 is fed to tunable controller 322 having a target $T_{RT}$. A difference between $T_{RT}$ and the work interval utilization metric 312 is determined and multiplied by a tuning constant $K_i$, for the tunable controller 322.

I/O Transaction Rate 313

An input/output (I/O) bound workload, such as block storage I/O 115, interacts heavily with non-processor complex subsystems such as storage or a network. Such workloads typically exhibit low processor complex utilization and might appear uninteresting from a processor complex performance standpoint. However, the critical path of the workload includes some time spent on the processor complex 111 for managing meta-data or data going to or from the non-processor complex subsystem. This is typically time spent within kernel drivers such as a Block Storage Driver (for storage) and Networking Drivers (e.g. for Wi-Fi/mobile-data transfers). Hence processor complex 111 performance can become a bottleneck for the I/O. The I/O rate metric computes the number of I/O transactions measured over a sampling period and extrapolates it over a time period, e.g. one second. I/O rate metric 313 is fed to tunable controller 323 having a target $T_{I/O}$. A difference between $T_{I/O}$ and the I/O rate metric 313 is determined and multiplied by a tuning constant, $K_i$, for the tunable controller 323.

Processor Complex Utilization 314

Processor complex scheduler 210 can accumulate statistics that measure processor complex utilization 304, scheduling latency 305, and cluster residency 306. Processor complex utilization 304 can measure an amount, such as a percentage, of utilization of the processor complex cores that are utilized over a window of time. The measured or computed value for processor complex utilization 304 can be sampled and be fed as a metric to processor complex utilization 314. A purpose of the processor complex utilization metric 314 is to characterize the ability of a workload to exhaust the serial cycle capacity of the system at a given performance level, where the serial cycle capacity examines the utilization of the processor complex as a whole. For each thread group, CLPC 300 can periodically compute the processor complex utilization metric 314 as (time spent on core by at least a single thread of the group)/(sampling period). The processor complex utilization metric 314 can be defined as a "running utilization", i.e., it only captures the time spent on-core by threads. Processor complex utilization metric 314 can be sampled or computed from metrics provided by the processor complex scheduler 210. The processor complex scheduler 210 can determine a portion of time during a sample period that thread(s) from a thread group were using a core of the processor complex 111. Processor complex utilization metric 314 is fed to tunable controller 324 having a target $T_{UTILIZATION}$. A difference between $T_{UTILIZATION}$ and the processor complex utilization metric 314 is determined and multiplied by a tuning constant, $K_i$, for the tunable controller 324.

In an embodiment, the "runnable utilization" of a thread group can be measured, which is computed through the time spent in a runnable state (running or waiting to run) by any thread of the group. This has the advantage of capturing thread contention for limited processor complex cores; a thread group that spends time waiting for processor complex 111 access will exhibit higher runnable utilization. Considering thread contention takes into account the period in which a thread is able to be run, relative to the amount of time in which the thread is running. When a large number of threads are contending for access to processor cores, threads will spend a larger amount of time in a runnable state before going on-core.

Performing closed loop control around the processor complex utilization metric 314 for a thread group will give higher execution throughput to this thread group once it eventually goes on-core, the idea being to try and pull in the completion time of the threads of the thread group to better approximate what they would have been in an un-contended system.

Thread Scheduling Latency 315

Scheduling latency 305 can measure an amount of latency that threads in a thread group experience between a time that a thread of a thread group is scheduled and the time that the thread is run on a core of the processor complex 111. Scheduling latency 305 can be sampled for a window of time for a thread group and provided to CLPC 300 as a scheduling latency metric 315. In one embodiment, thread scheduling latency metric 315 serves as a proxy for the runnable utilization of a thread group if runnable utilization cannot be directly determined from the processor complex 111. Scheduling latency metric 315 can be provided by the processor complex scheduler, e.g. processor complex scheduler 210 of FIG. 2. The processor complex scheduler 210 can determine when a thread of a thread group went on core, then off core. For all threads in the thread group, processor complex scheduler 210 can determine how much time the thread group spent running on cores. For each sampling period, CLPC 300 can measure the maximum scheduling latency experienced by threads of a thread group. This input can be filtered using an exponentially-weighted moving average filter since CLPC 300 samples the system at a faster rate than the scheduling quantum. Performing closed loop control around the thread scheduling latency metric 315 gives CLPC 300 the flexibility of providing a different response for potential on-core activity compared to actual on-core activity. Thread scheduling latency metric 315 is fed to tunable controller 325 having a target $T_{LATENCY}$. A difference between $T_{LATENCY}$ and the scheduling latency metric 315 is determined and multiplied by a tuning constant, $K_i$, for the tunable controller 325.

Each of the above metrics 311-315 can be fed to a tunable controller, e.g. 321-325 that outputs a contribution to a control effort for threads of the thread group. Each tunable controller, e.g. 321-325, can have a target value, e.g., $T_{PT}$ for working interval utilization 311, and a tuning constant $K_i$. An integrator 340 sums the contributions and generates a unitless control effort for the thread group in the range of 0 . . . 1 that is used as an index into a performance map 345.

Cluster Residency 316

Cluster residency 306 can measure an amount of time that threads of a thread group are resident on a cluster of cores, such as E-cores or P-cores. Cluster residency 306 can be sampled for a window of time for a thread group and provided as a metric to cluster residency metric 316. In an embodiment, cluster residency metric 316 can have sample metric for each of one or more cluster of core types, such as E-cores and P-cores. In an embodiment, cluster residency metric 316 comprises E-cluster residency metric 317 and P-cluster residency metric 318, and RS Occupancy Rate metric 309. E-cluster residency metric 317 is a measure of an amount of time that a thread group executes on a cluster of efficiency cores. P-cluster residency metric 318 is a measure of an amount of time that a thread group executes on a cluster of performance cores. RS Occupancy Rate metric 309 is a measure of reservation station occupancy, which is a measure of how long a workload waits in a ready state before being dispatched to a processor pipeline. Control effort for cluster residency for a thread group can be determined from cluster residency metric 316, including E-cluster residency metric 317 and P-cluster residency metric 318, and RS Occupancy rate 309, by feeding the metrics 316 through 318 to controllers 330 through 332, respectively.

The CLPC 300 output is a control effort, an abstract value on the unit interval that expresses the relative machine performance requirement for a workload. The control effort is used as an index into a performance map 345 to determine a recommended cluster type and dynamic voltage and frequency scaling (DVFS) state for the thread group. The recommended DVFS state for E-cores for each of a plurality of thread groups that have been active on a core, is input into a Max( ) function 367 to determine a recommended maximum DVFS state for E-cores. The recommended DVFS state for P-cores for each of a plurality of thread groups that have been on a core is input into a Max( ) function 366 to determine a recommended maximum DVFS for P-cores. The maximum DVFS state recommended for E-cores (output from Max( ) function 367) and the maximum DVFS state recommended for P-cores (output from Max( ) function 366) is sent to control effort limiter (CEL) 400 to determine whether the recommended DVFS states for P-cores and E-cores should be limited. Recommended DVFS states may be limited to reduce heat and/or to conserve power. CEL 400 outputs, to power manger 240, a DVFS state for each cluster of cores, e.g. E-cores DVFS states 371 and P-core DVFS states 372. In an embodiment, DVFS states 371 and 372 can include a bit map that can mask off one or more cores of a cluster, based on control effort limiting by CEL 400. CEL 400 is described below with reference to FIG. 4A and FIG. 4B.

Figure 4A:
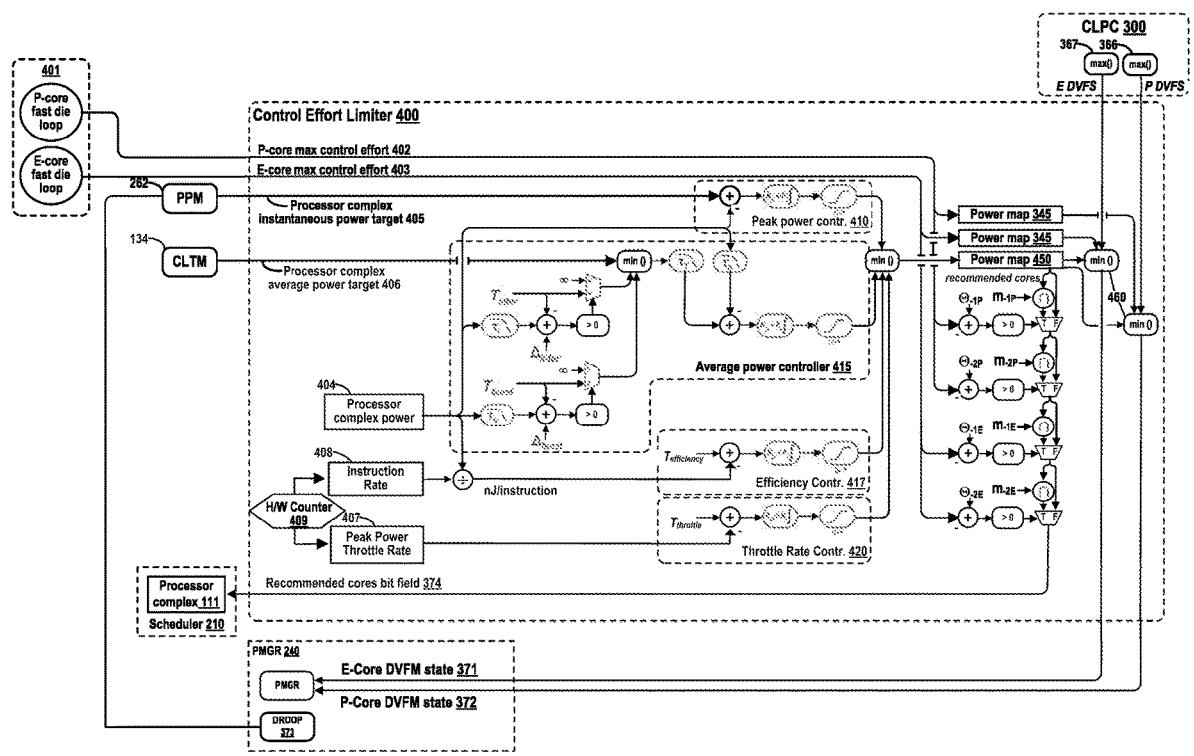
FIG. 4A illustrates, in block form, components of a closed loop thermal and power management control system of a system for processing threads having thread groups on a processor comprising a plurality of core types each having one or more cores, according to some embodiments.

FIG. 4A illustrates, in block form, components of a control effort limiter (CEL) 400 of a system for processing threads having thread groups using a processor complex comprising a plurality of clusters of core types, each cluster having one or more cores, according to some embodiments. CEL 400 can be incorporated into CLPC 300 to limit the control effort result output from CLPC 300. CEL 400 utilizes a plurality of power and temperature inputs, processor inputs, and power targets, fed into a plurality of controllers to determine a control effort limit to apply to the recommended DVFS states for a plurality of cores that are determined by CLPC 300.

Control effort limiter 400 can receive input from a fast-die thermal management control loop 401. Each cluster of cores of a type, e.g. E-cores and P-cores, can have a fast die temperature sensor that is fed into a closed loop thermal controller that is closed around a cluster of cores to regulate the temperature to a target. The fast-die thermal management control loop 401 outputs a maximum control effort for each core type that is input to CEL 400. In an embodiment, fast-die thermal management control loop 401 outputs a P-core maximum control effort 402 and an E-core maximum control effort 403.

Peak power manager (PPM) 262 can set a processor complex instantaneous peak power target 405 that is input to peak power controller 410 of CEL 400. PPM 262 can measure current consumed at the processor complex 111. PPM 262 can receive a signal from power manager (PMGR) 240 indicating that the power source, e.g. battery, indicating whether there is insufficient energy supply ("droop") 373 to meet the demand for current at the processor complex 111. PPM 262 produces a processor complex instantaneous power target 405 to limit the amount of current consumed by the processor complex 111 in response to the signal of insufficient energy supply (droop 373) from PMGR 240. A state of a power source 117, e.g. a battery, can limit or constrain the output of the signal from PMGR 240, such as when the battery is too cold or has experienced a number of charging cycles beyond the rating of the battery, indicating that there may be insufficient energy supply to meet the demand for current at processor complex 111. Embodiments of a Peak Power Manager 262 are described in U.S. Provisional Patent Application 62/557,067, entitled, "COMPONENT POWER CONSUMPTION MANAGEMENT DETERMINING WHETHER THE POWER AVAILABILITY OF THE POWER SOURCE EXCEEDS THE EXPECTED POWER CONSUMPTION," to Michael Eng, et al., filed Sep. 11, 2017, which is hereby incorporated by reference in its entirety to the extent that it is consistent with this disclosure.

Closed loop thermal manager (CLTM) 134 can feed measurements from one or more thermal sensors into a plurality of tunable closed loop controllers to determine a processor complex average power target 406 that is input to a controller 415 of CEL 400 to determine a control effort limit on the control effort output from CLPC 300. Controller 415 is described below with reference to FIG. 4B.

Processor complex power 404 can be measured using a power sensor, e.g. 118 of FIG. 1, that measures power to processor complex 111. Hardware counter 409 can measure a number of instructions executed during a period of time to generate an instruction rate 408. Instruction rate 408 can be determined from the hardware counter 409 value divided by a duration of a time period. Peak power throttle rate 407 can be determined from a number of automatically blocked hardware instructions that throttle peak power divided by the duration of a time period.

Control Effort Limiter 400

Peak power controller 410 receives a processor complex instantaneous power target 405 from peak power manager (PPM) 262 and a processor complex power 404 as inputs. To avoid battery voltage droop 373 that can induce unexpected system shutdowns, peak power manager 262 limits processor complex power under certain physical conditions (e.g., low temperature, low battery state of charge, high cell impedance). It does this by setting a processor complex instantaneous power target 405, which is observed in one of several ways. In one embodiment, the power target 405 is used as the control target in a loop (e.g., proportional-integral control) closed around a measurement or estimate of total energy dissipated in the processor complex 111 (e.g., processor complex power 404). In another embodiment, the power target 405 is used to search a pre-characterized table of worst-case workload powers in each processor complex core type DVFS state. The latter method is conservative in delivered performance for workloads that are not worst-case. The output of either embodiment is a control effort limit that indexes into a power map 450 that is global for the entire processor complex 111 (described below). The processor complex instantaneous power target input 405 is asynchronous with respect to the periodic updates of the power limiting control system, and changes at a time scale of hundreds of milliseconds or more.

Figure 4B:
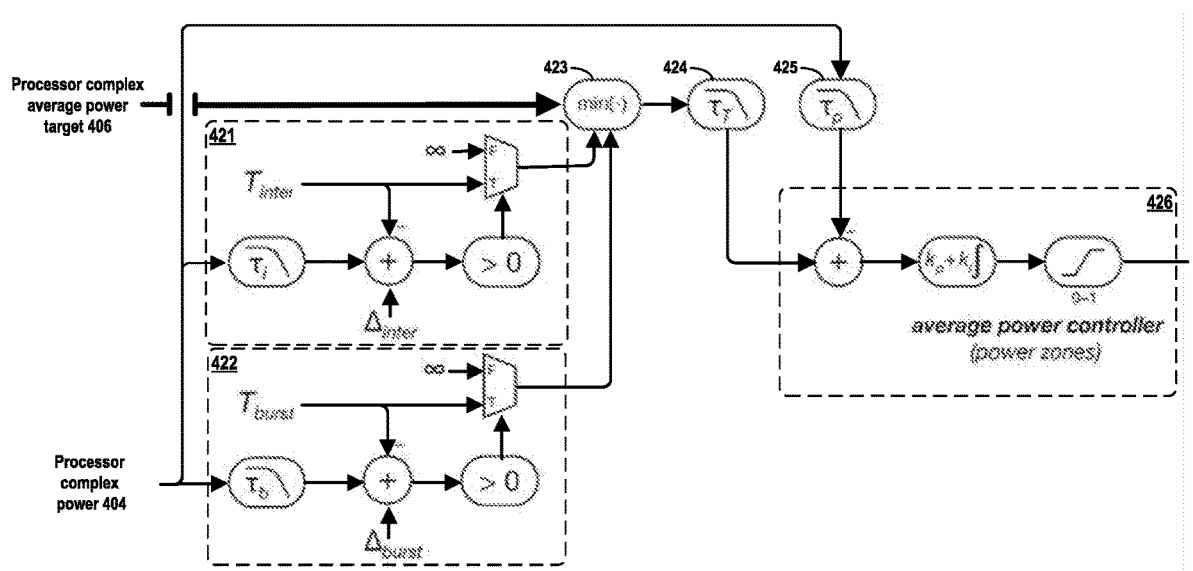
FIG. 4B illustrates, in block form, a detailed view of an average power controller of a closed loop thermal and power management control system of a system for processing threads having thread groups on a processor comprising a plurality of core types each having one or more cores, according to some embodiments.

Average power controller 415 is described below with reference to FIG. 4B.

Efficiency controller 417. To allow the system to satisfy battery life goals, the amount of energy dissipated per retired instruction is limited to an efficiency target, $T_{EFFICIENCY}$. $T_{EFFICIENCY}$ is the control target for a loop (e.g., proportional-integral control) closed around a measure of efficiency expressed in nanojoules (nJ) per instruction. The efficiency metric is calculated by first determining the number of instructions retired during a sample interval (as reported by processor complex performance counters) and dividing this number by the amount of energy dissipated in the processor complex 111 (using a measurement or estimate of processor complex power) over that interval. The output of the closed-loop efficiency controller 417 is a limit control effort that indexes into a power map 450 that is global for the entire processor complex (described below). The efficiency metric is sampled synchronously with respect to the periodic updates of the power limiting control system.

Throttle rate controller 420: To prevent voltage droops in the processor complex power delivery network (i.e., between the processor complex voltage regulator and the processor complex 111), an automatic hardware throttle mechanism blocks instruction or micro-operations issued (i.e., from reservation stations into execution pipelines) when measured or estimated processor complex current exceeds a limit. This peak power throttle reduces the rate at which the processor complex executes work, but it does not reduce processor complex frequency or voltage. As a result, it can be inefficient to complete a significant amount of work with the throttle engaged; efficiency is improved by lowering the processor complex core type DVFS state. The maximum rate of throttle assertion is limited to a throttle rate target, $T_{THROTTLE}$. This is the control target for a loop (e.g., proportional-integral control) closed around a measure of throttle assertions expressed in blocked issue slots per processor complex cycle. The throttle rate metric is calculated by first determining the number of issue slots that were blocked during a sample interval (as reported by processor complex performance counters) and dividing this number by the number of cycles clocked by the processor complex (again, as reported by processor complex performance counters) over that interval. The output of the closed-loop controller is a limit control effort that indexes into a power map that is global for the entire processor complex (described below). The throttle rate metric is sampled synchronously with respect to the periodic updates of the power limiting control system.

Average power controller 415 is described with reference to FIG. 4B. To manage enclosure ("skin") temperatures to customer satisfaction targets, a closed-loop thermal management CLTM system 134 limits processor complex power under certain physical conditions (e.g., high measured or modeled temperatures at various locations throughout the product). The CLTM system 134 limits processor complex power by setting an average power target 406, which is combined with one or more power zone targets, e.g. 421 and 422, to determine the control target for a loop (e.g., proportional-integral control) closed around a low-pass-filtered measurement or estimate of total energy dissipated in the processor complex cores. The power zones 421 and 422 provide proactive limiting of the processor complex in advance of the point at which power must be reduced in order to sustain an enclosure temperature target; this allows for more graceful performance degradation during high-power workloads. Each power zone 421 and 422 consists of a power low-pass filter (whose input is the measured or modeled processor complex power), a power target T and a target offset Δ. Different filter time constants T allow for different power targets to be configured over different time scales. When the filtered power exceeds the quantity (T−Δ), the power zone becomes active and contributes its target T to the overall control target calculation, which is the minimum of all active power zone targets T and the average power target (supplied by the thermal manager), low-pass filtered for smooth transitions. The output of the closed-loop controller is a limit control effort that indexes into a power map that is global for the entire processor complex (described below). The average power target input is asynchronous with respect to the periodic updates of the power limiting control system, and changes at a time scale of ones of seconds.

Some power limiting structures update asynchronously at a time scale of ones of milliseconds. These structures have response latency requirements that are faster than the periodic updates of the power limiting control system.

Returning to FIG. 4A, for each subset of processor complex cores that share an instantaneous DVFS state (i.e., processor complex core types having a common voltage regulator and PLL), there is at least one die temperature sensor feeding a fast die temperature controller. This fast die controller 401 manages its processor complex subset to a die temperature target by setting a maximum control effort, which indexes into a processor complex subset power map 345 that is unique to the subset. The output of the map is a maximum DVFS state for the processor complex subset, which limits the DVFS state request produced by the thread group performance controllers.

The P-core maximum control effort, received from fast-die temperature controller 401, can be used to index into power map 345 to determine a DVFS state for P-cores. The E-core maximum control effort, received from fast-die temperature controller 401, can be used to index into power map 345 to determine a DVFS state for E-cores. A minimum control effort, min( ) can be determined of the control efforts from each of peak power controller 410, average power controller 426, efficiency controller 417, and throttle rate controller 420. The minimum control effort can be mapped to power map 450 to determine a DVFS state for each core type. CLPC 300 outputs a maximum of recommended DVFS state for each core type, which is then limited 460 by the minimum of: the DVFS state for each core type recommended by the CLPC and the maximum DVFS state permitted by the control effort limit 400.

The limited 460 maximum control effort is also compared against thresholds at which cores within the processor complex subset are de-recommended to the processor complex scheduler 210. When the maximum control effort falls below a threshold Θ (e.g., $\Theta_{-1P}$, $\Theta_{-2P}$, $\Theta_{-1E}$, $\Theta_{-2E}$) one or more bits are cleared in the recommended cores bitfield 374 that is presented to the processor complex scheduler. The processor complex scheduler is described further below.

FIG. 5 illustrates, in block form, power map 500 of a closed loop thermal and power management subsystem in a system for processing threads having thread groups on a processor comprising a plurality of core types each having one or more cores, according to some embodiments.

Power Map 500

The output of the closed-loop controllers of the CLPC 300 as limited by control effort limiter 400 is a scalar limit control effort that jointly restricts DVFS states and scheduling preferences. The energy dissipated in each tuple of active processor complex cores and processor complex core type DVFS states is characterized in a power map 500 that is indexed by control effort 520 determined by the control effort limiter 400. Each entry 501 . . . 510 in the power map 500 summarizes the calculated power using estimates of switched capacitance, part-specific binned voltages and processor complex core type frequencies of each (active cores, DVFS states) tuple for a maximum power workload. Since the control effort 520 is associated with a relative power limit 580, the power map 500 can be searched for a tuple of active cores 540 and DVFS states 560 satisfying the relative power limit 580 indicated by the control effort 520. In one embodiment, output of the power map 500 includes DVFS state limits and a recommended cores bitfield 374. In order to satisfy the relative power limit 580 expressed by the control effort 520, it may be necessary to limit the maximum DVFS state used by each subset of processor complex cores that share an instantaneous DVFS state. It may further be necessary to restrict the set of processor complex cores that execute the workload. When the active-cores subset indicated in the power map 500 by the control effort 520 excludes one or more processor complex cores, the processor complex cores are removed from the recommended cores bitfield 374 that is presented to the processor complex scheduler as described below. Although FIG. 5 illustrates a certain number of tuples of efficiency cores (E-cores) and performance cores (P-cores), and specific tuples of E-cores and P-cores, it is understood that any selection of tuples of E-cores and P-cores can be used to scale the power used by the cores. Performance cores can be scaled down to zero active P-cores. Efficient cores can be scaled to as few as one core. In an embodiment, a tuple of cores can be selected using an array of switches, programmable logic, or other selection method, in lieu of using a bitfield map to mask select a particular tuple of cores for usage.

Configuring DVFS and Recommended Cores

The DVFS state 560 configured for each subset of processor complex cores that share an instantaneous DVFS state is limited. The DVFS state for a processor complex cores subset is the minimum of the state requested by active thread groups for that subset, the limit state calculated by the periodic power limiting control system for that subset and the limit state calculated by the asynchronous power limiting structures for that subset. In one embodiment, thread groups cannot override DVFS state limits. The set of schedulable processor complex cores is limited. The set of processor complex cores that are recommended for use by the processor complex scheduler, expressed in a recommended cores bitfield, is the intersection of the cores recommended by the power map 500 and the cores recommended in each processor complex subset by the maximum control efforts given by fast die temperature control. Once a bit for a given processor complex core is cleared in the bitfield, the processor complex scheduler 210 allows an active thread executing on that core to run until the next processor complex scheduler event (e.g., quantum expiration or blocking), but no new threads are dispatched to the core. Some processor complex core recommendation changes require more processor complex scheduler work than others (e.g., relocating runnable threads from one run queue to another). A hysteresis parameter limits the frequency of core recommendation changes. In one embodiment, thread groups cannot override the recommended cores bitfield 374.

Figure 6:
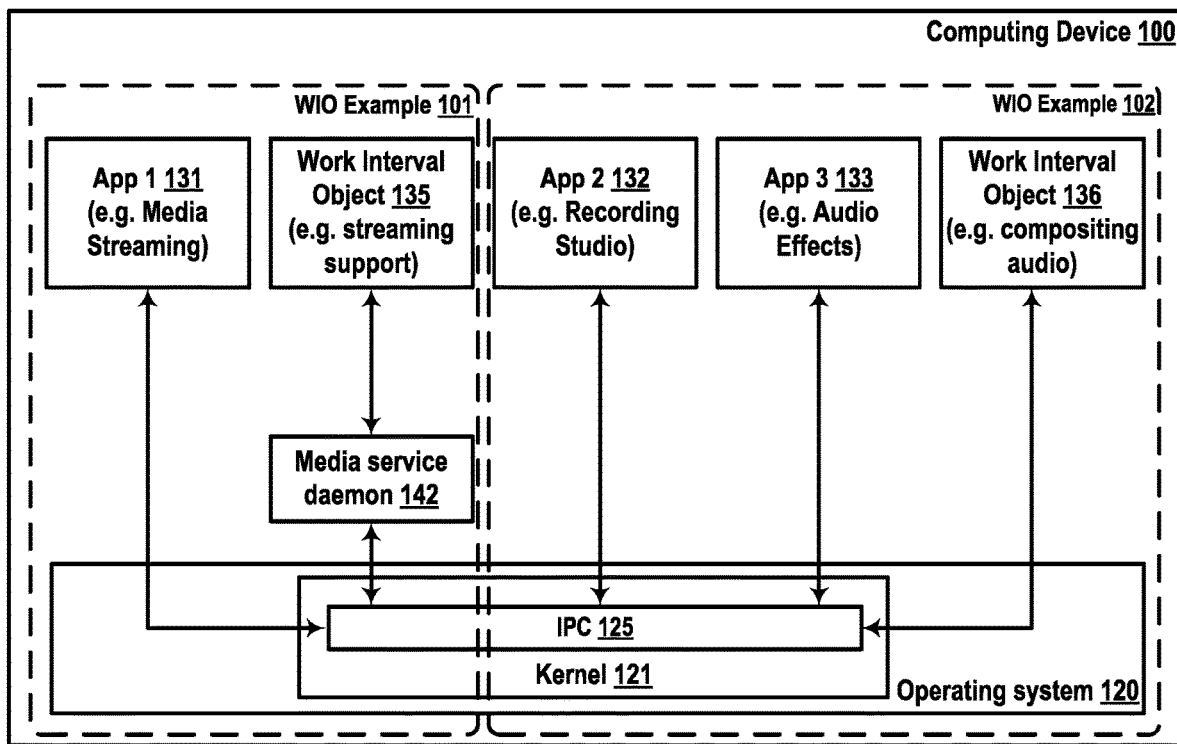
FIG. 6 illustrates, in block form, two example work interval objects in a system for processing threads having thread groups on a processor comprising a plurality of core types each having one or more cores, according to some embodiments.

FIG. 6 illustrates, in block form, two exemplary work interval objects 101 and 102 in a system 100 for processing threads having thread groups on a processor comprising a plurality of core types each having one or more cores, according to some embodiments.

When an application is launched, threads of an application are initially grouped into thread groups. In an embodiment, threads can be initially group in accordance with grouping specified within program code by whether one the threads perform functionality, such as animation or audio/video functionality, in which the thread structure is known, or whether the threads are launched by a daemon that assigns a thread to a thread group when the daemon launches the thread. Threads can also be initially grouped with other threads launched by a same application. During execution of a thread, the thread can opt-in to join a different thread group. At a later time, the thread can opt-out of the different thread group and return to its initial thread group.

One example of a thread opting-in to a different thread group occurs when a thread performs work having a common purpose with a work interval object (WIO). Threads having a common purpose describe threads that perform similar operations on similar data or resources, where those operations are designed to be performed within the same time interval. A WIO can have its own thread group. The thread group can either be created specifically for the WIO or the WIO can be associated with an existing thread group. A thread performing work toward the common purpose of the WIO, intended to be performed within the specified time interval, can opt-in to the WIO thread group. Thread execution metrics attributable to work performed by the thread on behalf of the WIO are accumulated with the thread group of the WIO. A work interval object is used to represent periodic work where each period has a deadline. The WIO possesses a token and a specified interval of time for one instance of the work. For example, an audio compositing application can include an audio compositing WIO 136 for compositing audio from one or more other applications into a single audio frame that must be completed within a predetermined period of time. Work interval objects can be created in several ways. There can be a set of predefined work interval objects in an operating system, daemon, framework, or application. A kernel of an operating system can create a work interval object explicitly, such as on behalf of a driver. A kernel of an operating system can implicitly create a work interval object on behalf of an application, such as in response to an application call to a framework. Two examples of creating a work interval object are described below.

WIO example 101 includes a work interval object 135 that is created by a media server daemon 142. App. 1 131 can be, e.g., a media streaming application. Media service daemon 142 can create work interval object 135, and threads associated with the WIO 135 perform streaming support for applications, such as App. 1 131. WIO 135 can be, e.g., a WIO to support streaming of audio, video, or both. To ensure continuity of media playback, threads associated with a WIO 135 must process media in accordance with a predetermined time for the WIO 135. App. 1 131, e.g. can generate a thread, e.g. T1, that performs work that is needed by WIO 135. T1 can have an initial thread group, e.g. TG1, that is associated with App. 1 131. WIO 135 can have its own thread group, e.g. TG10, associated with WIO 135. WIO 135 can call thread T1 to perform work on behalf of WIO 135. A thread, e.g. T1, can request, via media service daemon 142 and inter-process communication (IPC) 125, that thread T1 join WIO 135's thread group (TG10). Thread T1 can opt-in to joining WIO 135 thread group TG10. When thread T1 to performs work on behalf of WIO 135, the thread execution metrics for thread T1 are attributed to WIO 135 thread group TG10.

In WIO example 102, an application, e.g. App. 2 132 can call an application programming interface (API) or framework that creates a work interval object 136. Threads associated with the work interval object 136 perform the functionality requested in the API or framework call by App. 2 132. App. 2 132 can be, e.g., a recording studio application. The record studio application may record multiple tracks of audio and/or video, and may further need one or more audio effects applied to a recording. App. 3 133 can be, e.g., an audio effects program. App. 2 132 recording studio would like to utilize App. 3 audio effects on a recording. Threads associated with work interval object 136 can perform audio compositing on recorded audio by App. 2 132 using audio effects of App. 3 133. App. 2 132 may generate a thread, e.g. T2, having thread group TG2 associated with App. 2 132, that records audio. Appl. 3 133 may generate a thread, e.g. T3, having thread group TG3 associated with App. 133, that applies audio effects to a recording. WIO 136 can have its own thread group, e.g. TG11. Threads T2 and T3 can generate audio and effects data for compositing audio associated with WIO 136. One, or both, of T2 or T3 can opt-in to WIO 136 thread group T11. If both threads T2 and T3 opt-in to WIO 136 thread group T11, then thread execution metrics associated with T2, T3, and WIO 136 will all be attributed to WIO 136 thread group T11. Either, or both, of T2 or T3 can later opt-out of WIO 136 thread group TG11 and return to their respective initial thread groups. For example, thread T2 may opt-out of WIO 136 thread group TG11 in response to App. 132 saving or closing an audio file. Thread T3, for example, may opt-out of TG11 when App. 3 133 is closed, perhaps due to effects processing no longer being needed by a user.

Figure 7:
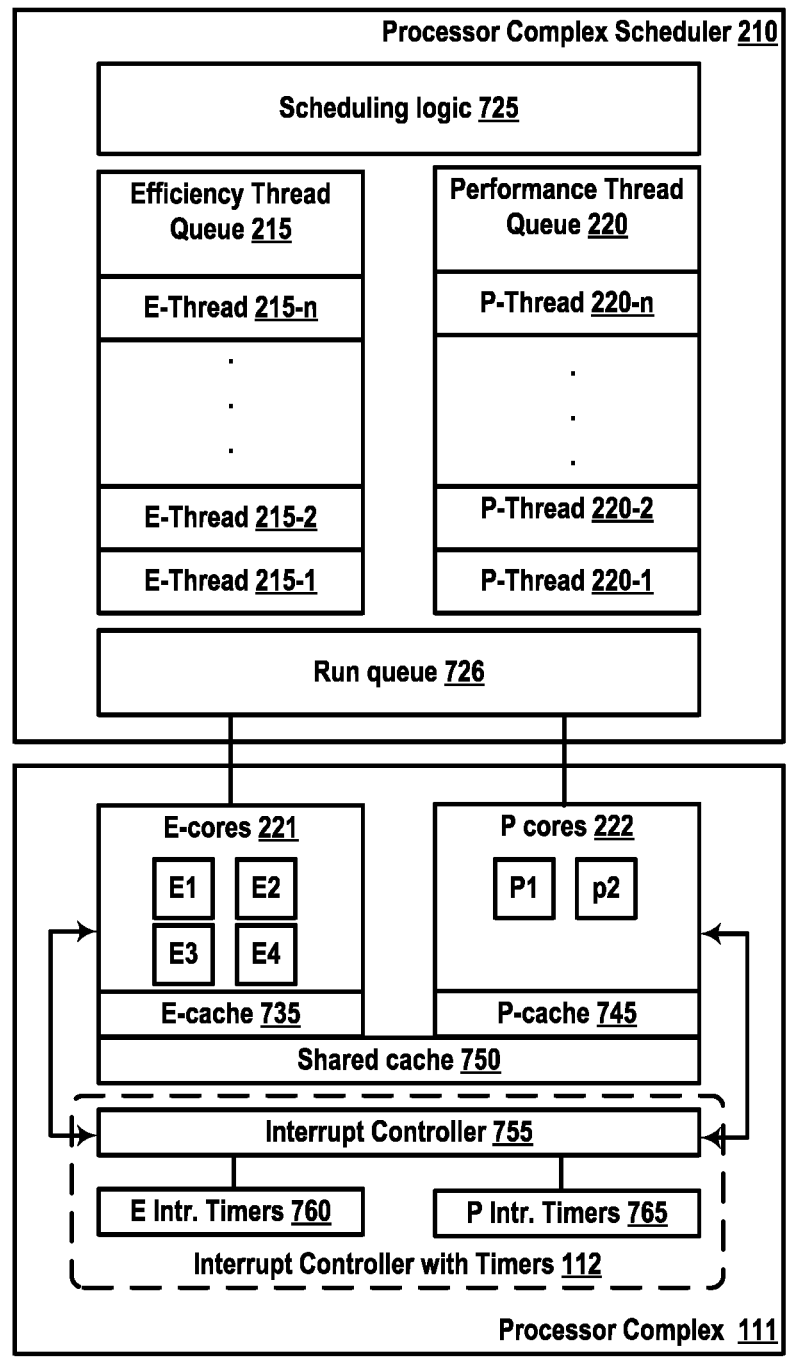
FIG. 7 illustrates, in block form, components of a deferred inter-processor interrupt processing system and a scheduler for a system for processing threads having thread groups on a processor comprising a plurality of core types each having one or more cores, according to some embodiments.

FIG. 7 illustrates, in block form, components of a deferred inter-processor interrupt (DIPI) processing system 700 and a processor complex scheduler 705 for a system for processing threads having thread groups on a processor comprising a plurality of core types each having one or more cores, according to some embodiments.

A DIPI system can be used to increase performance in the processing system by delaying, for a short time, execution of a thread that is waiting on a particular core type to become available. In an example, in an asymmetric multiprocessing (AMP) system comprising performance cores (P-core) and efficiency cores (E-cores), a thread group may be recommended for running a P-core. Threads of the thread groups recommended for running on a P-core are said to be "P-eligible." If a P-eligible thread is runnable, but waiting on a P-core to become available, and an E-core is available, one solution to ensuring that the thread makes progress is to "spillover" the P-eligible thread to run on an E-core. However, this solution requires a certain amount of overhead to run the P-eligible thread on the E-core. An alternative solution is to have the P-eligible thread wait for a small amount of time for a P-core to become available and run the P-eligible thread on the P-core. While it is counter-intuitive that waiting can increase performance, this solution using DIPI recognizes that P-cores generally retire instructions faster than E-cores, and a P-core may become available sooner than the time it takes wake up an idle E-core and switch the P-eligible thread to run on an E-core.

States of a core can include a state wherein the core is executing instructions of a thread and a state wherein the core is idle, i.e., not executing instructions, but the core is not in a sleep state or in a low power state. A core state can further include a state in which the core is in a sleep state or low power state and requires a re-initialization of the core to at least the idle state so that the core can execute instructions.

A DIPI system 700 can include a processor, such as processor complex 111, and a processor complex scheduler 210 that can schedule threads for a plurality of core types. Processor complex 111 can comprise one or more E-cores 221 and one or more P-cores 222. Processor complex 111 can further include an E-cache 735 that is dedicated to caching threads for running on E-cores 221, and a P-cache 745 that is dedicated to running threads on P-cores 222. In an embodiment, processor complex 111 can further comprise a shared cached 750. Processor complex 111 also can include a programmable interrupt controller 755. In an embodiment, programmable interrupt controller 755 can have interrupts for each core type and programmable interrupt timers for each core type, e.g., E-core interrupt timers 760 and P-core interrupt timers 765.

Processor complex scheduler 210 can include a thread queue for each core type of processor complex cluster of cores 221 and 222, e.g. efficiency thread queue 215 (E-queue) and performance thread queue 220 (P-queue). Each queue type can have a plurality of queue entries, e.g. E-queue 215 can have E-threads 215-1, 215-2, ..., 215-$n$ pending in the E-queue 215, and P-queue 220 can have P-threads 220-1, 220-2, ..., 220-$n$ pending in the P-queue 220. Processor complex scheduler 210, E-queue 215, and P-queue 220 can communicate with processor complex 111 the components of processor complex 111. Processor complex scheduler 210 can further contain scheduling logic 725 to manage queues 215, 220, and 726, and implement DIPI using interrupt controller 755 and timers 760 and 765. In an embodiment, processor complex scheduler 210 can also include a global run queue 726 that enqueues threads that are runnable. In an embodiment, one or more run queue(s) 726 can comprise an E-core run queue 215 and a performance core run queue 220.

Processor complex scheduler 210 can use inter-processor interrupts (IPI) to schedule threads on multiple core types, e.g., E-cores 221 and P-cores 222. Although four (4) E-cores and two (2) P-cores are shown, this is by way of example only. Any number of E-cores and P-cores can form a cluster of cores of a core type. When a target core is powered-off, processor complex scheduler 210 can program a deferred IPI (DIPI) that triggers after a programmable set time interval, using E-interrupt timers 760 and P-interrupt timers 765. During that time interval, if a target core type becomes available, processor complex scheduler 210 can cancel the deferred IPI, and schedule the thread on the target core. Schedule logic 725 can integrate AMP core type information, dynamic thread power/performance recommendations, and scheduling intent to selectively and dynamically use deferred IPIs for AMP core scheduling. This results in increased performance and power efficiency on AMP systems, particularly in performance-intensive multi-threaded workloads.

When the processor complex scheduler 210 sends an IPI to a processor complex core, e.g. 221 or 222, the processor complex scheduler logic 725 determines the type of IPI to use: deferred IPI or immediate IPI. A deferred IPI is an interrupt programmed with a delay value, to defer the interrupt. An immediate IPI is an interrupt programmed without a delay, to generate an immediate interrupt. For deferred IPIs, processor complex scheduler logic 725 can adjust the deferred time interval using workload heuristics. Processor complex scheduler logic 725 can identify with high accuracy the instances where using interrupt deferral, with the opportunity to cancel the interrupt during the deferred interval, is expected to increase performance and/or power efficiency relative to immediate interrupts. Processor complex scheduler logic 725 uses heuristics and inputs from the processor complex scheduler 111, hardware, and power/performance control systems closed loop performance controller (CLPC) 300 and control effort limiter (CEL) 400.

Processor complex scheduler logic 725 can determine a scheduling event that can determine whether to use deferred or immediate IPI for each scheduling event that results in an IPI. For each scheduling event, processor complex scheduler logic 725 evaluates: (1) the scheduling intent/event type, the current core type, the target core type, and the recommended core type classification obtained from CLPC 300. Scheduling events can include: spilling a thread from a P-core to an E-core, rebalancing a P-eligible thread from an E-core to a P-core, and making a thread runnable. The current and target core types for an AMP can be an efficiency core (E-core) and a performance core (P-core). The current core type is the core type on which a thread has run, and a target core type is the core type on which the thread is enqueued to run. A CLPC 300 thread recommendation can include "P-eligible," wherein a thread is eligible to run on a P-core or an E-core, and "E-eligible," wherein a thread is eligible to run on an E-core. An example table of processor complex scheduler logic 725 decisions is described in FIG. 19, below.

Additionally, processor complex scheduler logic 725 can determine the programmable deferred IPI interval length control loop by evaluating: P-core and E-core thread migration rates, and E-queue 215 and P-queue 220 lengths. Processor complex scheduler logic 725 can use migration rate and run-queue length thresholds to increase or decrease the deferred time interval of deferred IPIs. This allows the processor complex scheduler logic 725 to control how aggressive the core wake-up prevention and thread migration hysteresis are, in response to workload characteristics.

Advantages of using DIPI in a processor having multiple core types, such as AMP, include increased performance and efficiency for high-performance multi-threaded workloads on AMP systems, due to improved scheduling latency and thread migration hysteresis, and energy-efficiency for low-demand workloads, using deferred IPIs that avoid unnecessary core shutdown and subsequent power-up.

Figure 8:
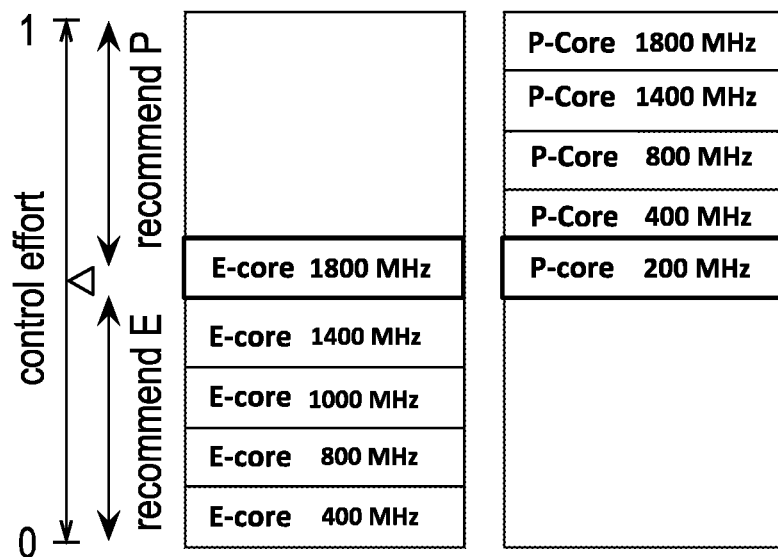
FIG. 8 illustrates, in block form, a performance map indexed by a control effort value in a system for processing threads having thread groups on a processor comprising a plurality of core types each having one or more cores, according to some embodiments.

FIG. 8 illustrates, in block form, a performance map 800 indexed by a control effort value in a system for processing threads having thread groups on a processor comprising a plurality of core types each having one or more cores, according to some embodiments.

Periodically, or in response to an asynchronous event, a plurality of thread execution metrics for a thread group are fed into a plurality of tunable controllers of a closed loop performance controller (CLPC) 300 for the thread group. An output of the CLPC 300 is a control effort needed for the threads of the thread group to meet performance goals for the thread group. The control effort can be a unitless value from 0 . . . 1. The control effort can be used to index into a performance map 800 that indicates a plurality of core types and dynamic voltage and frequency scaling (DVFS) states for the plurality of core types. In the example performance map 800, the plurality of core types comprise performance cores (P-cores) and efficiency cores (E-cores) of an asymmetric multiprocessing system (AMP). A plurality of DVFS states are shown for each of the P-cores and the E-cores of the AMP. The core types can alternatively be different core configurations of a symmetric multiprocessing system (SMP). The DVFS states shown for the core types are by way of non-limiting example. Different DVFS states and more, and/or different, core types can be used in the performance map.

In an embodiment, when a thread group first begins execution on a processor, the control effort can be zero, by default. As shown in performance map 800, a control effort of zero corresponds to recommending that threads of the thread group be run on an E-core at a DVFS state of 400 MHz. As threads of the thread group are executed, a plurality of thread execution metrics are accumulated for threads of the group, indicating progress on performance targets for the threads of the group. If performance targets for the threads of the thread group are not being met, then the control effort produced by CLPC 300 for the thread group can rise, indicating that more processing performance is needed to meet performance targets for thread group. A higher control effort can indicate, e.g. an E-core running at a DVFS state of 1000 MHz. The performance map can have one or more overlapping entries for a control effort. In the example performance map 800, a control effort can map to recommending an E-core running at a DVFS state of 1800 MHz or recommending a P-core running at a DVFS state of 200 MHz. In an embodiment, the workload for the thread group can be analyzed to determine which core type and DVFS state is more appropriate for the workload. For example, if the workload comprises substantial arithmetic computations, graphics rendering, or other workload type that is appropriate for a P-core, then the P-core at DVFS state 200 MHz can be recommended for the thread group. If the workload comprises substantial block I/O operations, integer arithmetic, character I/O, or other general-purpose processing, then an E-core can be recommended at DVFS state 1800 MHz. If a workload comprises background tasks, then an E-core can be recommended at DVFS state 1800 MHz, based on the control effort value and analysis of the workload.

Similarly, as the control effort needed to meet performance goals for the thread group continues to rise, P-cores with increasing DVFS states can be recommended for the thread group. When performance targets are being met, and the control effort falls, then lower DVFS states for a P-core type, or an E-core type, are recommended for the thread group. Control effort needed to meet performance goals can fall when, e.g., the overall system workload is reduced, or the recommended core type and DVFS state meets or exceeds performance goals for the thread group.

Figure 9:
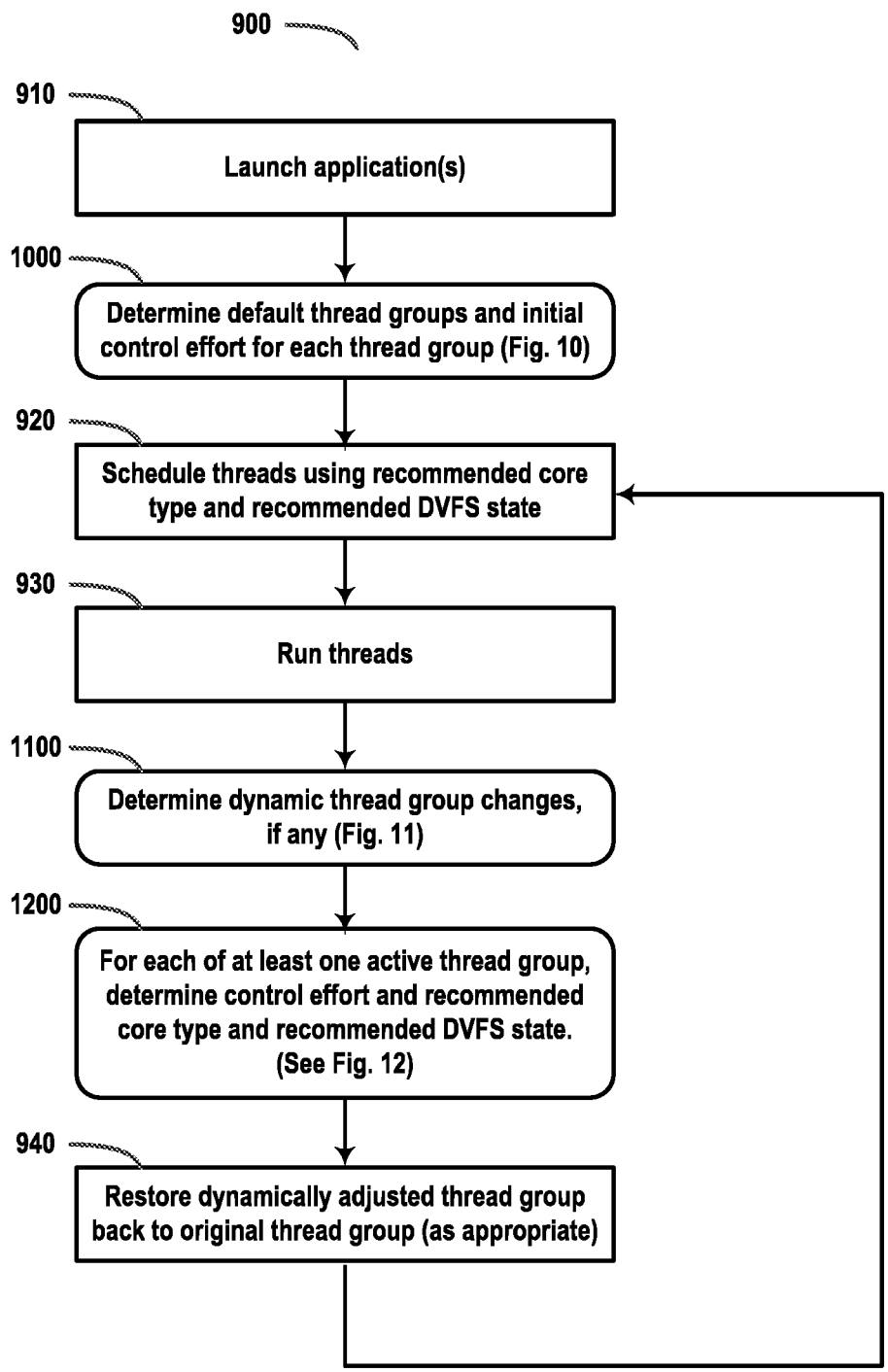
FIG. 9 illustrates method of processing threads using a system for processing threads having thread groups on a processor comprising a plurality of core types each having one or more cores, according to some embodiments.

FIG. 9 illustrates method 900 of processing threads using a system for processing threads having thread groups on a processor comprising a plurality of core types each having one or more cores, according to some embodiments. Threads can be grouped by a thread grouping module, such as thread group module 123 of FIG. 1, or thread grouping module 123 of FIG. 2, which includes initial thread grouping logic 251 and dynamic thread grouping logic 252. In an embodiment, thread grouping logic can be implemented in the kernel of an operating system. Threads of a plurality of applications can be grouped into thread groups. Initially, by default, all thread groups can be scheduled on efficiency cores (E-cores) at a default dynamic voltage and frequency scaling (DVFS) state. As threads are executed, and their thread execution metrics sampled and fed into a plurality of tunable controllers, a closed loop performance control (CLPC) 300 module can determine a control effort that will help ensure that the threads in a thread group meet performance targets (e.g. completion times, latency targets, throughput, et al.). Threads can dynamically change thread group and can be restored to their original thread groups at a later time. In an embodiment, threads need not be restored to their original thread groups.

In operation 910, one or more application programs, processes, tasks, or objects can be launched.

In operation 1000, default thread groups can be determined for threads of the launched application(s), daemons, or other default grouping. An initial control effort, core type, and DVFS state can also be set for one, or more, or all thread groups. See FIG. 10, below for a description of determining initial thread grouping.

In operation 920, processor complex scheduler 705 can enqueue one or more threads for execution. Processor complex scheduler 705 can have a thread queue for each core type, e.g. efficiency cores (E-cores) and performance cores (P-cores). By default, the processor complex scheduler can initially schedule threads of all thread groups for execution on an E-core queue for execution at a default DVFS state.

In operation 930, one or more threads can be executed, thereby generating thread execution metrics for each of a plurality of threads. Thread execution metrics, e.g. thread execution metrics 311-316 of FIG. 3, for a thread are accumulated by processor complex scheduler 210 with the thread group to which each thread belongs.

In operation 1100, dynamic thread group changes can be made, if any. For example, a second thread may receive a voucher indicating that the second thread is to perform work on behalf of a first thread. A voucher is a collection of attributes in a message sent via inter-process communication (IPC) from a first thread to a second thread. One of the attributes that the first thread puts in the voucher is the thread group to which the first thread currently belongs. The second thread can adopt the thread group in the voucher before the next execution of the second thread. In another example, a thread associated with a work interval object may perform work on behalf of the work interval object. A work interval object is used to represent periodic work where each period has a deadline. The object possesses a token and a specified time interval for one instance of the work. A work interval object can be used to designate threads that are working together to achieve a common purpose in a specified time interval. Before performing work for the work interval object, the thread can adopt the thread group of the work interval object. Dynamic thread grouping is described in detail, below, with reference to FIG. 11.

In operation 1200, for each thread group that was active on a core of the processor complex 111 within a time interval, a CLPC 300 for the thread group can receive a sample of a sample of plurality of thread execution metrics for the thread group into a plurality of tunable controllers. CLPC can determine a control effort for the thread group from the outputs of each tunable controller of the thread group. The control effort for the thread group can be mapped to a performance map, e.g. performance map 800 of FIG. 8 to obtain a recommended core type and DVFS state for executing threads of the thread group. CLPC operation is described in detail, below, with reference to FIG. 12.

In operation 940, as may be appropriate, one or more threads that dynamically changed thread group in operation 1100 may be restored to the thread group that the thread had before being dynamically changed.

Figure 10:
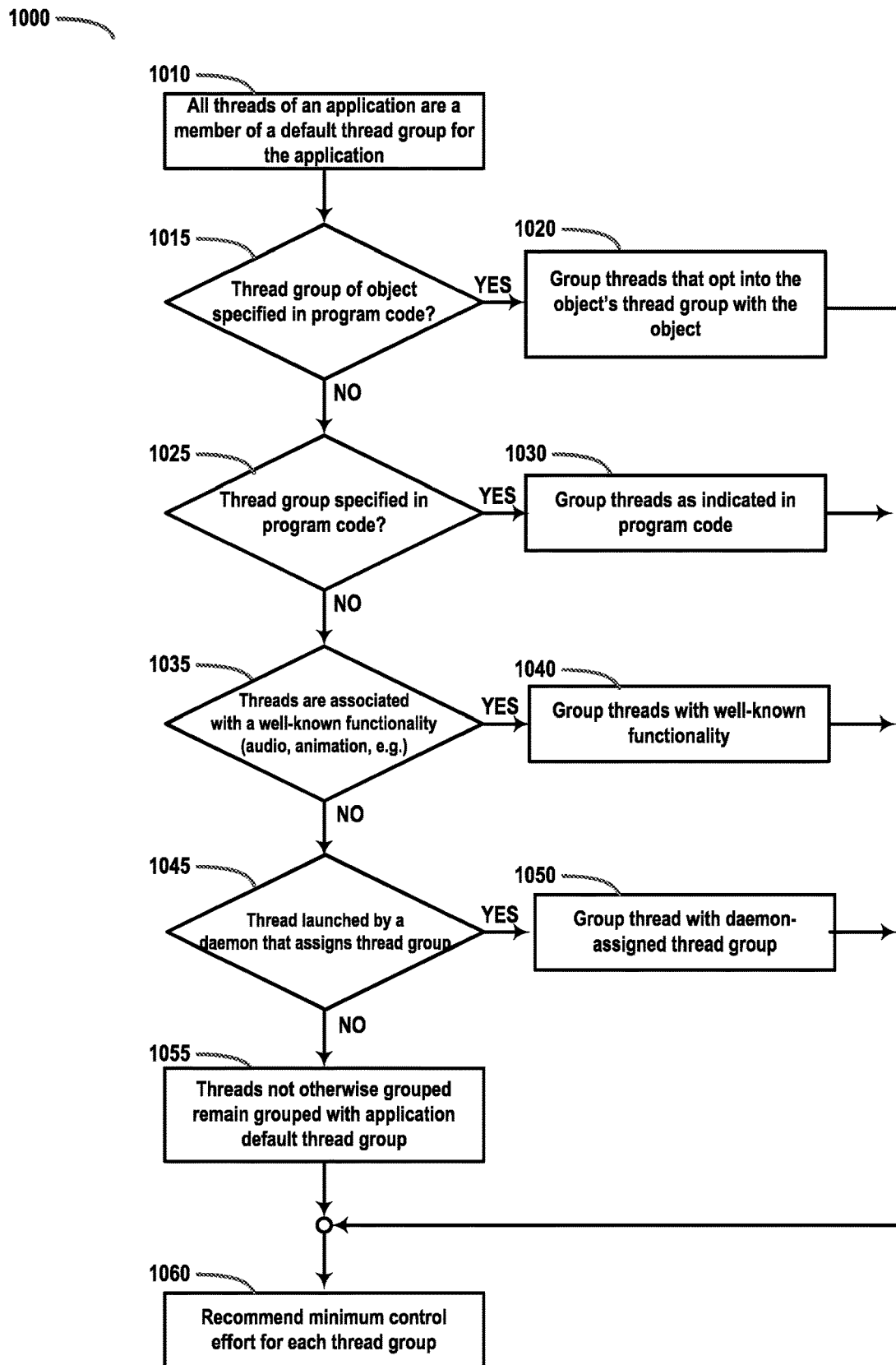
FIG. 10 illustrates a method of initial thread grouping in a system for processing threads having thread groups on a processor comprising a plurality of core types each having one or more cores, according to some embodiments.

FIG. 10 illustrates a method 1000 of initial thread grouping in a system for processing threads having thread groups on a processor comprising a plurality of core types each having one or more cores, according to some embodiments. A thread group comprises one or more threads that are grouped together based on one or more characteristics that are used to determine a common goal or purpose of the threads in the thread group. When an application program, or other library, daemon, or other executable task, is launched, one or more processes can be created, each process having a plurality of threads. Threads are initially assigned to default thread groups. Default thread grouping may be overridden, as described below.

In operation 1010, all threads of an application can be assigned to a thread group for the application (termed a "coalition") by default. A coalition is a grouping of closely related tasks/processes of an application which consist of threads, e.g. a web browser and application extensions associated with the web browser. Threads of an application can also be initially grouped in accordance with an "application bundle." An application bundle is package that can include source code, compiled code, script commands, installation directive, references to one or more APIs, frameworks or other services upon which the application in the bundle may depend, and other meta data describing the contents of the application bundle. A coalition can also include a group of related threads that work toward a common goal, such as work interval objects, or threads launched by a daemon.

In operation 1015, it can be determined whether an object type is specified in the source code, object code, script, or application bundle for the object type that may override a default thread grouping for an object. An overriding object type is an object of a type whose thread group will be adopted by another thread, such as by a voucher or a work interval object. Thus, the object thread group is said to "override" an initial thread group for a thread. An object type can be a process, task, or group of threads that perform work toward a common goal or purpose. An overriding object type can have its own thread group. An overriding object type can be a program object that calls one or more threads of one or more applications to perform work on behalf of the object having the object type. For example, a work interval object can be specified as having its own thread group. If it is determined that an overriding object type is specified, then method 1000 continues at operation 1020, otherwise method 1000 continues at operation 1025.

In operation 1020, application threads associated with the work interval object can be assigned the thread group of the work interval object. In addition, threads of other applications that opt-in to performing work on behalf of the work interval object can also be grouped with the work interval object. In an embodiment, when a second thread is called to perform work on behalf of first thread, the second thread may optionally adopt the thread group of the first thread. The second thread is said to "opt-in" to the thread group of the first thread. A thread that opts-in a thread group may later opt-out of the thread group and return to its previous thread group. Method 1000 continues at operation 1060.

In operation 1025, it can be determined whether a thread group has been specified in the application source code, compiled code, script, or application bundle for one or more threads of an application. Source code may be annotated with a thread group indication. For example, source code may be annotated with a compiler directive that a particular function, library, or block of source code is to have a thread group as indicated in the compiler directive. An example directive follows: #THREADGROUP_ID=12345678; function xyz(void) { . . . }; #ENDTHREADGROUP. One or more application programming interfaces (APIs) or frameworks may be specified or included in the application that determine a thread group when the API or framework is called. For example, the source code for the API can be annotated with a compiler directive that all, or a portion, of the API is to have a thread group as indicated in the compiler directive. If a thread group is specified in operation 1025, then method 1000 continues at operation 1030, otherwise method 1000 continues at operation 1035.

In operation 1030, threads having a specified thread group are grouped together into a thread group. Method 1000 continues at operation 1060.

In operation 1035, it can be determined whether one or more threads of the application are associated with a well-known functionality, such as video, audio, animation, block I/O, or the like. Functionality that is well-known can have a named thread group identifier that can be referenced within source code, scripts, application bundles, and the like. For example "audio," "video," "game," "network," etc. Processor complex scheduler thread grouping logic can convert a named thread group to a thread group identifier. If so, then method 1000 continues at operation 1040, otherwise method 1000 continues at operation 1045.

In operation 1040, threads associated with a well-known functionality are grouped together into a thread group. Well-known functionality can include, e.g. a library, API, or framework that is directed to video processing, audio processing, rendering, input/output (I/O) for block storage devices. The library, API, or framework, can contain an explicit compiler directive indicating its functionality. In an embodiment, the source code or compiled code for the library, API, or framework, can analyzed to determine the daemon(s) called by the library, API, or framework. Initial thread grouping logic 251 can perform this analysis and assign thread groups in accordance with the analysis. Method 1000 continues at operation 1060.

In operation 1045, it can be determined whether a thread was launched by a daemon that is associated with a thread group. If so, then method 1000 continues at operation 1050, otherwise method 1000 continues at operation 1055.

In operation 1050, the called daemon dynamic thread grouping logic 252 can assign the thread group to the thread launched by the daemon. Method 1000 continues at operation 1060.

In operation 1055, threads not otherwise grouped, above, stay assigned to their default application thread group.

In operation 1060, by default, a minimum control effort is recommended for each thread group. During initial thread grouping, all thread groups can be recommended for minimum control effort by initial thread grouping logic 251. Minimum control effort corresponds to a control effort value of zero. A control effort of zero maps to a performance map entry for recommending an efficiency core at the lowest DVFS state for efficiency cores in the performance map.

Figure 11:
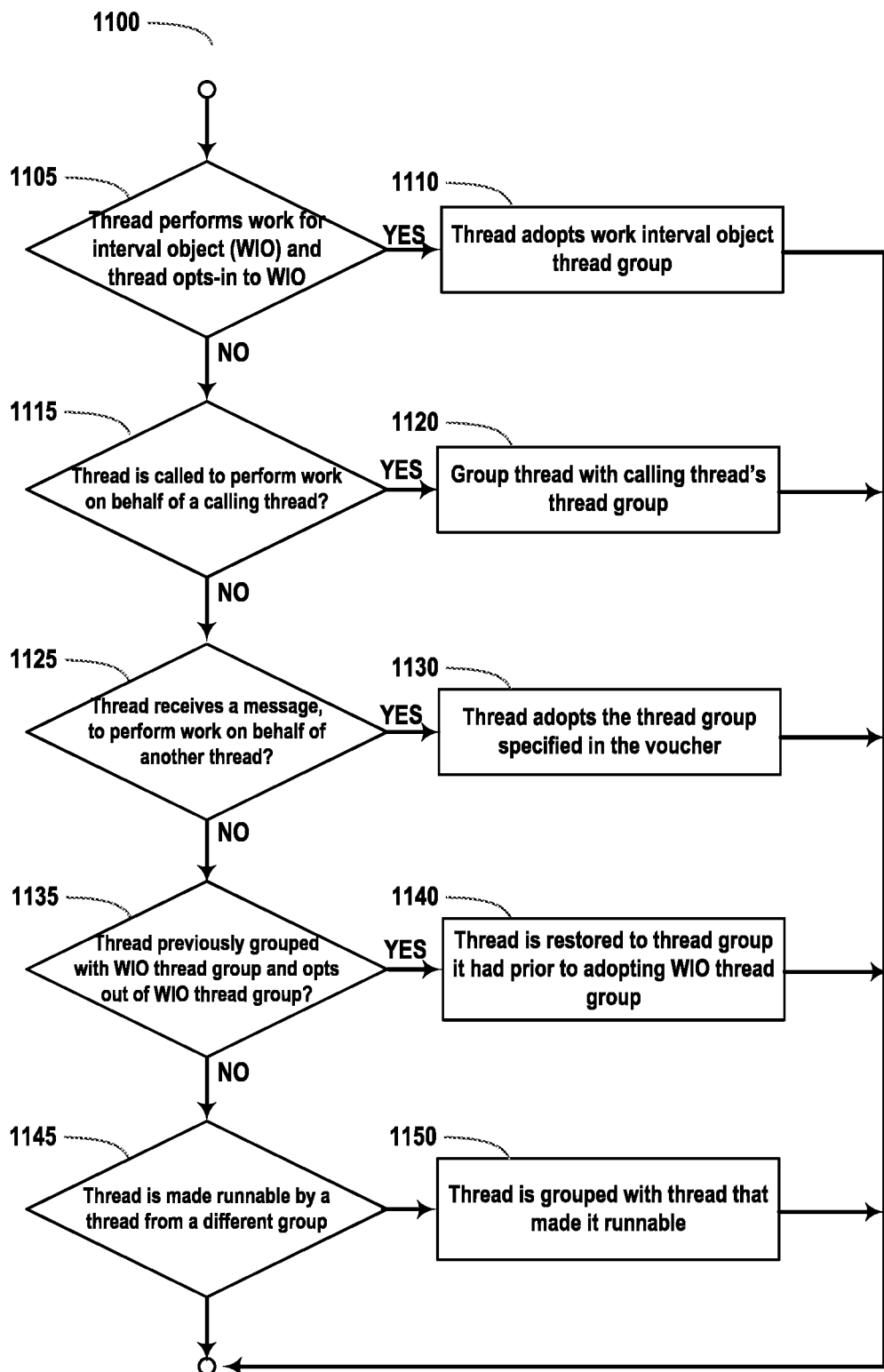
FIG. 11 illustrates a method of dynamically grouping threads in a system for processing threads having thread groups on a processor comprising a plurality of core types each having one or more cores, according to some embodiments.

FIG. 11 illustrates a method 1100 of dynamically grouping threads in a system for processing threads having thread groups on a processor comprising a plurality of core types each having one or more cores, according to some embodiments. After threads are assigned an initial thread group, as described above with reference to FIG. 10, one or more threads may dynamically change thread groups as described below, with reference to FIG. 11. A thread group comprises one or more threads that are grouped together based on one or more characteristics that are used to determine a common goal or purpose of the threads in the thread group.

In operation 1105, it can be determined whether a thread performing work having a common purpose with a work interval object (WIO) 135, the work to be completed within the specified time interval of the WIO 136, has opted-in to joining the WIO 135. In an embodiment, when a second thread is called to perform work on behalf of first thread, the second thread may optionally adopt the thread group of the first thread. The second thread is said to "opt-in" to the thread group of the first thread. A thread that opts-in a thread group may later opt-out of the thread group and return to its previous thread group. If the thread opts-in to the thread group of the work interval object, then in operation 1100, the thread adopts the thread group of WIO 135 and method 1100 ends. Otherwise method 1100 continues at operation 1115.

In operation 1115, it can optionally be determined whether the thread is called to perform work on behalf of a calling thread, or is otherwise made runnable by a calling thread. A calling thread is a first thread that calls a second thread to perform work on behalf of the first thread. If so, then in operation 1120, the thread is grouped with the calling thread and method 1100 ends. Otherwise method 1100 continues at operation 1125.

In operation 1125, it can be determined whether the thread received a message to perform work on behalf of another thread. A message may be, e.g., passed from a first thread to this thread via inter-process communication, and the message contains or references a voucher that includes or references a thread group. A voucher is a collection of attributes in a message sent via inter-process communication (IPC) from a first thread to a second thread. One of the attributes that the first thread puts in the voucher is the thread group to which the first thread currently belongs. If so, then in operation 1130, the thread adopts the thread group referenced in the message (voucher) and method 1100 ends. Otherwise, method 1100 continues at operation 1135.

In operation 1135, it can be determined whether a thread that previously opted-in to joining a work interval object 135 has now opted-out of the work interval object 135. If so, then in operation 1140, the thread is restored to the thread group that it had before the thread opted-in to joining the thread group of the work interval object 135. Otherwise, method 1100 continues at operation 1145.

In operation 1145, it can be determined whether a thread has been made runnable by another thread. If so, then method 1100 continues at operation 1150. Otherwise, method 1100 ends.

In operation 1150, the thread that is made runnable by the other thread can join the thread group of the other thread and method 1100 ends.

Figure 12A:
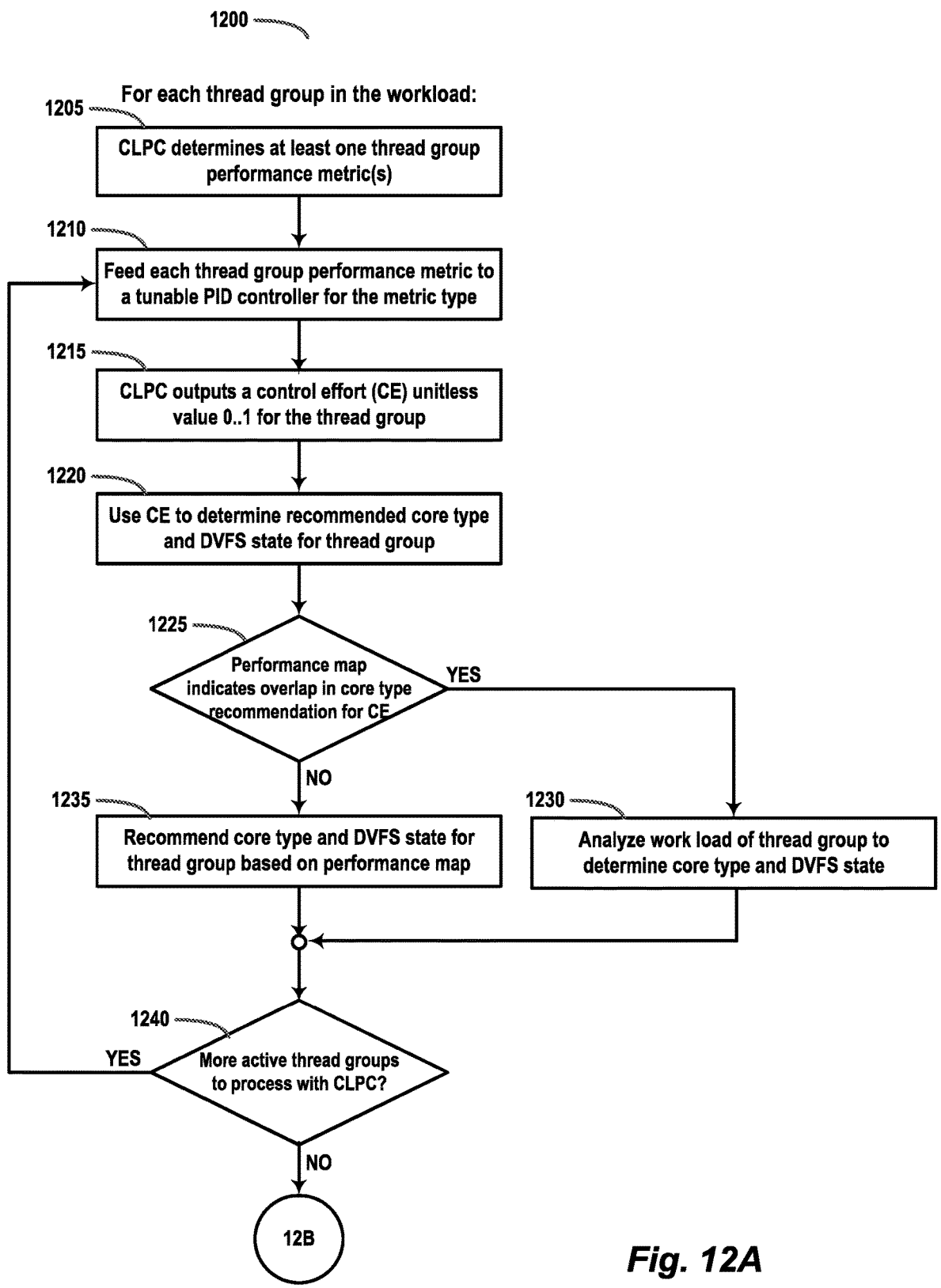
FIGS. 12A and 12B illustrate a method of determining a recommended core type and DVFS state for one or more thread groups, and DVFS states for a plurality of core types in a processor of a system for processing threads having thread groups on a processor comprising a plurality of core types each having one or more cores, according to some embodiments.
Figure 12B:
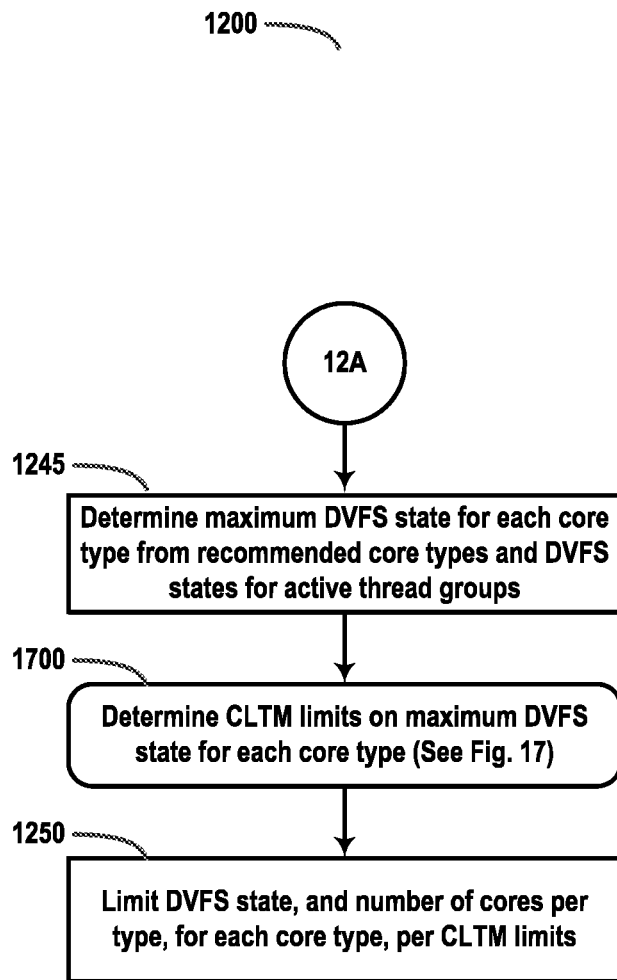

FIGS. 12A and 12B illustrate a method 1200 of determining a recommended core type and DVFS state for one or more thread groups, and DVFS states for a plurality of core types in a processor of a system for processing threads having thread groups on a processor comprising a plurality of core types each having one or more cores, according to some embodiments. Each of a plurality of thread groups that have been active on a processor core can be processed by a closed loop performance controller (CLPC), e.g. CLPC 300, and a control effort determined for the thread group. The control effort can be mapped to a recommended core type and DVFS state for the thread group using a performance map, e.g. performance map 800. A maximum of the DVFS states for each core type can be determined that limits the resulting DVFS state setting for each core type.

In operation 1205, a CLPC receives samples of a plurality of performance metrics for the thread group. A non-limiting example list of performance metrics can include, e.g. a work interval utilization for one or more work interval objects, block storage I/O rate for the thread group, a processor complex utilization for the thread group, scheduling latency for the thread group, and a cluster residency for the thread group.

In operation 1210, samples of the performance metrics for the thread group can be fed into a plurality of tunable controllers. In an embodiment, a tunable controller can be a proportional-integral-derivative (PID) controller.

In operation 1215, for the thread group, CLPC outputs a control effort (CE) value. In an embodiment, the control effort value is a unitless value from 0 to 1.

In operation 1220, the CLPC can map the control effort to a performance map to determine a recommended core type and DVFS state for the thread group, based on the control effort for the thread group.

In operation 1225, it can be determined whether the control effort maps to an area of the performance map that has overlap between core types, such that the control effort maps to both an E-core and DVFS state and a P-core and DVFS state. If so, then method 1200 continues at operation 1230, otherwise method 1200 continues at operation 1235.

In operation 1230, the workload in the thread group can be analyzed to determine whether the work is more suitable for one core type or another. For example, the thread group may contain threads that render a graphic, or perform floating point arithmetic, and are more suitable for a P-core than an E-core. Similarly, the work in the thread groups may indicate that the work is not complex, such as block I/O, and may be more suitable for an E-core. In response to the analysis of the work of the thread group, a recommended core and DVFS state is determined and method 1200 continues at operation 1240.

In operation 1235, the control effort did not map to a portion of the performance map that contains overlapping entries of core types, and thus the recommended core type and DVFS state can be directly derived from the performance map, using the control effort for the thread group. Method 1200 continues at operation 1240.

In operation 1240, it can be determined whether there are more thread groups that were active on a processor core during the sample period of the CLPC. If so, then method 1200 continues at operation 1210 with a next thread group, otherwise method 1200 continues at operation 1245, described below with reference to FIG. 12B.

In FIG. 12B, operation 1245, a maximum DVFS can be determined for each core type, from the recommended core types and DVFS states for the core types, for each thread group.

In operation 1700, a closed loop thermal and power controller can determine a limit on the DVFS state for each core type, and a number of active cores for each core type. Operation 1700 is described in detail, below, with reference to FIG. 17.

In operation 1250, the maximum DVFS state for each core type, determined in operation 1245 above, can be limited using the DVFS state limit determined for each core type in operation 1700 above. The number of cores per core type may also be limited by operation 1700. Operation 1700 can mask off one or more cores of each type to limit power consumption and, thus, heat generation.

Figure 13:
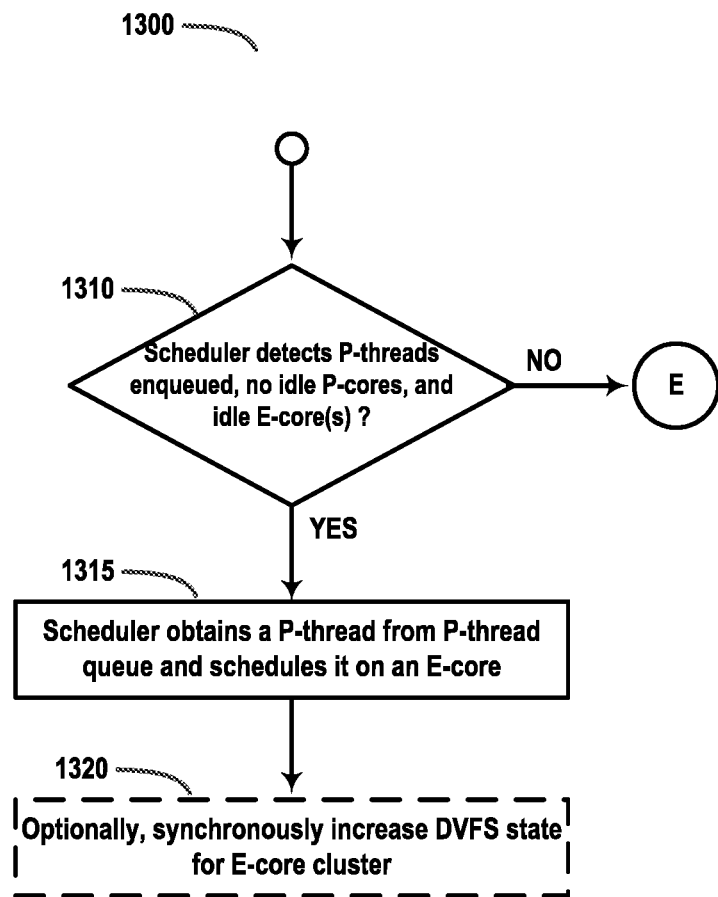
FIG. 13 illustrates a method of spilling a thread over from a first core type of a processor to a second core type of a processor in a system for processing threads having thread groups on a processor comprising a plurality of core types each having one or more cores, according to some embodiments.

FIG. 13 illustrates a method 1300 of spilling a thread over from a first core type of a processor to a second core type of a processor in a system for processing threads having thread groups on a processor comprising a plurality of core types each having one or more cores, according to some embodiments. Spilling over of a thread that is, e.g., eligible for running on a performance core (P-core) to an efficiency core (E-core) may be desirable when all P-cores are busy and at least one E-core is idle. Although the P-eligible thread is to be run on an E-core having less performance than a P-core, the P-eligible thread is at least making some progress on the E-core rather than waiting in the P-core scheduling queue.

In operation 1310, it can be determined whether the processor complex scheduler detects that (1) a P-eligible thread is enqueued and runnable, (2) no P-cores are idle, and (3) at least one E-core is idle. If no P-eligible threads are enqueued on the P-queue, or there are idle P-cores, or there are no idle E-cores, then method 1300 ends, otherwise method 1300 continues at operation 1315.

In operation 1315, processor complex scheduler obtains a runnable P-eligible thread from the P-queue and enqueues the runnable P-eligible thread for running on an E-core.

In operation 1320, optionally, the DVFS state of the E-cores can be synchronously increased to run the P-eligible thread.

Figure 14:
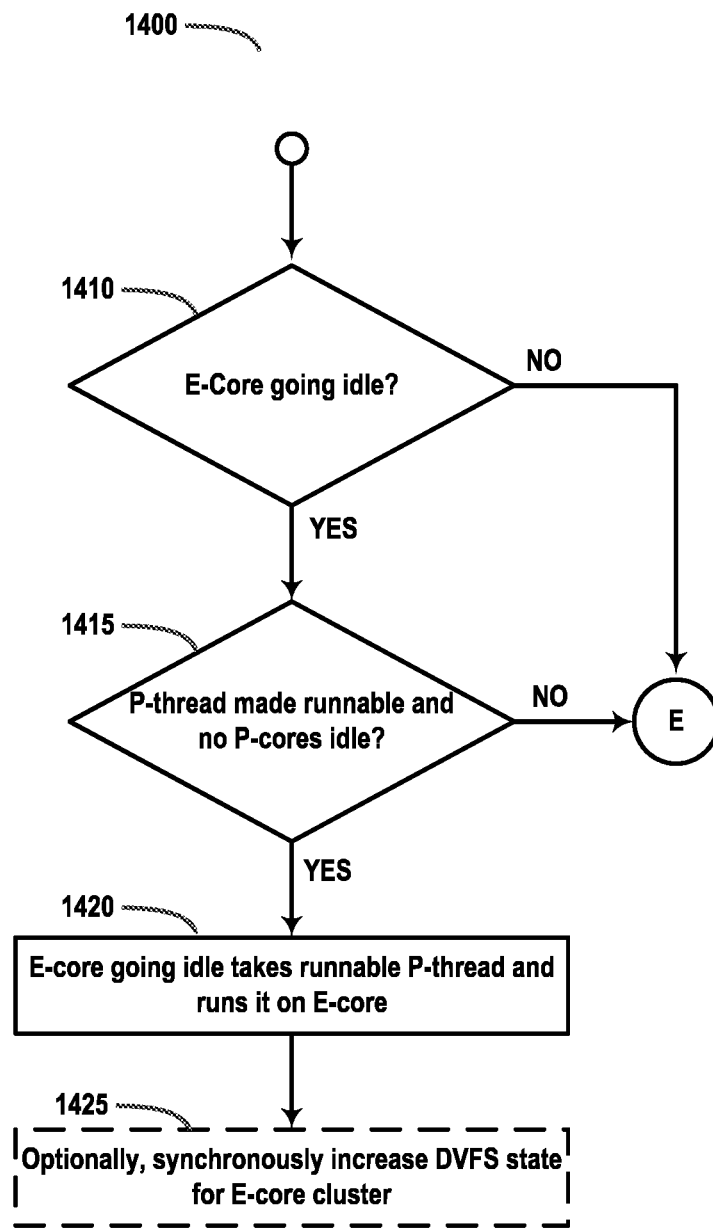
FIG. 14 illustrates a method of stealing a thread from a first core type of a processor to a second core type of a processor in a system for processing threads having thread groups on a processor comprising a plurality of core types each having one or more cores, according to some embodiments.

FIG. 14 illustrates a method 1400 of stealing a thread from a first core type of a processor to a second core type of a processor in a system for processing threads having thread groups on a processor comprising a plurality of core types each having one or more cores, according to some embodiments. In method 1300, above, the processor complex scheduler determined that a runnable P-eligible thread was waiting on an available P-core to execute, and chose to run the P-eligible thread on an E-core rather than have the P-eligible thread wait on an available P-core. In this method, 1400, an E-core can determine that a P-eligible thread is waiting on an available P-core, and that an E-core is going idle (e.g., the E-core is transitioning into an idle state). The E-core can "steal" the P-eligible thread from the P-queue and run the P-eligible thread on the E-core.

In operation 1410, it can be determined whether an E-core is going idle. If not, then method 1400 ends, otherwise, method 1400 continues at operation 1415.

In operation 1415, it can be determined whether there is a runnable P-eligible thread waiting on an available P-core. If not, then method 1400 ends. Otherwise, method 1400 continues at operation 1420.

In operation 1420, the E-core going idle can obtain the P-eligible thread and run the P-eligible thread on the E-core.

In operation 1425, optionally, the DVFS state of the E-core cluster can be synchronously increased to run the P-eligible thread on the E-core.

Figure 15:
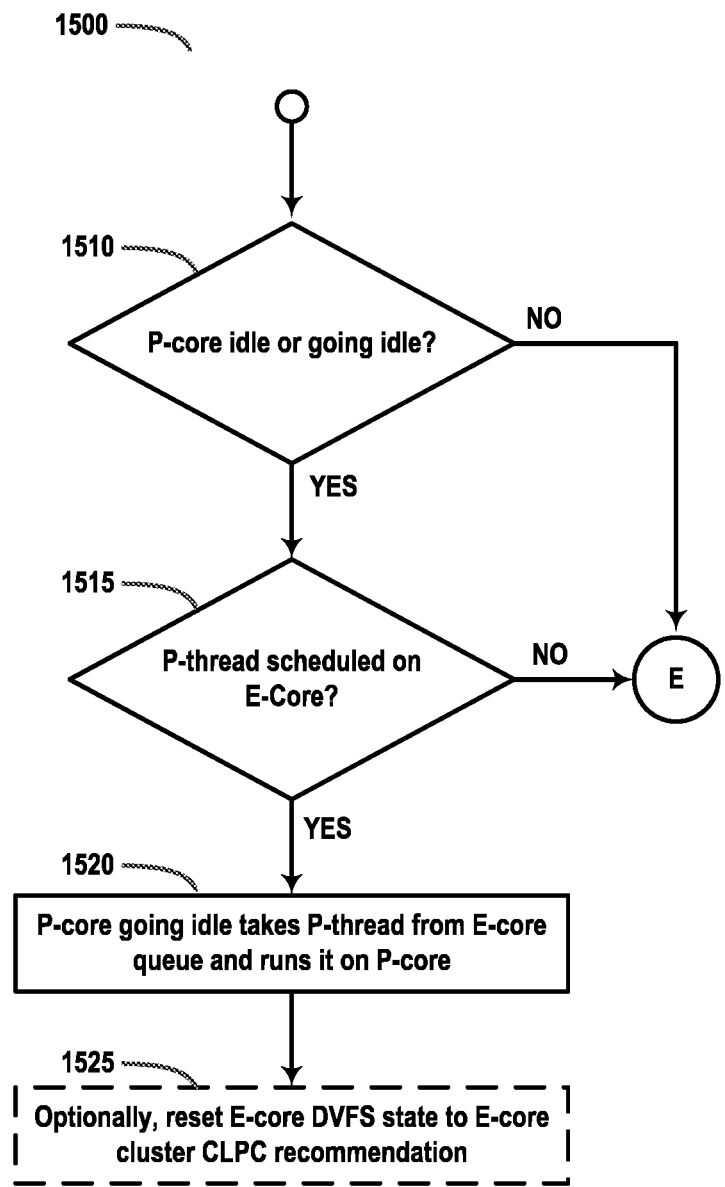
FIG. 15 illustrates a method of rebalancing a thread over from a second core type of a processor to a first core type of a processor in a system for processing threads having thread groups on a processor comprising a plurality of core types each having one or more cores, according to some embodiments.

FIG. 15 illustrates a method 1500 of rebalancing a thread over from a second core type of a processor to a first core type of a processor in a system for processing threads having thread groups on a processor comprising a plurality of core types each having one or more cores, according to some embodiments. In operation 1300, above, a runnable P-eligible thread that was waiting on a P-core to become available was, instead, run on an available E-core ("spillover"). In this method 1500, a P-core going idle can take back the P-eligible thread from the E-queue and run the P-eligible thread on a P-core.

In operation 1510, it can be determined whether there is a P-core that is idle or in the process of going idle. If not, then method 1500 ends. Otherwise, method 1500 continues at operation 1515.

In operation 1515, it can be determined whether a P-eligible thread is scheduled on the E-core scheduling queue. If not, then method 1500 ends, otherwise method 1500 continues at operation 1520.

In operation 1520, the runnable P-eligible thread that is scheduled on the E-core scheduling queue is enqueued on the P-core scheduling queue, and the P-eligible thread is executed on a P-core.

In operation 1525, the DVFS state for the E-core cluster can optionally be reset to the DVFS state recommended for the E-cores, prior to the E-core DVFS state being synchronously increased to run the P-eligible thread on an E-core.

Figure 16A:
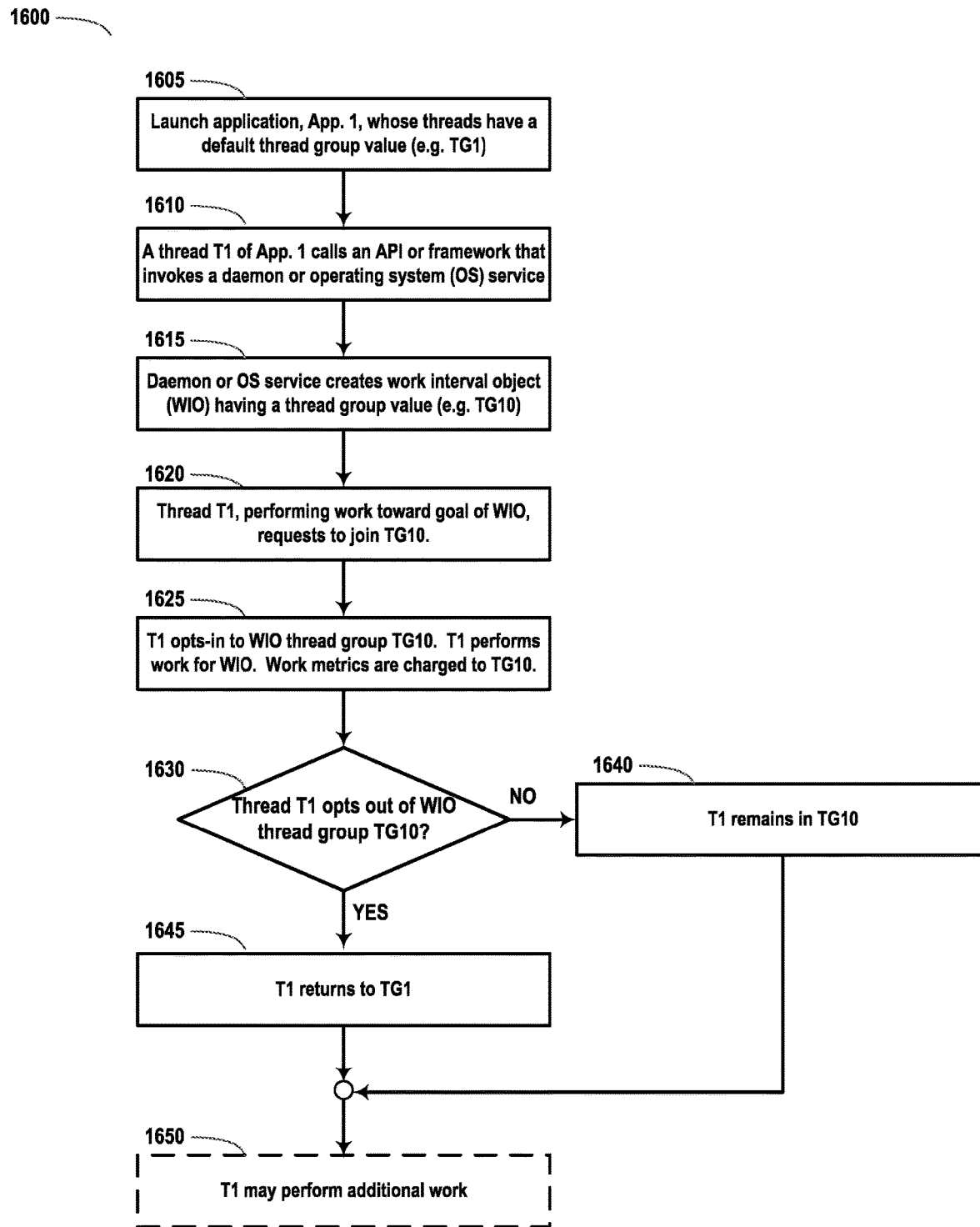
FIGS. 16A and 16B illustrates a method of processing threads associated with a work interval object in a system for processing threads having thread groups on a processor comprising a plurality of core types each having one or more cores, according to some embodiments.
Figure 16B:
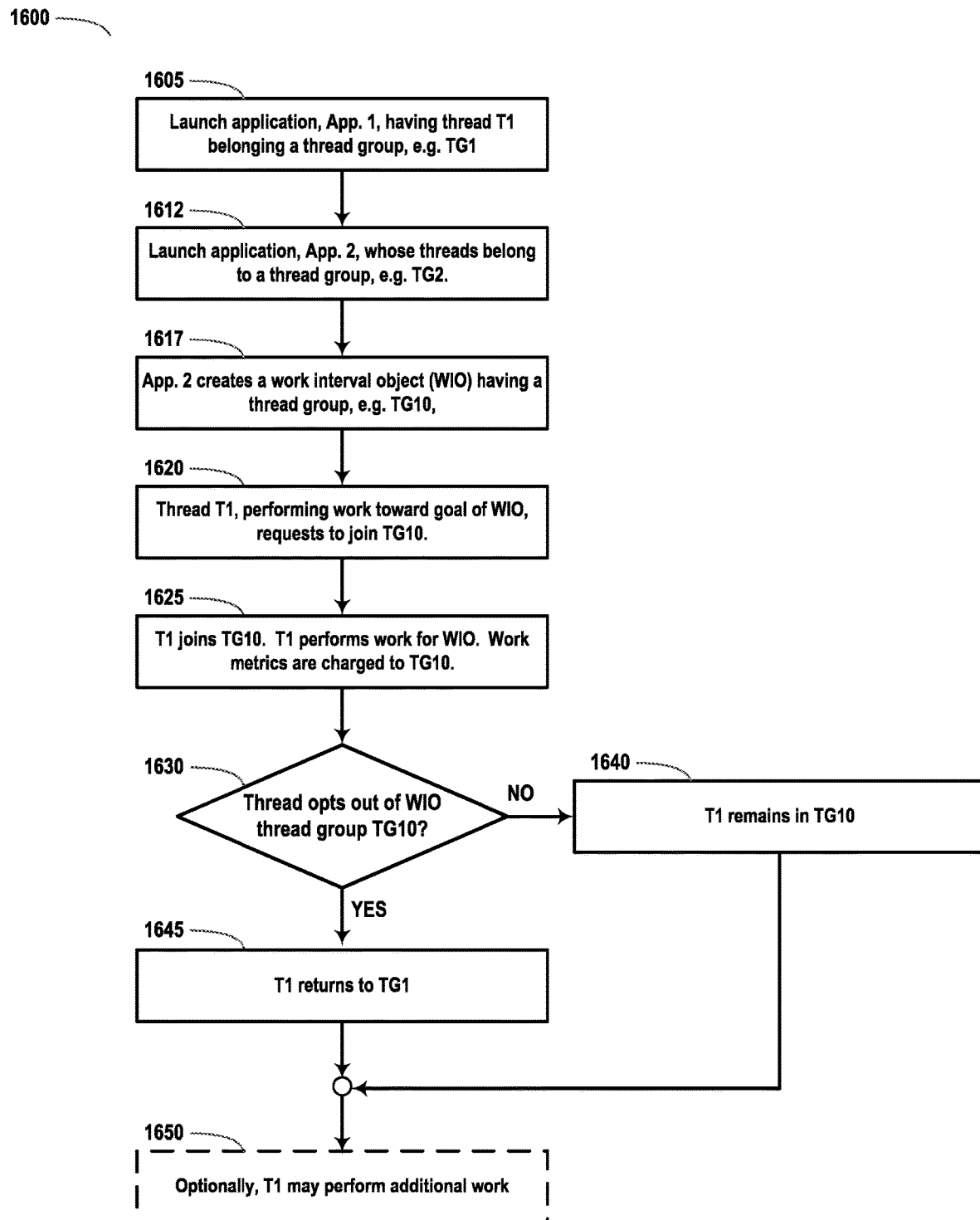

FIGS. 16A and 16B illustrates a method 1600 of processing threads associated with a work interval object (WIO) 135 in a system for processing threads having thread groups on a processor comprising a plurality of core types each having one or more cores, according to some embodiments. A WIO 135 can be created by a daemon or by an application, and the process is slightly different for each. FIG. 16A illustrates a method 1600 of processing a thread wherein the WIO 135 was created by a daemon. FIG. 16B illustrates a method 1600 of processing a thread wherein the WIO 135 was created by an application.

In FIG. 16A, operation 1605, an application, e.g. App. 1, is launched. By default, the threads in the application are assigned to a single group, e.g., thread group 1 (TG1).

In operation 1610, a thread T1 of App. 1 calls an API or framework that invokes a daemon or operation system (OS) service 127 to perform work.

In operation 1615, the called daemon or OS service 127 creates the work interval object (WIO) 135 having a thread group e.g., 10 (TG10).

In operation 1620, thread T1, performing work associated with WIO 135, can request that the thread join WIO thread group TG10.

In operation 1625, thread T1 opts-in to WIO 135 thread group TG10. Thread T1 then performs work on behalf of WIO 135. Thread execution metrics generated by the execution of thread T1 are accumulated with thread group TG10 of the WIO 135.

In operation 1630, it can be determined whether thread T1 opts-out of WIO 135 thread group TG10. If so, then method 1600 continues at operation 1645, otherwise method 1600 continues at operation 1640.

In operation 1640, thread T1 remains in thread group TG10 of WIO 135. Method 1600 continues at operation 1650.

In operation 1645, thread T1 returns to application thread group TG1. Method 1600 continues at operation 1650.

In operation 1650, optionally thread T1 may perform additional work. The thread execution metrics associated with execution of thread T1 are charged to the thread group (application TG1, or WIO TG10) to which the thread T1 belongs.

In FIG. 16B, the work interval object (WIO) 135 is created by an application, not a daemon. Many operations of this version of method 1600 are substantially identical with the method 1600 in FIG. 16A, above. For ease of reference, the operations are described again here.

In operation 1605, an application, e.g. App. 1, is launched. By default, the threads in the application are assigned to a single group, e.g., thread group 1 (TG1).

In operation 1612, an application, e.g. App 2, is launched, with threads belonging to, e.g. thread group 2 (TG2).

In operation 1617, App. 2 creates the work interval object (WIO) 135 having a thread group e.g., 10 (TG10).

In operation 1620, thread T1, performing work associated with WIO 135, can request that thread T1 join WIO thread group TG10.

In operation 1625, thread T1 opts-in to WIO 135 thread group TG10. T1 then performs work for WIO 135. Thread execution metrics generated by the execution of thread T1 are accumulated with thread group TG10 of the WIO 135.

In operation 1630, it can be determined whether thread T1 opts-out of WIO 135 thread group TG10. If so, then method 1600 continues at operation 1640, otherwise method 1600 continues at operation 1645.

In operation 1640, thread T1 remains in thread group TG10 of WIO 135. Method 1600 continues at operation 1650.

In operation 1645, thread T1 returns to application thread group TG1. Method 1600 continues at operation 1650.

In operation 1650, optionally thread T1 may perform additional work. The thread execution metrics associated with execution of thread T1 are charged to the thread group (application TG1, or WIO TG10) to which the thread T1 belongs.

Figure 17:
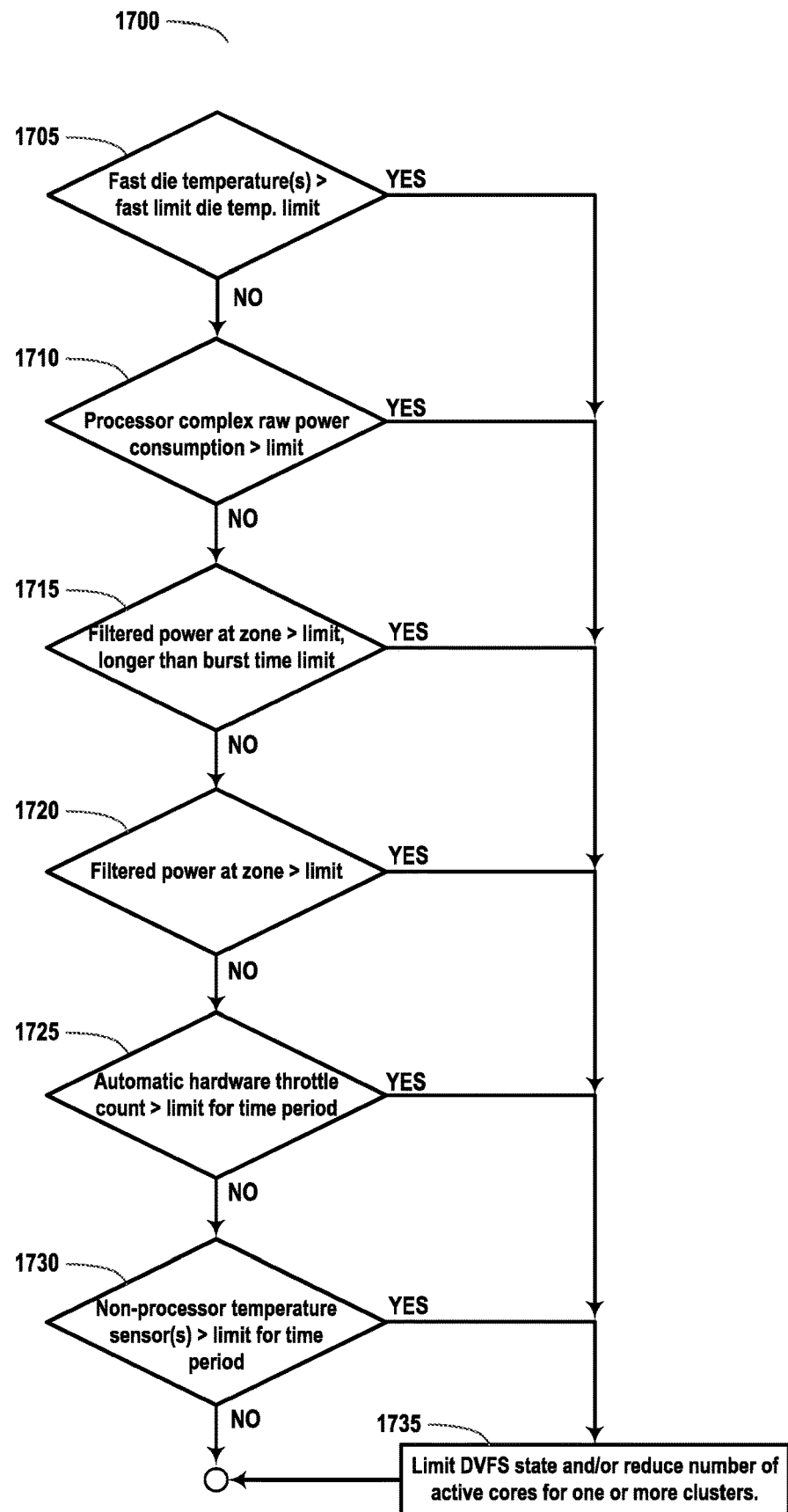
FIG. 17 illustrates a method of a closed loop thermal and power controller limiting power consumed in a system for processing threads having thread groups on a processor comprising a plurality of core types each having one or more cores, according to some embodiments.

FIG. 17 illustrates a method 1700 of a control effort limiter (CEL) 400 limiting power consumed in a system for processing threads having thread groups on a processor comprising a plurality of core types each having one or more cores, according to some embodiments. A computing system 100 contains a plurality of thermal sensors 113 and power sensors 118. Some sensors produce readings that should be acted upon quickly, while others represent changes over time. Method 1700 describes one embodiment for utilizing the plurality temperature and power sensors to maximize performance, balanced with temperature and power consumption control. Control logic for controlling power consumption and heat generation is described above with reference to FIGS. 4A and 4B, control effort limiter 400, which can be incorporated in CLPC 300.

In operation 1705, it can be determined whether a fast die temperature of a processor complex 111 is greater than a fast die temperature limit for a predetermined period of time. A processor complex 111 may be a system on a chip (SoC) comprising a plurality of temperature sensors. In an embodiment, each cluster of cores of a core type can have a fast die temperature sensor. In an embodiment, one or more fast die temperature sensors can be virtual temperature sensors. The fast die temperature predetermined time limit may be on the order of less than 10 milliseconds (10 ms). If a fast die temperature is greater than a threshold temperature for a predetermined threshold time, then method 1700 continues at operation 1735, otherwise method 1700 continues at operation 1710.

In operation 1710, it can be determined whether the raw power consumed by the processor complex 111 exceeds a raw power consumption limit for a predetermined period of time. Raw power is power consumed that is not filtered by a control element, such as a low-pass filter of a power zone. Power consumed can be measured by an energy sensor and summed over the predetermined time limit to obtain power consumed. In an embodiment, an average energy per instruction can be determined and multiplied by a number of instructions executed over the predetermined time to obtain power consumed. This operation detects bursts of power consumed that can raise the temperature of the processor complex 111 or the system very quickly. Thus a predetermined time for this burst may be on the order of less than 10 ms. If raw power consumed during the predetermined time limit exceeds the predetermined power consumption threshold, then method 1700 continues at operation 1735, otherwise method 1700 continues at operation 1715.

In operation 1715, it can be determined whether the filtered power consumed in one of a plurality of power zones exceeds power target for the zone, less a power delta for the zone, for a predetermined period of time. If so, then method 1700 continues at operation 1735, otherwise method 1700 continues at operation 1720.

In operation 1720, can be determined whether the filtered power consumed by the processor complex 111 (system on a chip, SoC) is greater than a predetermined filtered power limit. If so, then method 1700 continues at operation 1735, otherwise method 1700 continues at operation 1725.

In operation 1725, it can be determined whether a count of automatic hardware throttles has exceeded a predetermined count for a predetermined period of time. Automatic hardware throttling can block an instruction from being executed by a processor core, but is expensive and inefficient. If it is determined that automatic hardware throttling has occurred more than a predetermined number of times during a predetermined period of time, then method 1700 continues at operation 1735, otherwise method 1700 continues at operation 1730.

In operation 1730, it can be determined whether a temperature sensor, other than a processor complex 111 temperature sensor, has exceeded a temperature limit for a predetermined period of time. If so, then method 1700 continues at operation 1735, otherwise method 1700 ends. A non-processor complex temperature sensor can include one or more temperature sensors on a device housing ("skin temperature"), a temperature sensor on a subsystem such as a display, battery, battery charger, or other heat-generating component. A predetermined period of time may be on the order of 100's of milliseconds.

In operation 1735, the DVFS state, and/or number of active cores, can be reduced for one or more clusters of processor complex 111. Reducing DVFS state and/or number of active cores can reduce power consumption and thereby reduce generated heat.

Figure 18A:
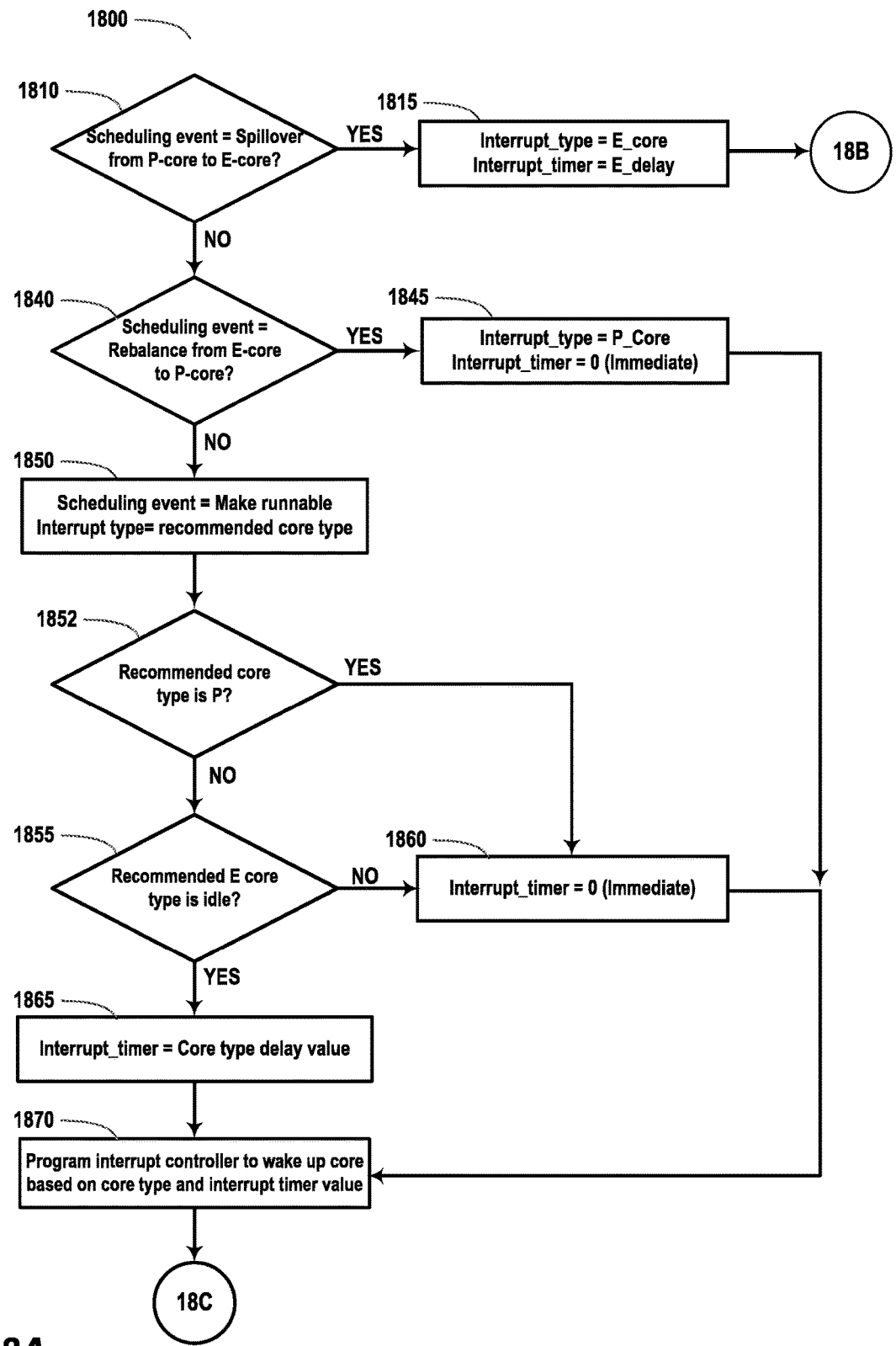
FIGS. 18A, 18B, and 18C illustrate a method of using deferred inter-processor interrupts to increase performance in a system for processing threads having thread groups on a processor comprising a plurality of core types each having one or more cores, according to some embodiments.
Figure 18B:
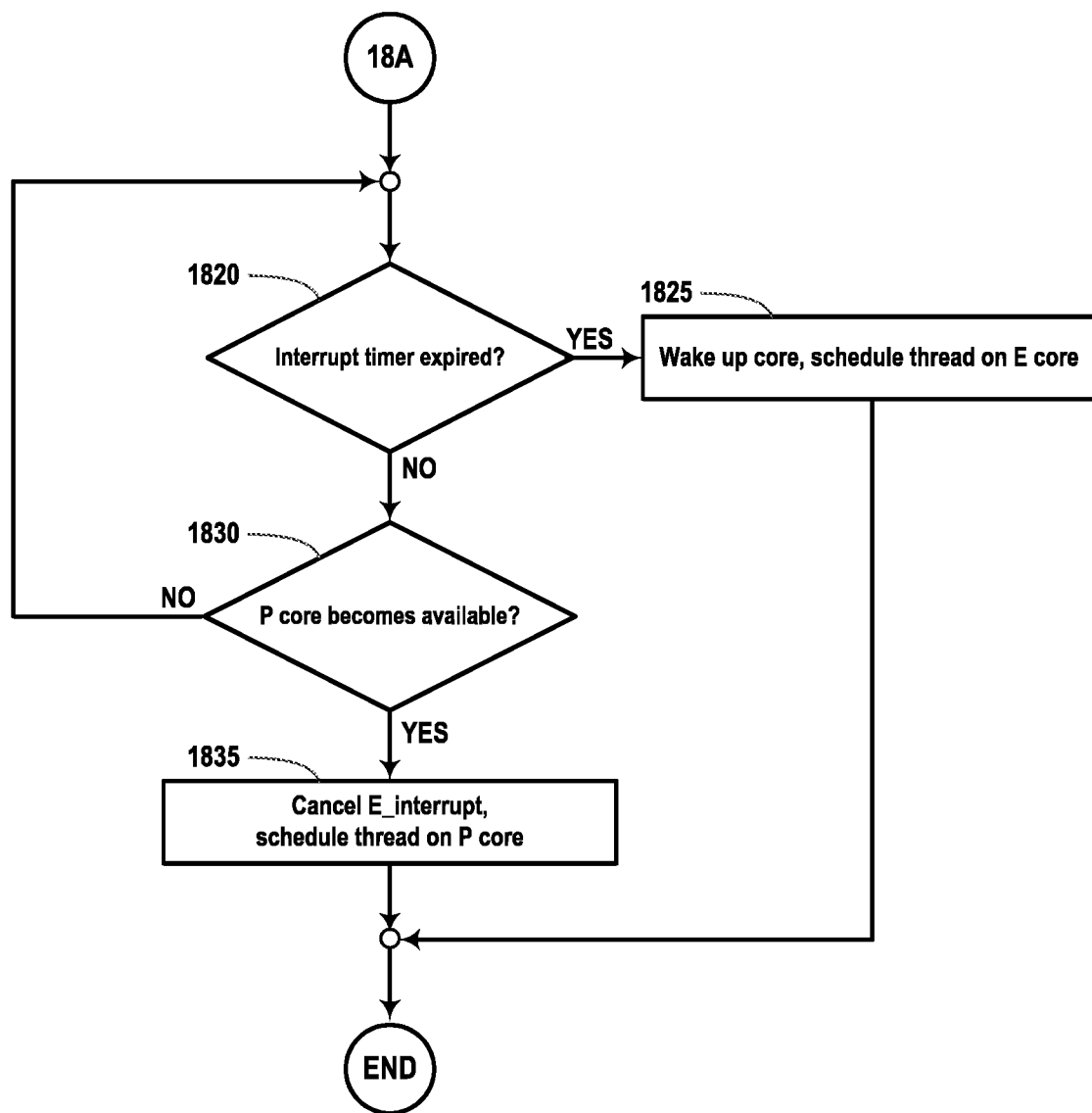
Figure 18C:
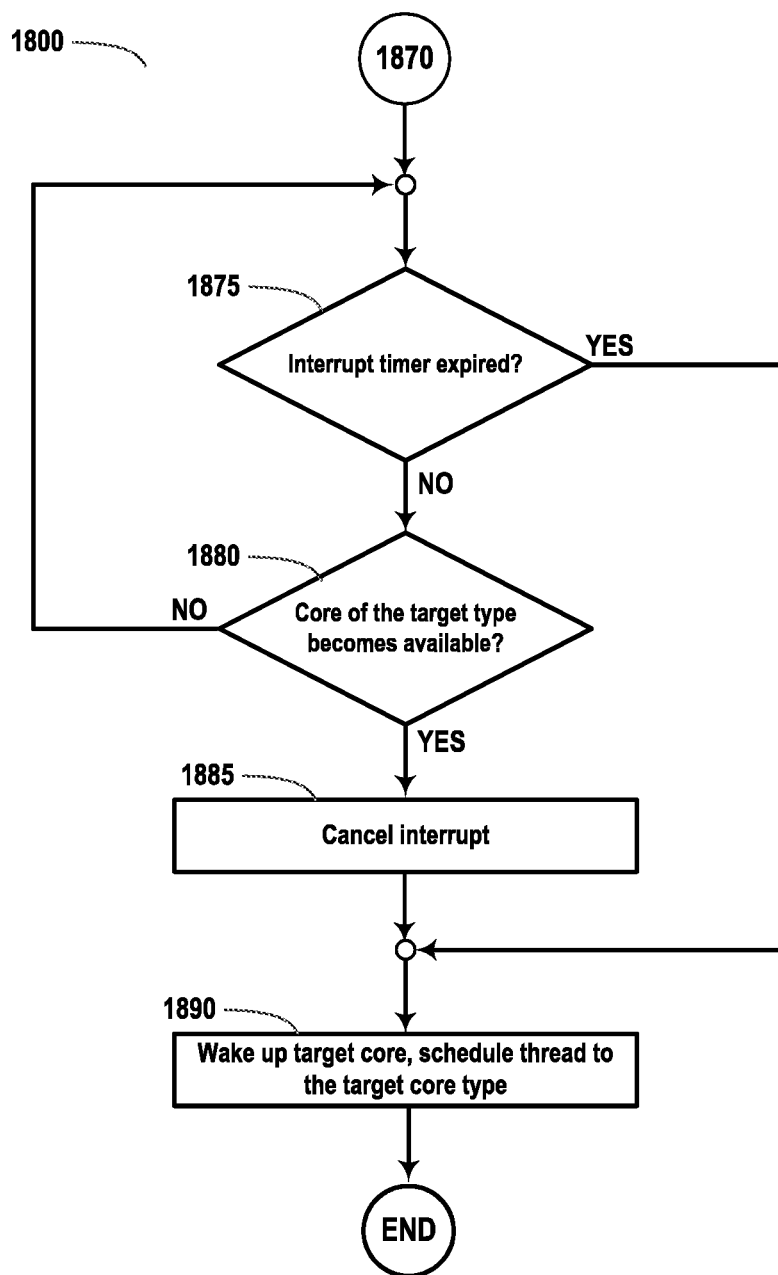

FIGS. 18A, 18B, and 18C illustrate a method 1800 of using deferred inter-processor interrupts to increase performance in a system for processing threads having thread groups on a processor comprising a plurality of core types each having one or more cores, according to some embodiments. Other techniques for increasing performance can include spillover, steal, and rebalance, of threads across core types are described above with reference to FIGS. 13, 14, and 15. Each of the methods in FIGS. 13, 14, and 15 incurs an amount of overhead to perform switching a thread from one core type to another core type. Deferred inter-process interrupts (DIPI) offer an additional, or alternative, technique for increasing performance. In an example of DIPI, a thread that is eligible to run on a P-core, and is waiting for a P-core to become available to execute the thread, when there is an E-core available, can simply wait for a P-core to become available. P-cores retire instructions very quickly. Thus, a P-core may become available to run the P-eligible thread on a P-core in the same amount of time, or less, than running the P-eligible thread on an E-core, and with less overhead. Subsystems to implement method 1800 are described above with reference to FIG. 7.

Aspects of FIGS. 18A-18C and FIG. 19 wake up a core under certain circumstances. Waking up a core can have one of at least two meanings, depending upon the current state of the core. States of a core can include a state wherein the core is executing instructions of a thread and a state wherein the core is idle, i.e., not executing instructions, but the core is not in a sleep state or in a low power state. A core state can further include a state in which the core is in a sleep state or low power state and requires a re-initialization of the core to at least the idle state so that the core can execute instructions.

In FIG. 18A, in operation 1810, it can be determined whether a scheduling event is "Spillover" from a P-core to an E-core. The scheduling event is "spillover" when the criteria for performing a spillover occurs, as described in FIG. 13, above. If the scheduling event is spillover, then method 1800 continues at operation 1815, otherwise method 1800 continues at operation 1840.

In operation 1815, an interrupt can be set for an E-core with a E-core delay time. P-cores can retire instructions very quickly, and a P-core may become available to accept a scheduled thread within the E-core delay time. Method 1800 continues at FIG. 18B, at operation 1820.

In FIG. 18B, operation 1820, it can be determined whether the E-core interrupt timer has expired. If so, then method 1800 continues at operation 1825, otherwise method 1800 continues at operation 1830.

In operation 1825, an E-core interrupt time has expired and no P-core has become available. An E-core can be woken up and the P-eligible thread can be scheduled to run on the E-core, and method 1800 ends.

In operation 1830, the interrupt timer has not yet expired, and it can be determined whether a P-core has become available for thread execution. If not, then method 1800 resumes at operation 1820 to check the interrupt timer, otherwise method 1800 continues at operation 1835.

In operation 1835, a P-core has become available before the E-core interrupt timer has expired. The E-core interrupt can be canceled, the P-eligible thread can be scheduled on a P-core, and method 1800 ends.

Returning to FIG. 18A, in operation 1840, it can be determined whether the scheduling event is "rebalance from E-core to P-core." If so, then method 1800 continues at operation 1845, otherwise method 1800 continues at operation 1850.

In operation 1845, a P-core interrupt can be set with an interrupt delay of zero, to generate an immediate interrupt. Method 1800 resumes at operation 1870.

In operation 1850, the scheduling event is "make runnable." An interrupt can be set for the recommended core type for this thread. In an embodiment, if the thread is a member of a thread group that is recommended for a P-core, then a P-core interrupt is set. In an embodiment, if the thread is a member of a thread group that is recommended for an E-core, then an E-core interrupt is set.

In operation 1852, it can be determined whether the recommended core type is a P-core. If so, then method 1800 continues at operation 1860, otherwise method 1800 continues at operation 1855.

In operation 1855, it can be determined whether the recommended E-core type is available (not idle) for the thread group of the thread. If so, then method 1800 continues at operation 1860, otherwise method 1800 continues at operation 1865.

In operation 1860, a core of the recommended core type is available, thus the interrupt timer is set to zero so that the interrupt for the recommended core type will trigger as soon as the interrupt is programmed (immediate interrupt). Method 1800 continues at operation 1870.

In operation 1865, the interrupt time for the interrupt timer for the recommended core type for the thread group of the thread is set to the interrupt timer delay for the recommended core type (deferred interrupt). Method 1800 continues at operation 1870.

In operation 1870, the interrupt controller can be programmed with the interrupt type determined in operation 1850 and the interrupt delay value determined in either operation 1860 or operation 1865, to wake up the thread at the expiration of the interrupt timer and schedule the thread on a core of the recommended core type. Method 1800 continues at operation 1875 of FIG. 18C.

On FIG. 18C, in operation 1875, it can be determined whether the timer has expired for the programmed interrupt for the recommended core type for the thread. If so, then method 1800 continues at operation 1890, otherwise method 1800 continues at operation 1880.

In operation 1880, it can be determined whether a core of the recommended type for the thread group of the thread has become available. If so, then method 1800 continues at operation 1885, otherwise method 1800 continues at operation 1875.

In operation 1885, the interrupt programmed for the thread can be canceled.

In operation 1890, the thread is woken up and scheduled on a core of the recommended core type for the thread group of the thread.

FIG. 19 illustrates a table 1900 of a non-limiting list of examples of applications of inter-processor interrupt (IPI) actions in a system for processing threads having thread groups on a processor comprising a plurality of core types each having one or more cores, according to some embodiments. An inter-processor interrupts (IPI) can be a deferred IPI (DIPI) or an immediate IPI (IIPI).

A table of IPI actions can use the current core type 1910 upon which a thread last ran, a target core type 1920 that the thread is scheduled to run upon, a scheduling recommendation 1930 for a core type for the thread, a scheduling event 1940 that has occurred, a target core idle state 1950 (e.g., idle/not idle) of a target core type, and an interrupt configuration decision 1960 as to deferred inter-process interrupts for the thread.

As an example, in line 1901, a thread has last run on a P-core, thus the current core type 1910 is "P". The thread will be scheduled to run on an E-core, thus the target core type 1920 is "E". The scheduling recommendation 1930 for the thread, as recommended by the CLPC 300, is for the thread to run on a P-core. The scheduling event 1940 is "spill from P to E-core," which indicates that the thread, though-P eligible, is scheduled to be transferred from a P-core to an E-core. Rather than expend the overhead to run the P-eligible thread on the E-core, DIPI can be used to let the P-eligible thread wait for a short time to see if a P-core will become available to run the P-eligible thread. Thus, the interrupt decision 1960 is "deferred," without regard to target core idle state 1950. The interrupt controller is programmed with the P-core delay value and if a P-core becomes available before the interrupt timer expires, then the interrupt is canceled and the P-eligible thread is run on a P-core.

In example 1902, the current core type 1910 for the thread is an E-core and the target core type 1920 is a P-core. The scheduling recommendation 1930 is to run the thread on a P-core. The scheduling event 1940 is "rebalance from E-core to P-core." The interrupt decision 1960 is "immediate," without regard to target core idle state 1950. The interrupt controller timer is programmed cause an interrupt to wake up a P-core, enabling the thread to be scheduled.

In example 1903, the current core type 1910 for the thread is a P-core, and the target core type 1920 is an E-core. The scheduling recommendation 1930 for the thread group of the thread is for an E-core. The scheduling event 1940 is "make runnable," which indicates to make the thread runnable on a core. The conditions in line item 1903 can occur when CEL 400 reduces the recommended core type from P-core to E-core, such as when performance targets for the thread group are being met, and less control effort is needed to meet the thread group performance targets. Alternatively, the system may be heavily loaded, may have consumed too much power, and/or generated too heat much as determined by CEL 400, and the thread group recommended has been reduced by CEL 400 from P-core to E-core. If the target core idle state 1950 is "idle", the interrupt decision 1960 is set to deferred. The interrupt controller can be programmed for the E-core delay value to wait on an E-core to become ready to run the thread. If the target core idle state 1950 is "not idle", the interrupt decision is set of immediate. The interrupt controller timer can be set to zero and an interrupt will be generated, enabling the thread to run on an E-core.

In example 1904, the current core type 1910 is an E-core, the target core type 1920 is a P-core, with a scheduling recommendation 1930 or P-core. Where the scheduling event 1940 is to make the thread runnable. The interrupt time for P-cores can be set to zero (e.g., interrupt decision 1960 of immediate), an interrupt will be generated, and the thread will be run on a P-core. In example 1904, the interrupt decision 1960 can be made without regard to the target core idle state 1950.

In example 1905, the current core type 1910 for the thread is an E-core, the target core type 1920 for the thread is an E-core, the scheduling recommendation 1930 is for E-core, and the scheduling event 1940 is to make the thread runnable. The interrupt decision 1960 can be deferred or immediate based on the target core idle state 1950. If the target core idle state 1950 is idle, then an E-core delay can be programmed into the E-core interrupt to generate an interrupt. Otherwise, the E-core timer can be programmed to generate an immediate interrupt.

In example 1906, the current core 1910 for the thread is a P-core, the target core type 1920 for the thread is a P-core, the scheduling recommendation 1930 is for a P-core, and the scheduling event 1940 is to make the thread runnable. The P-core interrupt time can be programmed with a value to generate an immediate interrupt (e.g., interrupt decision 1960 of immediate) and the thread will be run on a P-core. In example 1906, the interrupt decision 1960 can be made without regard to the target core idle state 1950.

Figure 20:
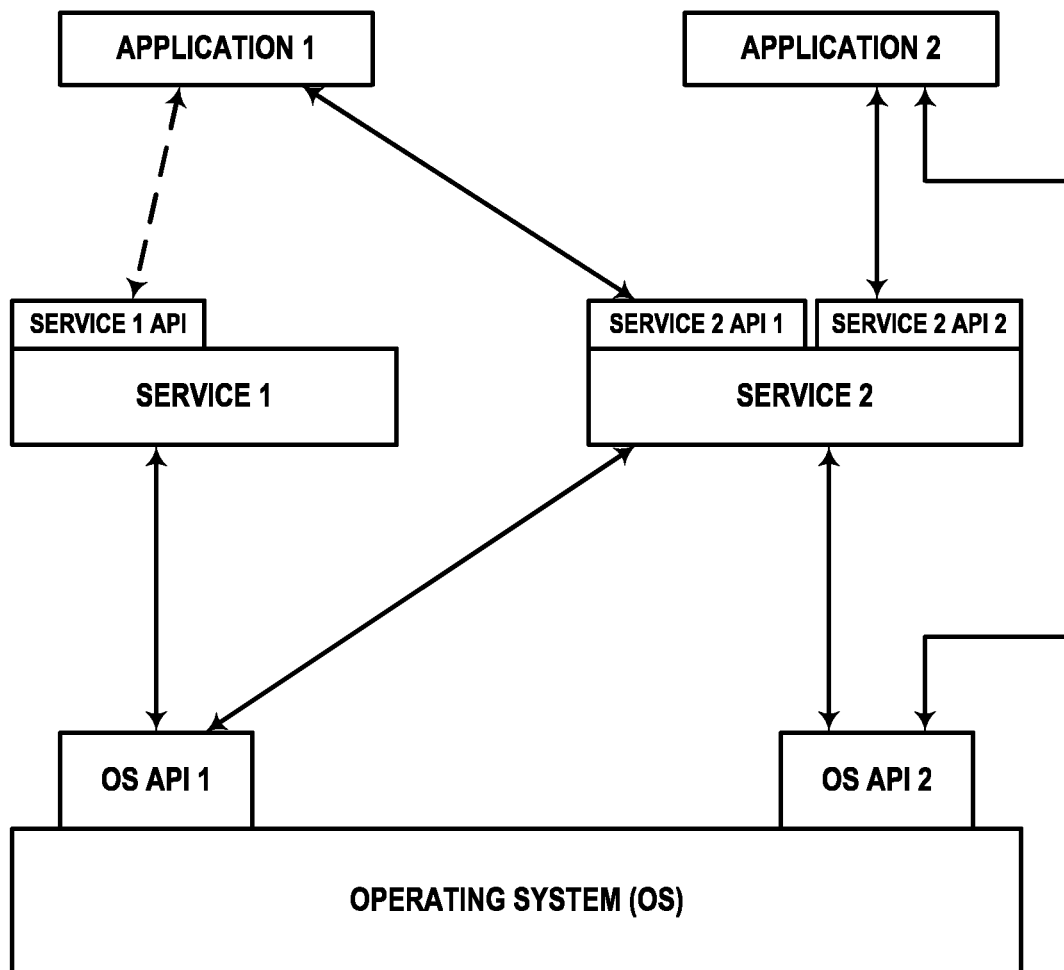
FIG. 20 illustrates an exemplary application programming interface for use in a system for processing threads having thread groups on a processor comprising a plurality of core types each having one or more cores, according to some embodiments.

FIG. 20 illustrates an exemplary application programming interface (API) for use in a system for processing threads having thread groups on a processor comprising a plurality of core types each having one or more cores, according to some embodiments. In FIG. 20 ("Software Stack"), applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 21:
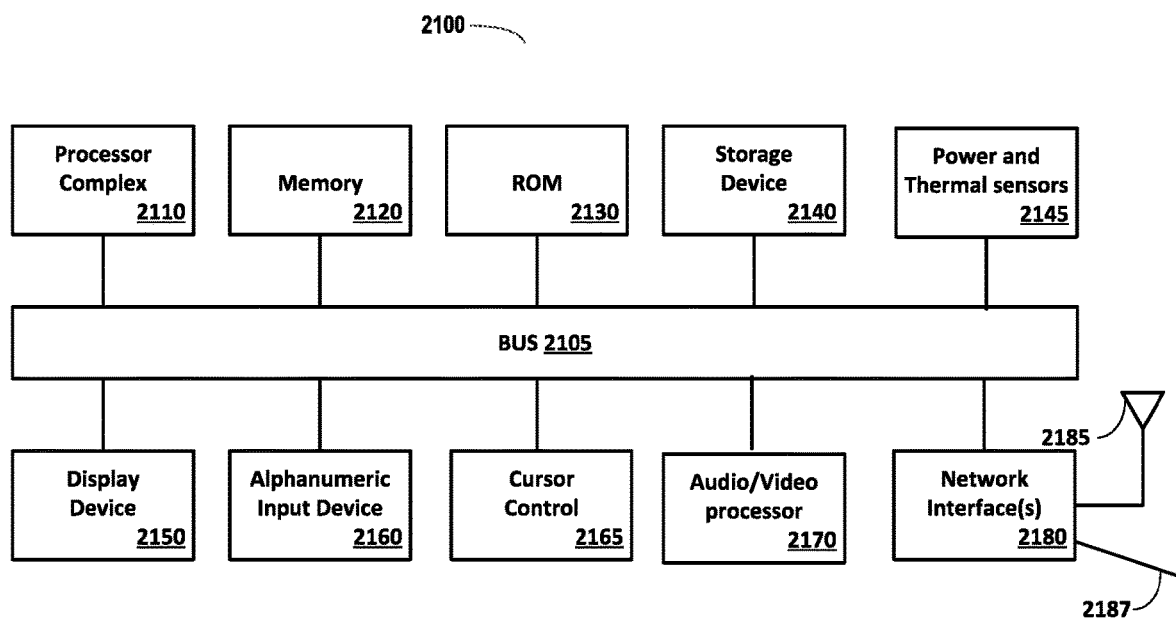
FIG. 21 illustrates, in block form, a computing device that can implement systems and methods for processing threads having thread groups on a processor comprising a plurality of core types each having one or more cores, according to some embodiments.

FIG. 21 illustrates, in block form, a computing system 2100 that can implement systems and methods for processing threads having thread groups on a processor comprising a plurality of core types each having one or more cores, according to some embodiments.

The computing system illustrated in FIG. 21 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 21 may be used to provide the computing device and/or the server device.

Computing system 2100 includes bus 2105 or other communication device to communicate information, and processor complex 2110 coupled to bus 2105 that may process information.

While computing system 2100 is illustrated with a single processor, computing system 2100 may include multiple processors and/or co-processors in processor complex 2110. Processor complex 2110 can include a plurality of core types. Processor complex 2110 can comprise a symmetric multiprocessing complex (SMP) having a plurality of cores that are configured in a plurality of different configurations. Processor complex 2110 can comprise an asymmetric multiprocessing system having a plurality of different core types, each having one or more cores. Core types can include performance cores, efficiency cores, graphics cores, and arithmetic processing cores. A performance core can have an architecture that is designed for very high throughput and may include specialized processing such as pipelined architecture, floating point arithmetic functionality, graphics processing, or digital signal processing. A performance core may consume more energy per instruction than an efficiency core. An efficient processor may include a general-purpose processor that can process input/output (I/O) such as for block storage, data streams, interfacing to a display, processing integer arithmetic, and other general processing functionality. An efficient core may consume less energy per instruction than a performance core. Processor complex 2110 can comprise a system on a chip (SoC).

Computing system 2100 further may include random access memory (RAM) or other dynamic storage device (referred to as main memory 2120), coupled to bus 2105 and may store information and instructions that may be executed by processor complex 2110. Main memory 2120 may also be used to store temporary variables or other intermediate information during execution of instructions by processor complex 2110.

Computing system 2100 may also include read only memory (ROM) 2130 and/or other static data storage device coupled to bus 2105 that may store static information and instructions for processor complex 2110. A non-volatile data storage device 2140 may be coupled to bus 2105 to store information and instructions. The non-volatile data storage device 2140 can include storage media such as, but not limited to flash memory or a magnetic disk, optical disc, solid state disc, writeable or rewriteable compact disc.

Computing system 2100 may further include power and thermal sensors 2145 that include power or energy sensors and thermal sensors. In an embodiment wherein processor complex 2110 comprises a system on a chip (SoC), one more thermal sensors can be included in the SoC. In an embodiment, at least one thermal sensor can be included on the SoC for each core type of the processor complex 2110. In an embodiment, a thermal sensor can comprise a virtual thermal sensor. A virtual thermal sensor can comprise a plurality of physical thermal sensors and logic that estimates one or more temperature values at location(s) other than the physical thermal sensors. Power sensors may also be included in specific locations, such as power consumed by the processor or SoC 111, power consumed by a particular subsystem, such as a display, storage device, network interfaces, and/or radio and cellular transceivers. In an embodiment, a power sensor within the power and thermal sensors 2145 can comprise or include an energy sensor. In an embodiment, the energy sensor can accumulate and average energy consumed, over time, to produce a power consumed value.

Computing system 2100 may also be coupled via bus 2105 to display device 2150, such as a liquid crystal display (LCD), light emitting diode (LED) display, or touch screen, to display information to a user. Computing system 2100 can also include an alphanumeric input device 2160, including alphanumeric and other keys, which may be coupled to bus 2105 to communicate information and command selections to processor complex 2110. An alphanumeric keypad can be implemented as keypad images on a touch screen display. Another type of user input device is cursor control 2165, such as a touchpad, a mouse, a trackball, touch screen input or cursor direction keys to communicate direction information and command selections to processor complex 2110 and to control cursor movement on display device 2150. Computing system 2100 may also receive user input from a remote device that is communicatively coupled to computing system 2100 via one or more network interface(s) 2180.

Computing system 2100 can further include an audio, video, or audio/video processor 2170. An audio processor may include a digital signal processor, memory, one or more analog to digital converters (ADCs), digital to analog converters (DACs), digital sampling hardware and software, one or more coder-decoder (coded) modules, and other components. A video processor can include one or more video encoders, camera, display, and the like.

Computing system 2100 further may include one or more network interface(s) 2180 to provide access to a network, such as a local area network. Network interface(s) 2180 may include, for example, a wireless network interface having antenna 2185, which may represent one or more antenna(e). Computing system 2100 can include multiple wireless network interfaces such as a combination of Wi-Fi, Bluetooth® and cellular telephony interfaces. Network interface(s) 2180 may also include, for example, a wired network interface to communicate with remote devices via network cable 2187, which may be, for example, an Ethernet cable, a coaxial cable, a fiber optic cable, a serial cable, or a parallel cable.

In one embodiment, network interface(s) 2180 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Objects of the systems and methods described herein include controlling system performance using measurements of performance metrics of groups of threads to make joint decisions on scheduling of threads and dynamic voltage and frequency scaling (DVFS) state for one or more clusters of cores in a multiprocessing system having a plurality of core types and one or more core of each core type. The performance metrics are fed to a closed loop control system that produces an output that is used to jointly decide how fast a core is to run and on which core type the threads of a thread group are to run. A thread group comprises one or more threads that are grouped together based on one or more characteristics that are used to determine a common goal or purpose of the threads in the thread group. Objects of the systems and methods described herein include minimizing thread scheduling latency for performance workloads, ensuring that performance workloads consistently find a performance core, maximizing throughput for performance workloads, and ensuring that efficiency workloads always find an efficient core. Objects can further include ensuring that cores are not powered down when threads are enqueued for processing. An additional object is to offload performance workloads when performance cores are oversubscribed. Threads are systematically guided to cores of the correct type for the workload.

Systems and methods are disclosed for scheduling threads on a processor that has at least two different core types each having one or more cores of that type, and the scheduler can schedule threads between at least two different core types. Each of the core types can have a different dynamic voltage and frequency scaling (DVFS) state. The processor can be a symmetric multiprocessing system (SMP) having a plurality of cores of the same design, but a first cluster of cores is run in a first configuration and a second cluster of cores is run in a second configuration. The processor can be an asymmetric multiprocessing system (AMP) that has at least two different core types, such as one or more performance cores and one or more efficiency cores. Each core type can run at a plurality of selectable voltage and frequency settings and both core types can run simultaneously.

Threads of processes can be grouped together into a thread group of related threads. Thread groups, generally, are intended to group work together to achieve a common goal, purpose, or type of work. Based upon samples of execution metrics of threads in a thread group, a closed loop performance controller (CLPC) can generate a control effort that represents an amount of performance, or efficiency, that the thread group should receive to meet performance targets for the thread group. CLPC can determine, for each of a plurality of thread groups that have been active on a core of the processor, a control effort for the thread group. The control effort for each thread group can be mapped to a performance map that recommends a core type and dynamic voltage and frequency scaling (DVFS) state for the thread group based on the control effort computed for the thread group. From the active thread groups, a maximum DVFS state can be determined for all threads that were recommended for a core of a first type (e.g., a performance core). A maximum DVFS state can be determined for all active thread groups that were recommended for a second core type (e.g. efficiency core type). A scheduler can coordinate setting the DVFS state for each core type with the scheduling of threads in the active thread groups.

In an embodiment, control effort limiter (CEL) in CLPC can generate a control effort limit that can limit the control effort output from the CLPC. A control effort limit can be based upon a fast die temperature, a peak power consumed over a short period of time, an average power consumed over any of a plurality of power zones, a skin temperature of an exterior of a device, a count of hardware throttling events, or other control metrics.

Threads can initially be grouped into default thread groups, such as grouping together threads of an application, called a "coalition." A coalition is a grouping of closely related tasks/processes of an application which consist of threads, e.g. a web browser and application extensions associated with the web browser. Tasks can be combined into a single coalition by a launch services daemon, application programming interface (API), or framework. A thread group state is associated with each coalition. Thread grouping can be explicitly defined by a manual construct of a group of threads. Some types of workloads, e.g., an audio processing service, have complete knowledge of their organizations and can group threads accordingly. Threads can implicitly join thread groups by taking advantage of an existing kernel interaction. For example, when threads communicate via inter-process communication, they can optionally pass a voucher that references a thread group for the recipient to join. When a first thread wakes a second thread to do work on behalf of the first thread, the second thread can adopt the thread group of the first thread. When a first thread makes a second thread runnable, the second thread can adopt the thread group of the first thread. Threads can be grouped according to a type of work that the threads will perform as may be indicated by a daemon that launched the threads. An explicit thread grouping can be specified in source code, compiled code, or code packaged into a deliverable for installation. An explicit thread grouping for a work interval object can be specified in source code, compiled code, or a deliverable package for installation.

A work interval object (WIO) is an object that is used to represent periodic work where each period has a deadline. The WIO possesses a token and a specified time interval for one instance of the work. The WIO can be associated with a thread group. The thread group can either be created specifically for the WIO, or the WIO can be associated with an existing thread group. Threads that work to achieve a common purpose, intended to be performed within the specified time interval, can join the thread group of the WIO. A work interval object can be created when a user space process requests the work interval object via a specific system call. The kernel of an operating system can create the work interval object currently and automatically with a system call. By way of example, a work interval object may be, e.g., an object that represents one or more threads that composite multiple sources of audio and encode the audio for playback, all within a fixed period of time (work interval). A thread performing work having the purpose of the work interval object can opt into the work interval object thread group. Work performed by the opting-in threads is charged to the work interval object. A thread that receives a voucher containing a reference to a thread group may be grouped with the thread group referenced in the voucher. A voucher is a collection of attributes in a message sent via inter-process communication (IPC) from a first thread, T1, to a second thread, T2. One of the attributes that thread T1 puts in the voucher is the thread group to which T1 currently belongs. A second thread, T2, receives the IPC message from T1. As part of message reception, the voucher sent my T1 is "redeemed" (or adopted). Redeeming a voucher means processing all the attributes associated with the voucher and placing a pointer to the voucher on the thread. Thread T2 can now be considered to be running in the context of the voucher received from thread T1. As part of the action of "redeeming" a voucher, a voucher manager in the operating system kernel notices that thread T1 sent a thread group attribute in the voucher to thread T2, and the automatically joins thread T2 to the thread group specified in the voucher. After thread T2 has finished processing the message from thread T1, thread T1 can choose to discard the voucher. Discarding (or "dropping") the voucher causes thread T2 to leave thread T1's thread group and causes thread T2 to re-join its "home" thread group (the one associated with the task in which T2 is running). Before thread T2 drops the voucher, however, thread T2 can also pass along the same voucher to another thread/process thread T3. Because the voucher contains a thread group attribute which points to thread T1's thread group, when thread T3 receives the message from thread T2 and adopts/redeems the voucher, thread T3 joins T1's thread group. Thread T3 will then be a part of T1's thread group for as long as that voucher is adopted by thread T3. Both threads T2 and T3 will leave thread T1's thread group as soon as threads T2 and T3 drop the voucher. This can be repeated indefinitely. Because the kernel voucher manager controls the contents of a voucher, and vouchers are automatically sent as part of a basic inter-process communication mechanism, when two processes communicate the thread which handles/receives the message will automatically join the thread group of the process who sent the message. In an embodiment, the thread may be backdated to be grouped with the thread group referenced in the voucher, prior to being made runnable, e.g. at a time when the thread receives the voucher.

A scheduler for the processor can schedule threads of the thread groups in accordance with a recommended core type and recommended DVFS state for the thread group. The recommended DVFS for the core type may be increased by the CLPC finding the maximum DVFS state for the core type, over all of the thread groups that are active on the system. The recommended DVFS state may be limited by the control effort limiter (CEL), limiting the DVFS state and/or number of cores of a core type that will execute threads.

The core types can have an associated interrupt and interrupt timer that can be used to delay a thread from being executed under some conditions. For example, if a thread is eligible for running on a performance core, but there are no idle performance cores, then the thread may be scheduled for an efficiency core. A timer can be programmed for the thread and the thread can be delayed from running. If the timer expires, the interrupt is triggered, and the performance-eligible thread is run on an efficiency core. But, if a performance core becomes available for thread execution before the interrupt time expires, then the timer can be canceled and the thread can be executed on a performance core.

In a first embodiment, a method of running threads on a system having a processor that has a first cluster of one or more cores and a second cluster of one or more cores can include grouping threads of one or more processes into one or more thread groups. A first thread of a first thread group can be run on a core of the first cluster type. A plurality of thread execution metrics of the first thread can be incorporated with a plurality of thread execution metrics of the first thread group. A first control effort can be determined for the first thread group, based at least in part on samples of the plurality of thread group metrics. A first, or second, core type can be recommended for the first thread group type, and a DVFS state for the first thread group can be recommended. In an embodiment, the control effort can be mapped to a performance map of core clusters and DVFS states that are characterized by control effort. In an embodiment, the processor can comprise an asymmetric multiprocessing system (AMP) having a first core type of performance cores (P-cores) and a second core type of efficient cores (E-cores). A thread from a second group of threads can be executed, and performance metrics associated with execution of the second thread can be incorporated with execution metrics of the second thread group. A second control effort can be determined for the second thread group based at least in part on samples of the thread execution metrics of the second thread group. In response to determining that the first recommended core cluster for the first thread group and the second recommended core cluster for the second thread group are the same core cluster, a maximum DVFS state can be computed as the maximum of the first recommended DVFS state and the second recommended DVFS state, and the DVFS sate for the core cluster recommended for the first and second thread groups can be set to the computed maximum DVFS state. In response to determining that the first recommended core cluster for the first thread group and the second recommended core cluster for the second thread group are different core clusters, the DVFS state for the first recommended core cluster can be set to the first recommended DVFS state and the DVFS state for the second recommended core cluster can be set to the second recommended DVFS state. Thread execution metrics can be determined periodically or in response to an asynchronous event. Samples of thread group execution metrics can be inputs to tunable controllers of a CLPC for the thread group. Control effort can map to a recommended core type and DVFS state. If the control effort maps to an overlapping part of the performance map, wherein either a P-core or E-core could be recommended, then a scheduler or CLPC could determine whether to recommend P-cores or E-cores based at least in part on a type of the work that the threads perform. For example, graphics rendering may be recommended to P-cores. I/O operations may be recommended to E-cores. In an embodiment, a time that a thread group has been resident on a core type and/or DVFS state can be considered in determining a core type and/or DVFS state to recommend for the thread group. In an embodiment, wherein cores of a first type are oversubscribed, and cores of a second type are idle, a scheduler may schedule threads of a thread group that are eligible for the first core type for execution on the second core type. A core of the first type can detect that a thread eligible for execution on the first type of core is actually running on the second type of core, and a core of the first type is going idle (e.g., in the process of transitioning into an idle state). The thread can be run on the now-idle core of the first type.

In a second embodiment a method of grouping threads into thread groups is performed on a system comprising an asymmetric multi-core processor having a plurality of cores of at least two different core types. The method includes launching an application program comprising a plurality of processes and assigning each of the plurality of processes to a first thread group. In response to determining that a process in the plurality of processes causes a work interval object to be generated, threads of the process can be assigned to a second thread group, different from the first thread group. At least one thread from the first thread group is executed. A plurality of thread execution metrics of threads in the first thread group is determined, and a processor core type for threads of the first thread group is recommended to a scheduler, based at least in part on the thread execution metrics of the first thread group. In an embodiment, in response to determining that a thread in the plurality of threads causes a work interval object to be generated, the thread can be assigned to a second thread group, different from the first thread group. At least one thread from the second thread group is executed and a plurality of thread execution metrics of threads in the second group is determined. A processor core type for threads of the second thread group is recommended to the scheduler, based at least in part upon samples of the thread execution metrics of the second thread group. In an embodiment, the method can further include receiving an indication that a thread from the first thread group has opted-in to the second thread group, executing the thread that opted-in to the second thread group, and attributing to the second group a plurality of thread execution metrics of the thread from the first group that opted-in to the second thread group. In an embodiment, the method can also include receiving an indication that the thread from the first thread group that opted-in to the second thread group has opted-out of the second thread group, assigning the opted-out thread to the first thread group, executing the opted-out thread, and attributing to the first thread group a plurality of thread execution metrics of the thread that opted-out of the second thread group.

A method of grouping threads for execution on an AMP can include determining that the application indicates that a process in the plurality of processes is to be assigned to a third thread group different from the first and second thread groups, executing at least one thread from the third thread group, determining a plurality of thread execution metrics of threads in the third group, and recommending to the scheduler a processor core type for threads of the third thread group based at least in part upon samples of thread execution metrics of the third thread group.

A method of grouping threads for execution on an AMP can include determining a type of work that a process in the plurality of processes performs and assigning a thread of the process to a fourth thread group, executing at least one thread in the fourth thread group, determining a plurality of thread execution metrics of threads in the fourth group, and recommending to the scheduler a processor core type for threads of the fourth thread group based at least in part upon samples of thread execution metrics of the fourth thread group. The fourth thread group can include threads from a daemon.

A method of grouping threads for execution on an AMP can include, in response to determining that a thread from the first thread group has caused a thread in a fifth thread group to be woken up and/or made runnable by the scheduler, assigning the woken up/and or made runnable thread from the fifth thread group to the first thread group. The method can further include executing at least one thread, determining a plurality of thread execution metrics of threads in the first thread group, and recommending to the scheduler a processor core type for threads of the first thread group based at least in part upon samples of the thread execution metrics of the first thread group.

A method of grouping threads for execution on an AMP can include, in response to determining that a thread from the first thread group has received a voucher to perform work on behalf of another thread, the voucher indicating a sixth thread group, assigning the thread to the sixth thread group. The method can further include executing at least one thread from the sixth thread group, determining a plurality of thread execution metrics of threads of the sixth group, and recommending to the scheduler a processor core type for threads in the sixth thread group base at least in part upon thread execution metrics of the sixth thread group. The method can also include determining that the thread which received the voucher and performed work on behalf of another thread has completed performing the work on behalf of the other thread, and assigning the thread back to the first thread group.

A method of grouping threads for execution on an AMP can include launching an application program comprising a plurality of processes, assigning each of the plurality of processes to a first thread group, launching, by a daemon, at least one thread of a process in the first thread group, assigning, by the daemon, the at least one thread to a second thread group associated with a second daemon associated with the second thread group, executing at least one thread of the second thread group, determining a plurality of thread execution metrics of threads in the second thread group, and recommending to a scheduler a processor core type for threads of the second thread group based at least in part on samples of the thread execution metrics of the second thread group.

In a third embodiment, a method of processing work using a work interval object on an AMP can include creating a work interval object associated with a first thread group having a first thread group identifier. One or more threads associated with the work interval object can perform work toward a common goal of the work interval object within an identified interval of time. The method can also include receiving a request from a thread of a process associated with a second thread group having a second thread group identifier to adopt the first thread group identifier, attributing metrics of work performed by the thread to the first thread group identifier, in response to determining that the thread has adopted the first thread group identifier, and determining a processor core type to run one or more threads having the first thread group identifier based at least in part upon samples of metrics of work associated with the first thread group identifier. The work interval object can be instantiated in response to a call to a daemon or an operating system service. In an embodiment, the work interval object can be instantiated in response to a call by an application to an application programming interface (API) or framework. The method can further include receiving a request associated with the thread to opt out of the first thread group, and associating the thread with the second thread group. In an embodiment, the method can also include attributing metrics of work performed by the thread to the second thread group, and determining a processor type to run one more threads of the second thread group based at least in part upon samples of metrics of work associated with the second thread group identifier.

In a fourth embodiment, method of scheduling threads on a processor having a first cluster type having one or more cores and a second cluster type having one or more cores in a system that includes the processor, includes: determining a control effort limit for the processor and determining a DVFS state for at least one of the first cluster or second cluster of cores. The control effort limit can be used in conjunction with a power map that includes a plurality of DVFS states for each of the first and second cluster of core. The power map can be indexed by the control effort limit. A recommendation can be received that a thread scheduled for execution can be run on the at least one of the first or second cluster of cores at a DVFS state different than the DVFS state determined using the control effort limit. The DVFS state can be set for at least one of the first or second cluster of cores to the DVFS state determined using the control effort limit. In an embodiment, the method can further include determining that a total energy dissipated in the processor for a first predetermined period of time is greater than an instantaneous power target for the processor. The control effort limit for the processor is determined at least in part on the total energy dissipated in the processor for the first predetermined period. In an embodiment, the control effort limit can be reduced in response to determining one or more of: an average power consumed by the processor for a second period of time is greater than an average power target for the processor, or an average energy dissipated per instruction is greater than the predetermined efficiency threshold for a predetermined period of time. In an embodiment, the system can monitor a plurality of power zones, each having a low pass filter that includes a power target, a time constant, a power delta, and a filter algorithm. At a first time, the filtered power can be less than a power target for a power zone, less the power delta for the power zone. At a second time, that is later than the first time, the filtered power can exceed the target power for the power zone. In an embodiment, the system can continue to monitor and filter power for the power zone that exceeded its power target, less the power delta for the power zone. The control effort limit can continue to be reduced until the filtered power for the power zone tracks the target power for the power zone. In an embodiment, the control effort limit can be reduced in response to a measured or estimated current for the processor exceeding a current limit for a predetermined period of time, or a number of instructions blocked from execution exceeds a peak throttle rate target for the predetermined period of time, wherein a throttling that blocks the instructions is done by hardware. In an embodiment, a maximum control effort is determined based at least in part on a maximum fast die temperature limit for at least one of the first or second cluster of cores. In an embodiment, a core can be masked off from executing. In an embodiment, the rate at which cores can be masked off can be limited. The processor can comprise an AMP processor having a first core cluster of P-cords and a second core cluster of E-cores.

A processing system can include a processor having at least two core types and at least one core of each core type. The system can also have a temperature sensor for each core type. The system can also have a scheduler that includes a scheduling queue for each core type. A CLPC can determine a control effort for threads of a thread group, and recommend a core type and a DVFS state for threads of the thread group. A closed loop thermal management system can determine a control effort limit based at least in part on the temperature sensor for each core type. The system can comprise a system on a chip (SoC). One or both of the temperature sensors can be virtual sensors.

In a fifth embodiment, a method performed on a computing system having an asymmetric multiprocessing system (AMP) with a plurality of performance cores (P-cores) and a plurality of efficient cores (E-cores), can include determining that a thread, recommended for processing by a PC, is scheduled for processing by a PC of the AMP, and in response to determining that no P-cores are available for processing the thread and that an E-core is available for processing the thread: configuring a timer of an interrupt controller to generate an interrupt after expiration of a predetermined delay value. The method can further include, in response to determining, before the timer expires, that a PC is available to process the thread, canceling the interrupt, and processing the thread by the available PC. In an embodiment, the method can also include, in response to the timer expiring before a PC becomes available to process the thread: generating an interrupt to wake up an E-core and processing the thread by the E-core. The method can additionally include determining that a PC has become available, configuring a timer of the interrupt controller to generate an immediate interrupt to wake up the PC, generating the interrupt to wake up the PC, and processing the thread by the available PC.

A method of scheduling threads on an AMP processor can include determining that the thread has been recommended for processing by an E-core and that the thread is made runnable by a scheduler. In response to determining that an E-core is idle, configuring a timer of the interrupt controller to generate an immediate interrupt to wake up the E-core, otherwise configuring the timer interrupt controller to generate a delayed interrupt. The method can further include, in response to the interrupt controller generating an interrupt, waking up the E-core, and processing the thread by the E-core. The method can also include determining that the thread has been recommended for processing by a PC and that the thread has again been made runnable by the scheduler. The method can include configuring the timer of the interrupt controller to generate an immediate interrupt to wake up a PC. In response to the interrupt controller generating an interrupt, the method can include waking up the PC and processing the thread by the PC.

In an embodiment, a non-transitory computer readable can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of limiting a control effort on a system comprising a processor having a first cluster having one or more cores and a second cluster having one or more cores, the method comprising:
   determining a control effort limit for the processor;
   determining a dynamic voltage and frequency scaling (DVFS) state for at least one of the first cluster or second cluster of cores, using the control effort limit and a power map comprising a plurality of DVFS states for each of the first and second cluster of cores, the power map indexed by the control effort limit;
   receiving a recommendation that threads scheduled for execution be run on the at least one of the first or second cluster of cores at a DVFS state different than the DVFS state determined using the control effort limit;
   setting the DVFS state of the at least one of the first or second cluster of cores to the DVFS state determined using the control effort limit; and
   reducing the control effort limit in response to determining that an average power consumed by the processor for a period of time is greater than an average power target for the processor, wherein the period of time is after determining the average power target, or in response to determining that an average energy dissipated per instruction is greater than a predetermined efficiency threshold for a predetermined period of time.

2. The method of claim 1, further comprising:
determining that a total energy dissipated in the processor for a first predetermined period of time is greater than an instantaneous power target for the processor; and
wherein the control effort limit for the processor is determined at least in part on the total energy dissipated in the processor for the first predetermined period.

3. The method of claim 1, further comprising:
monitoring, by the system, a plurality of power zones within the system, wherein each power zone includes a low pass filter having a target power, a filter method, a time constant, a power delta, and the filter method determines a filtered power for the power zone;
reducing the control effort limit in response to determining that, for a power zone in the plurality of power zones:
at a first time, t0, the filtered power for the power zone was less than the power target for the power zone, less a power delta for the power zone; and
at a second time, t1 that is later than t0, the filtered power for the power zone exceeds the target power for the power zone.

4. The method of claim 3, further comprising:
continuing to monitor, and determine filtered power for, the power zone that exceeded the target power for the power zone, less the power delta for the power zone; and
continuing to reduce the control effort limit until the filtered power for the power zone tracks the target power for the power zone.

5. The method of claim 1, further comprising:
reducing the control effort limit in response to determining at least one of:
determining that a measured or estimated current limit for the processor is exceeded for a predetermined period of time; and
determining that a number of instructions blocked from execution exceeds a peak throttle rate target for the predetermined period of time, wherein a throttling that blocks the instructions is done by hardware in the system.

6. The method of claim 1, further comprising:
determining a maximum fast die temperature limit for at least one of the first or second cluster of cores; and
determining a maximum control effort for the cluster based at least in part of the maximum fast die temperature and the power map.

7. The method of claim 6, further comprising:
in response to determining that the control effort limit exceeds the maximum control effort limit, setting the control effort limit to the maximum control effort for the processor.

8. The method of claim 1, further comprising:
masking off one or more cores in at least one of the first cluster of cores or the second cluster of cores, such that the masked off cores do not execute a thread; and
limiting a rate at which masking off of one or more cores can occur.

9. The method of claim 1, wherein:
the processor comprises an asymmetric processor;
the first cluster of cores comprises a plurality of performance cores (P-cores); and
the second cluster of cores comprises a plurality of efficient cores (E-cores).

10. A non-transitory computer-readable medium having executable instructions stored thereon, that when executed by a processing system comprising at least one hardware processor having a first cluster of one or more cores and a second cluster of one or more cores, the at least one hardware processor coupled to a memory to perform operations, the operations comprising:
determining a control effort limit for the processor;
determining a dynamic voltage and frequency scaling (DVFS) state for the first cluster of cores or the second cluster of cores, using the control effort limit and a power map comprising a plurality of DVFS states for each of the first and second cluster of cores, the power map indexed by the control effort limit;
receiving a recommendation that threads scheduled for execution be run on the at least one of the first or second cluster of cores at a DVFS state different than the DVFS state determined using the control effort limit;
setting the DVFS state of the at least one of the first or second cluster of cores to the DVFS state determined using the control effort limit; and
reducing the control effort limit in response to determining that an average power consumed by the processor for a period of time is greater than an average power target for the processor, wherein the period of time is after determining the average power target, or determining that an average energy dissipated per instruction is greater than a predetermined efficiency threshold for a predetermined period of time.

11. The medium claim 10, further comprising:
determining that a total energy dissipated in the processor for a first predetermined period of time is greater than an instantaneous power target for the processor; and
wherein the control effort limit for the processor is determined at least in part on the total energy dissipated in the processor for the first predetermined period.

12. The medium of claim 10, further comprising:
monitoring, by the system, a plurality of power zones within the system, wherein each power zone includes a low pass filter having a target power, a filter method, a time constant, a power delta, and the filter method determines a filtered power for the power zone;
reducing the control effort limit in response to determining that, for a power zone in the plurality of power zones:
at a first time, t0, the filtered power for the power zone was less than the power target for the power zone, less the power delta for the power zone; and
at a second time, t1 that is later than t0, the filtered power for the power zone exceeds the target power for the power zone, less the power delta for the power zone.

13. The medium of claim 12, further comprising:
continuing to monitor, and determine filtered power for, the power zone that exceeded the target power for the power zone, less the power delta for the power zone; and
continuing to reduce the control effort limit until the filtered power for the power zone tracks the target power for the power zone.

14. The medium of claim 10, further comprising:
reducing the control effort limit in response to determining at least one of:
determining that a measured or estimated current limit for the processor is exceeded for a predetermined period of time; and
determining that a number of instructions blocked from execution exceeds a peak throttle rate target for the predetermined period of time, wherein a throttling that blocks the instructions is done by hardware in the system.

15. The medium of claim 10, further comprising:
determining a maximum fast die temperature limit for at least one of the first or second cluster of cores; and
determining a maximum control effort for the cluster based at least in part of the maximum fast die temperature and the power map.

16. The medium of claim 15, further comprising:
in response to determining that the control effort limit exceeds the maximum control effort limit, setting the control effort limit to the maximum control effort for the processor.

17. The medium of claim 10, further comprising:
masking off one or more cores in at least one of the first cluster of cores or the second clusters of cores, such that the masked off cores do not execute a thread; and
limiting a rate at which masking off of one or more cores can occur.

18. The medium of claim 10, wherein:
the processor comprises an asymmetric processor;
the first cluster of cores comprises a plurality of performance cores (P-cores); and
the second cluster of cores comprises a plurality of efficient cores (E-cores).

19. A system comprising at least one hardware processor having a first cluster of one or more cores and a second cluster of one or more cores, the at least one hardware processor coupled to a memory programmed with executable instructions that, when executed by the at least one hardware processor, perform operations comprising:
determining a control effort limit for the processor;
determining a dynamic voltage and frequency scaling (DVFS) state for at least one of the first cluster of cores or second cluster of cores, using the control effort limit and a power map comprising a plurality of DVFS states for each of the first and second cluster of cores, the power map indexed by the control effort limit;
receiving a recommendation that threads scheduled for execution be run on the at least one of the first or second cluster of cores at a DVFS state different than the DVFS state determined using the control effort limit;
setting the DVFS state of the at least one of the first or second cluster of cores to the DVFS state determined using the control effort limit; and
reducing the control effort limit in response to determining that an average power consumed by the processor for a period of time is greater than an average power target for the processor, wherein the period of time is after determining the average power target, or
determining that an average energy dissipated per instruction is greater than a predetermined efficiency threshold for a predetermined period of time.

20. The system claim 19, further comprising:
determining that a total energy dissipated in the processor for a first predetermined period of time is greater than an instantaneous power target for the processor; and
wherein the control effort limit for the processor is determined at least in part on the total energy dissipated in the processor for the first predetermined period.

21. The system of claim 19, further comprising:
monitoring, by the system, a plurality of power zones within the system, wherein each power zone includes a low pass filter having a target power, a filter method, a time constant, a power delta, and the filter method determines a filtered power for the power zone;
reducing the control effort limit in response to determining that, for a power zone in the plurality of power zones:
at a first time, t0, the filtered power for the power zone was less than the power target for the power zone, less the power delta for the power zone; and
at a second time, t1 that is later than t0, the filtered power for the power zone exceeds the target power for the power zone, less the power delta for the power zone.

22. The system of claim 21, further comprising:
continuing to monitor, and determine filtered power for, the power zone that exceeded the target power for the power zone, less the delta for the power zone; and
continuing to reduce the control effort limit until the filtered power for the power zone tracks the target power for the power zone.

23. The system of claim 19, further comprising:
reducing the control effort limit in response to determining at least one of:
determining that a measured or estimated current limit for the processor is exceeded for a predetermined period of time; and
determining that a number of instructions blocked from execution exceeds a peak throttle rate target for the predetermined period of time, wherein a throttling that blocks the instructions is done by hardware in the system.

24. The system of claim 19, further comprising:
determining a maximum fast die temperature limit for at least one of the first or second cluster of cores; and
determining a maximum control effort for the cluster based at least in part of the maximum fast die temperature and the power map.

25. The system of claim 24, further comprising:
in response to determining that the control effort limit exceeds the maximum control effort limit, setting the control effort limit to the maximum control effort for the processor.

26. The system of claim 19, further comprising:
masking off one or more cores in at least one of the first cluster of cores or the second clusters of cores, such that the masked off cores do not execute a thread; and
limiting a rate at which masking off of one or more cores can occur.

27. The system of claim 19, wherein:
the processor comprises an asymmetric processor;
the first cluster of cores comprises a plurality of performance cores (P-cores); and
the second cluster of cores comprises a plurality of efficient cores (E-cores).

* * * * *